United States Patent
Hirakata et al.

(10) Patent No.: US 10,528,198 B2
(45) Date of Patent: Jan. 7, 2020

(54) DISPLAY PANEL, DISPLAY DEVICE, INPUT/OUTPUT DEVICE, DATA PROCESSING DEVICE, AND METHOD FOR MANUFACTURING THE DISPLAY PANEL

(71) Applicant: Semiconductor Energy Laboratory Co., Ltd., Atsugi-shi, Kanagawa-ken (JP)

(72) Inventors: Yoshiharu Hirakata, Tochigi (JP); Koichi Takeshima, Tochigi (JP); Takayuki Ohide, Tochigi (JP); Kenji Shinozaki, Tochigi (JP); Kanpei Kojima, Tochigi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 101 days.

(21) Appl. No.: 15/697,738

(22) Filed: Sep. 7, 2017

(65) Prior Publication Data

US 2018/0081465 A1    Mar. 22, 2018

(30) Foreign Application Priority Data

Sep. 16, 2016   (JP) ................................. 2016-181592

(51) Int. Cl.
*G06F 3/044* (2006.01)
*G09G 3/36* (2006.01)
(Continued)

(52) U.S. Cl.
CPC ............ *G06F 3/044* (2013.01); *G06F 1/1637* (2013.01); *G06F 1/1643* (2013.01);
(Continued)

(58) Field of Classification Search
CPC ........... G02F 1/133345; G02F 1/13394; G02F 1/13338; G06F 1/1637; G06F 1/1643; G06F 3/044; G09G 3/3233; G09G 3/3648
(Continued)

(56) References Cited

U.S. PATENT DOCUMENTS

| | | |
|---|---|---|
| 6,714,268 B2 | 3/2004 | Wang et al. |
| 7,038,641 B2 | 5/2006 | Hirota et al. |

(Continued)

FOREIGN PATENT DOCUMENTS

| | | |
|---|---|---|
| CN | 106597697 A | 4/2017 |
| CN | 107003582 A | 8/2017 |

(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.

(Continued)

*Primary Examiner* — Sardis F Azongha
(74) *Attorney, Agent, or Firm* — Fish & Richardson P.C.

(57) ABSTRACT

A display panel and the like with a novel structure are provided. In the display panel, a first functional layer includes a pixel circuit and a first insulating film. A second functional layer includes a coloring film and a second insulating film. The first insulating film and the second insulating film each have a thickness of 0.5 μm to 3 μm and a Young's modulus of 3 GPa to 12 GPa. A sealing material is provided between a first base and a second base. A structure body is provided between the first base and the second base, and keeps a predetermined gap between the first and second bases. A pixel is surrounded by the first base, the second base, and the sealing material. A display element (Continued)

in the pixel is electrically connected to a pixel circuit and overlaps with a coloring film and a liquid crystal material.

12 Claims, 37 Drawing Sheets

(51) Int. Cl.
 *G09G 3/3233* (2016.01)
 *G06F 1/16* (2006.01)
(52) U.S. Cl.
 CPC ......... *G09G 3/3233* (2013.01); *G09G 3/3648* (2013.01); *G06F 2203/04102* (2013.01); *G06F 2203/04103* (2013.01); *G06F 2203/04112* (2013.01); *G09G 2300/046* (2013.01); *G09G 2300/0426* (2013.01); *G09G 2354/00* (2013.01)
(58) Field of Classification Search
 USPC ............................................ 345/168, 76, 87
 See application file for complete search history.

(56) References Cited

U.S. PATENT DOCUMENTS

| | | | |
|---|---|---|---|
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,351,300 B2 | 4/2008 | Takayama et al. | |
| 7,385,654 B2 | 6/2008 | Mitsui et al. | |
| 8,048,251 B2 | 11/2011 | Yamashita et al. | |
| 8,188,474 B2 | 5/2012 | Hatano et al. | |
| 8,319,725 B2 | 11/2012 | Okamoto et al. | |
| 8,605,246 B2* | 12/2013 | Kim | G02F 1/13394 349/156 |
| 8,755,018 B2* | 6/2014 | Huang | G02F 1/1339 349/155 |
| 8,810,508 B2 | 8/2014 | Okamoto et al. | |
| 8,969,128 B2 | 3/2015 | Cho et al. | |
| 8,981,641 B2 | 3/2015 | Yamashita et al. | |
| 9,024,863 B2 | 5/2015 | Okamoto et al. | |
| 9,316,855 B2* | 4/2016 | Nagami | G02F 1/133345 |
| 9,333,736 B2 | 5/2016 | Kumakura et al. | |
| 9,397,117 B2 | 7/2016 | Okamoto et al. | |
| 9,437,831 B2 | 9/2016 | Yamazaki et al. | |
| 9,543,533 B2 | 1/2017 | Yamazaki et al. | |
| 9,682,544 B2 | 6/2017 | Kumakura et al. | |
| 9,735,398 B2 | 8/2017 | Aoyama et al. | |
| 2002/0003711 A1 | 1/2002 | Hashimoto et al. | |
| 2003/0201960 A1 | 10/2003 | Fujieda | |
| 2004/0001177 A1 | 1/2004 | Byun et al. | |
| 2004/0263765 A1* | 12/2004 | Han | G02F 1/1339 349/155 |
| 2006/0072047 A1 | 4/2006 | Sekiguchi | |
| 2008/0042997 A1 | 2/2008 | Endo | |
| 2008/0180618 A1 | 7/2008 | Fujieda | |
| 2010/0171905 A1 | 7/2010 | Huang et al. | |
| 2010/0253902 A1 | 10/2010 | Yamazaki et al. | |
| 2012/0154720 A1* | 6/2012 | Park | G02F 1/1339 349/104 |
| 2014/0362333 A1* | 12/2014 | Oono | G02F 1/13394 349/138 |
| 2015/0155505 A1 | 6/2015 | Yamazaki et al. | |
| 2015/0185552 A1 | 7/2015 | Yamashita et al. | |
| 2015/0201487 A1* | 7/2015 | Kee | G02F 1/133305 361/749 |
| 2016/0054607 A1* | 2/2016 | Ishizaki | G02F 1/13338 349/12 |
| 2016/0283028 A1 | 9/2016 | Yamazaki et al. | |
| 2016/0299387 A1 | 10/2016 | Yamazaki et al. | |
| 2016/0306460 A1* | 10/2016 | Lee | H01L 27/323 |
| 2016/0358986 A1 | 12/2016 | Yamazaki et al. | |
| 2016/0359141 A1* | 12/2016 | Yoon | H01L 51/5268 |
| 2017/0013720 A1 | 1/2017 | Okamoto et al. | |
| 2017/0040402 A1 | 2/2017 | Yasumoto et al. | |
| 2017/0278878 A1 | 9/2017 | Kuwabara et al. | |
| 2018/0336840 A1* | 11/2018 | Niikura | C09K 19/02 |

FOREIGN PATENT DOCUMENTS

| | | |
|---|---|---|
| JP | 2001-066593 A | 3/2001 |
| JP | 2002-196702 A | 7/2002 |
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 4161574 | 10/2008 |
| JP | 2013-221965 A | 10/2013 |
| JP | 2015-173088 A | 10/2015 |
| JP | 2015-187701 A | 10/2015 |
| KR | 2016-0093639 A | 8/2016 |
| KR | 2017-0091139 A | 8/2017 |
| TW | 201523961 | 6/2015 |
| WO | WO-2004/053819 | 6/2004 |
| WO | WO-2013/035298 | 3/2013 |
| WO | WO-2015/083029 | 6/2015 |
| WO | WO-2016/087999 | 6/2016 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.
International Search Report (Application No. PCT/IB2017/055385) dated Dec. 19, 2017.
Written Opinion (Application No. PCT/IB2017/055385) dated Dec. 19, 2017.
Oka.S et al., "Optical Compensation Method for Wide Viewing Angle IPS LCD Using a Plastic Substrate", SID Digest '16 : SID International Symposium Digest of Technical Papers, May 22, 2016, vol. 47, pp. 87-90.

* cited by examiner

DISPLAY PANEL, DISPLAY DEVICE, INPUT/OUTPUT DEVICE, DATA PROCESSING DEVICE, AND METHOD FOR MANUFACTURING THE DISPLAY PANEL

TECHNICAL FIELD

One embodiment of the present invention relates to a display panel, a display device, an input/output device, a data processing device, or a method for manufacturing a display panel.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

A processing apparatus of a stack is known (Patent Document 1). The stack includes two substrates attached to each other with a gap provided between their end portions. The processing apparatus includes a fixing mechanism for fixing part of the stack, a plurality of suction jigs that fix an outer peripheral edge of one of the substrates of the stack, and a wedge-shaped jig that is inserted into a corner of the stack. Each of the plurality of suction jigs includes a mechanism that allows the suction jig to move separately in a vertical direction and a horizontal direction. The processing apparatus of a stack also includes a sensor for sensing a position of a gap provided between the end portions in the stack. A tip of the wedge-shaped jig moves along a chamfer formed on an end surface of the stack, and the wedge-shaped jig is inserted into the gap between the end portions in the stack.

Unfortunately, a liquid crystal display device including a substrate formed of a general plastic material having a large retardation is known to have a narrow viewing angle. An optical compensation method for improving a viewing angle of a liquid crystal display device and a method for manufacturing such a liquid crystal display device are known (Non-Patent Document 1).

REFERENCES

Patent Document

[Patent Document 1] Japanese Published Patent Application No. 2015-173088
[Non-Patent Document 1] Shinichiro Oka et al., SOCIETY FOR INFORMATION DISPLAY 2016 INTERNATIONAL SYMPOSIUM DIGEST OF TECHNICAL PAPERS, Volume 47, pp. 87-90.

DISCLOSURE OF INVENTION

An object of one embodiment of the present invention is to provide a novel display panel that is highly convenient or reliable. Another object of one embodiment of the present invention is to provide a novel display device that is highly convenient or reliable. Another object of one embodiment of the present invention is to provide a novel input/output device that is highly convenient or reliable. Another object of one embodiment of the present invention is to provide a novel data processing device that is highly convenient or reliable. Another object of one embodiment of the present invention is to provide a method for manufacturing a novel display panel that is highly convenient or reliable. Another object of one embodiment of the present invention is to provide a novel display panel, a novel display device, a novel input/output device, a novel data processing device, a method for manufacturing a novel display panel, or a novel semiconductor device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

(1) One embodiment of the present invention is a display panel including a first base, a second base, a first functional layer, a second functional layer, a sealing material, a structure body, and a pixel.

The second base includes a region overlapping with the first base.

The first functional layer includes a region between the first base and the second base. The first functional layer includes a pixel circuit and a first insulating film.

The first insulating film includes a region between the first base and the pixel circuit. The first insulating film has a thickness of greater than or equal to 0.5 μm and less than or equal to 3 μm and a Young's modulus of larger than or equal to 3 GPa and smaller than or equal to 12 GPa.

The second functional layer includes a region between the first functional layer and the second base. The second functional layer includes a coloring film and a second insulating film.

The second insulating film includes a region between the second base and the coloring film. The second insulating film has a thickness of greater than or equal to 0.5 μm and less than or equal to 3 μm and a Young's modulus of larger than or equal to 3 GPa and smaller than or equal to 12 GPa.

The sealing material includes a region between the first base and the second base, and has a function of bonding the first base and the second base to each other.

The structure body includes a region between the first base and the second base, and has a function of keeping a predetermined gap between the first base and the second base.

The pixel includes a region surrounded by the first base, the second base, and the sealing material. The pixel includes a first display element, the pixel circuit, and the coloring film.

The first display element is electrically connected to the pixel circuit. The first display element includes a region overlapping with the coloring film. The first display element includes a layer containing a liquid crystal material.

The layer containing a liquid crystal material fills the gap.

(2) In the display panel of one embodiment of the present invention, the first functional layer further includes a first relieving layer between the pixel circuit and the first insulating film, and the second functional layer further includes a second relieving layer between the pixel circuit and the second insulating film.

The first relieving layer has a thickness of greater than or equal to 7 μm and less than or equal to 9.5 μm. The second relieving layer has a thickness of greater than or equal to 7 µm and less than or equal to 9.5 µm.

With such a structure, a liquid crystal layer of the display element can be provided between the first functional layer including the pixel circuit electrically connected to the display element and the second functional layer including the coloring film including the region overlapping with the display element. Thus, a novel display panel that is highly convenient or reliable can be provided.

(3) In the display panel of one embodiment of the present invention, a group of pixels, a different group of pixels, a scan line, and a signal line are included.

The pixel is included in the group of pixels. The group of pixels are arranged in a row direction.

The pixel is also included in the different group of pixels. The different group of pixels are arranged in a column direction intersecting the row direction.

The scan line is electrically connected to the group of pixels. The signal line is electrically connected to the different group of pixels.

The group of pixels and the different group of pixels are provided so that the resolution of the display panel is higher than or equal to 220 ppi, preferably higher than or equal to 300 ppi.

The first base has a Young's modulus of larger than or equal to 1 GPa and smaller than or equal to 12 GPa.

The second base has a Young's modulus of larger than or equal to 1 GPa and smaller than or equal to 12 GPa.

With this structure, it is possible to display a high-definition image. Alternatively, toughness against impact accompanying dropping can be increased. Alternatively, coloring layers can be provided to overlap with a plurality of pixels finely provided. Thus, a novel display panel that is highly convenient or reliable can be provided.

(4) In the display panel of one embodiment of the present invention, the pixel further includes a first conductive film, a second conductive film, an insulating film and a second display element.

The second conductive film includes a region overlapping with the first conductive film.

The insulating film includes a region between the first conductive film and the second conductive film. The insulating film has an opening.

The first conductive film is electrically connected to the first display element.

The second conductive film is electrically connected to the first conductive film in the opening. The second conductive film is electrically connected to the pixel circuit.

The second display element is electrically connected to the pixel circuit. The second display element has a function of emitting light toward the insulating film. The second display element is provided so that an image displayed using the second display element can be seen from part of a region from which an image displayed using the first display element can be seen.

Thus, the first display element and the second display element that displays an image using a method different from that of the first display element can be driven using pixel circuits that can be formed in the same process, for example. Furthermore, using the insulating film, impurity diffusion between the first display element and the second display element or between the first display element and the pixel circuit can be suppressed. Thus, a novel display panel that is highly convenient or reliable can be provided.

(5) The display panel of one embodiment of the present invention further includes a terminal.

The terminal is electrically connected to the pixel circuit, and includes a region overlapping with the first base.

The second base does not overlap with the terminal. The sealing material does not overlap with the terminal.

The structure body does not overlap with the terminal. The structure body includes a region between the sealing material and a region overlapping with the terminal. In other words, the structure body includes a region between the sealing material and an opening over the terminal.

Thus, the shape of the sealing material can be adjusted using the shape of the structure body. Alternatively, the terminal can be exposed. Thus, a novel display panel that is highly convenient or reliable can be provided.

(6) One embodiment of the present invention is an input/output device including a display portion and an input portion.

The display portion includes the above-mentioned display panel.

The input portion includes a region overlapping with the display panel. The input portion includes a control line, a sensing signal line, and a sensing element.

The control line has a function of supplying a control signal. The sensing signal line has a function of being supplied with a sensing signal.

The sensing element is electrically connected to the control line and the sensing signal line. The sensing element has a light-transmitting property, and includes a first electrode and a second electrode.

The first electrode is electrically connected to the control line.

The second electrode is electrically connected to the sensing signal line, and is provided so that an electric field part of which is blocked by an object approaching a region overlapping with the display panel is generated between the first electrode and the second electrode.

The sensing element has a function of supplying the sensing signal which changes in accordance with the control signal and a distance between the sensing element and the object approaching the region overlapping with the display panel.

Thus, the object approaching the region overlapping with the display panel can be sensed while image data is displayed on the display panel. As a result, a novel input/output device that is highly convenient or reliable can be provided.

(7) One embodiment of the present invention is a data processing device including the above-described display panel and at least one of a keyboard, a hardware button, a pointing device, a touch sensor, an illuminance sensor, an imaging device, an audio input device, a viewpoint input device, and an attitude determination device.

Thus, an arithmetic device can generate image data or control data on the basis of data which is supplied using a variety of input devices. As a result, a novel data processing device that is highly convenient or reliable can be provided.

(8) One embodiment of the present invention is a method for manufacturing a display panel, which includes the following steps.

The manufacturing method includes the step of forming a first region and a second region for a first process member using a sealing material.

The manufacturing method includes the step of dripping a liquid crystal material into the first region.

The manufacturing method includes the step of attaching the first process member and a second process member to each other using the sealing material under a reduced pressure lower than a normal pressure.

The manufacturing method includes the step of separating a process substrate from the first process member under a pressure higher than the reduced pressure.

The manufacturing method includes the step of attaching a remaining portion of the first process member and a first base to each other using a first adhesive layer.

The manufacturing method includes the step of separating a process substrate from the second process member under a pressure higher than the reduced pressure.

The manufacturing method includes the step of attaching a remaining portion of the second process member and a second base to each other using a second adhesive layer.

The manufacturing method includes the step of cutting out a portion including the first region.

The manufacturing method includes the step of removing the second base and the like in a region overlapping with the second region.

In this manner, a liquid crystal layer of a display element can be provided between a first functional layer including a pixel circuit electrically connected to the display element and a second functional layer including a coloring film including a region overlapping with the display element. Thus, a novel display panel that is highly convenient or reliable can be provided.

Although the block diagrams attached to this specification show components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

Note that in this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state in which current, voltage, or a potential can be supplied or transmitted. Accordingly, connection means not only direct connection but also indirect connection through a circuit element such as a wiring, a resistor, a diode, or a transistor so that current, voltage, or a potential can be supplied or transmitted.

In this specification, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel display panel that is highly convenient or reliable can be provided. A novel input/output device that is highly convenient or reliable can be provided. A novel data processing device that is highly convenient or reliable can be provided. A method for manufacturing a novel display panel that is highly convenient or reliable can be provided. A novel display panel, a novel input/output device, a novel data processing device, a novel semiconductor device, or a method for manufacturing a novel display panel can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BEST MODE FOR CARRYING OUT THE INVENTION

Figure 1A:
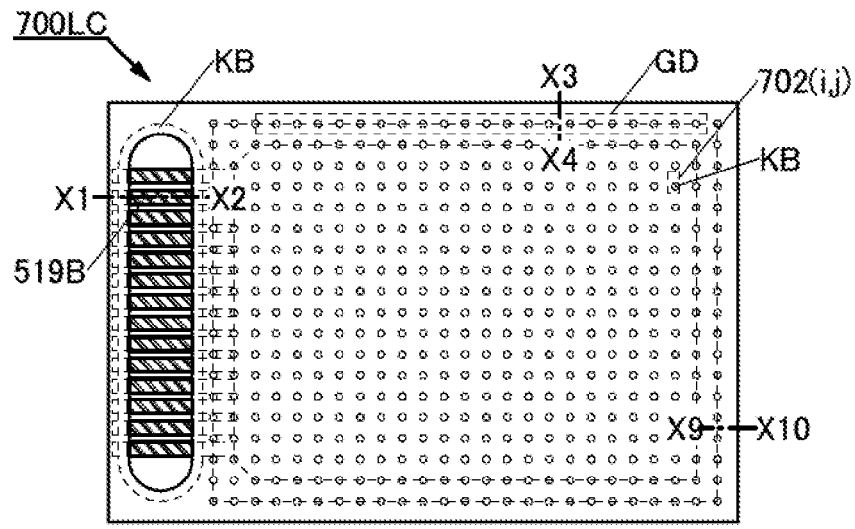
FIGS. 1A and 1B are a top view and a projection view illustrating a structure of a display panel of an embodiment.

A display panel includes a first base, a second base, a first functional layer, a second functional layer, a sealing material, a structure body, and a pixel. The second base includes a region overlapping with the first base. The first functional layer includes a region between the first base and the second base. The first functional layer includes a pixel circuit and a first insulating film. The first insulating film has a thickness of greater than or equal to 0.5 μm and less than or equal to 3 μm and a Young's modulus of larger than or equal to 3 GPa and smaller than or equal to 12 GPa. The second functional layer includes a region between the first functional layer and the second base. The second functional layer includes a coloring film and a second insulating film. The second insulating film has a thickness of greater than or equal to 0.5 μm and less than or equal to 3 μm and a Young's modulus of larger than or equal to 3 GPa and smaller than or equal to 12 GPa. The sealing material includes a region between the first base and the second base, and has a function of bonding the first base and the second base to each other. The structure body includes a region between the first base and the second base, and has a function of keeping a predetermined gap between the first base and the second base. The pixel includes a region surrounded by the first base, the second base, and the sealing material. The pixel includes a display element, a pixel circuit, and a coloring film. The display element is electrically connected to the pixel circuit. The display element includes a region overlapping with the coloring film. The display element includes a layer containing a liquid crystal material. The layer containing a liquid crystal material fills the gap.

With such a structure, a liquid crystal layer of the display element can be provided between the first functional layer including the pixel circuit electrically connected to the display element and the second functional layer including the coloring film including the region overlapping with the display element. Thus, a novel display panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments. Note that in structures of the present invention described below, the same portions or portions having similar functions are denoted by the same reference numerals in different drawings, and a description thereof is not repeated.

Embodiment 1

In this embodiment, a structure of a display panel of one embodiment of the present invention will be described with reference to FIGS. 1A and 1B, FIGS. 2A and 2B, FIGS. 3A and 3B, FIGS. 4A and 4B, and FIG. 5.

Figure 1B:
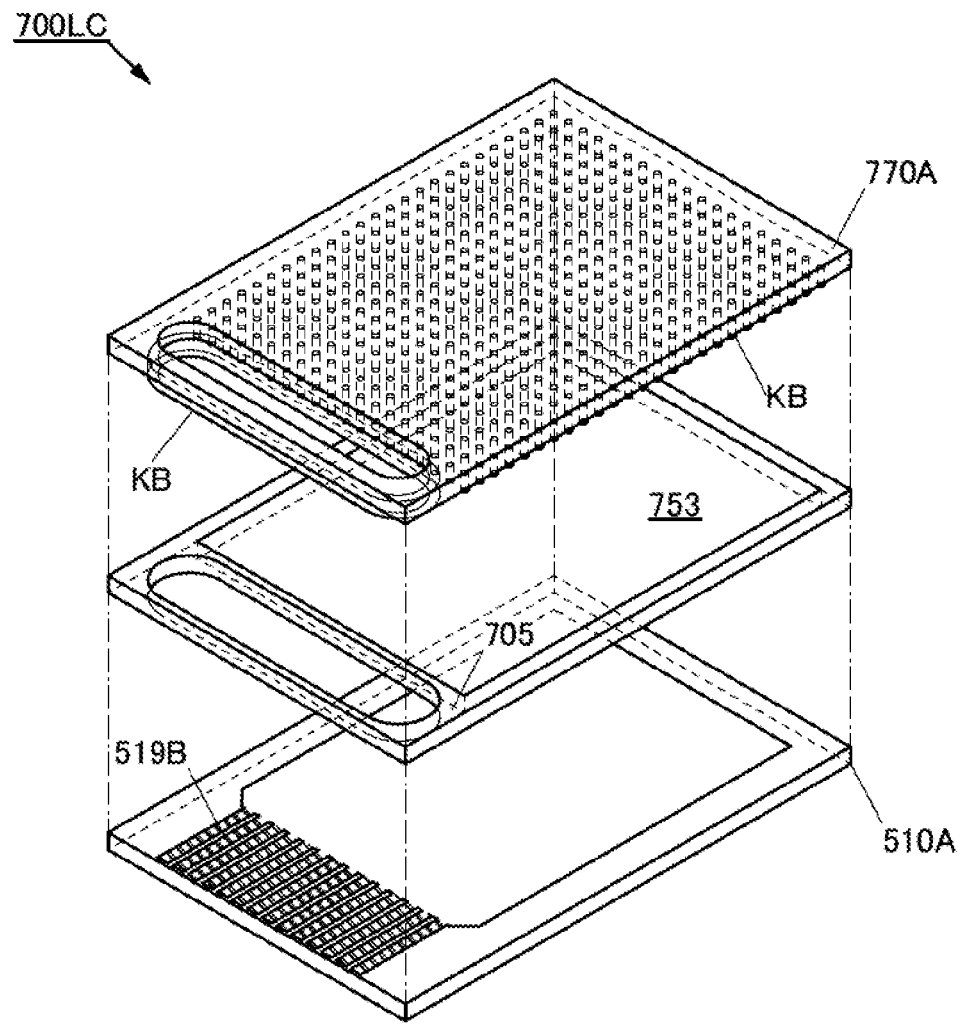

FIGS. 1A and 1B illustrate the structure of the display panel of one embodiment of the present invention. FIG. 1A is a top view of the display panel, and FIG. 1B is an exploded view illustrating the structure of the display panel in FIG. 1A.

Figure 2A:
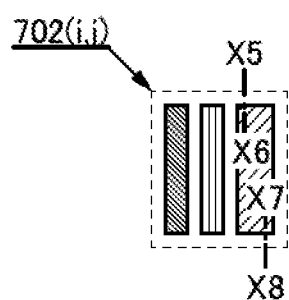
FIGS. 2A and 2B are a top view and a circuit diagram illustrating a structure of a pixel of a display panel of an embodiment.
Figure 2B:
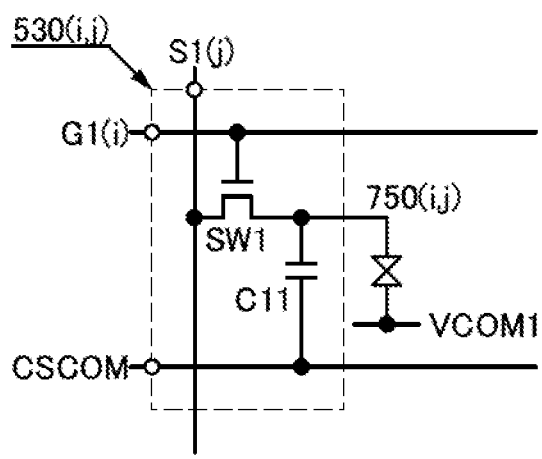

FIGS. 2A and 2B illustrate a structure of a pixel which can be used in the display panel of one embodiment of the present invention. FIG. 2A is a top view of the pixel, and FIG. 2B is a circuit diagram illustrating a structure of a pixel circuit included in the pixel in FIG. 2A.

Figure 3A:
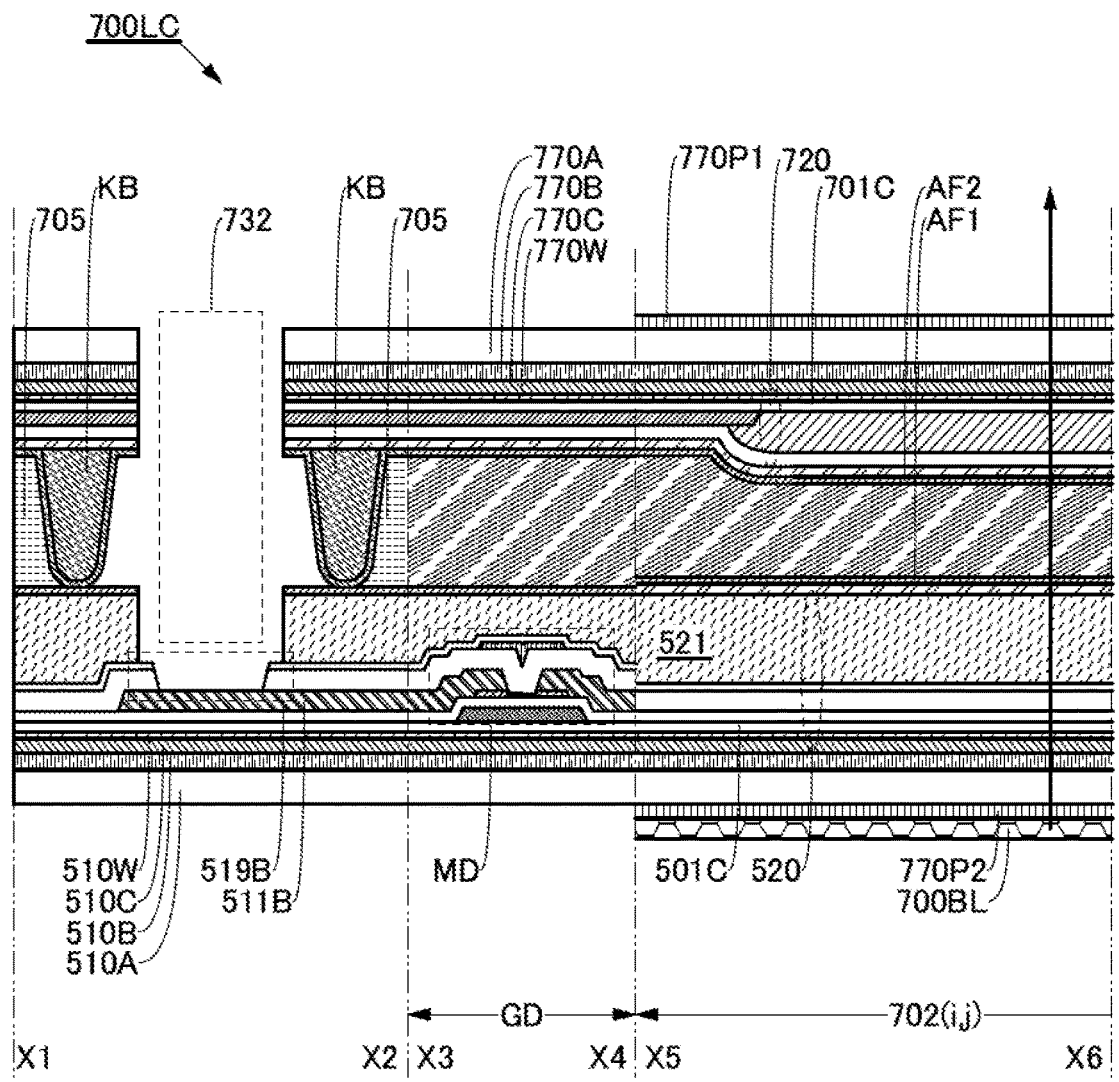
FIGS. 3A and 3B are cross-sectional views illustrating a structure of a display panel of an embodiment.
Figure 3B:
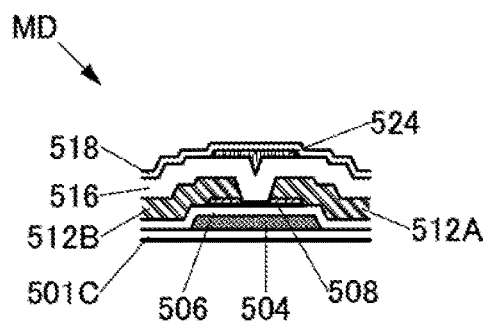

FIGS. 3A and 3B and FIGS. 4A and 4B are cross-sectional views illustrating the structure of the display panel. FIG. 3A is a cross-sectional view taken along cutting plane lines X1-X2 and X3-X4 in FIG. 1A and cutting plane line X5-X6 in FIG. 2A. FIG. 3B illustrates part of FIG. 3A.

Figure 4A:
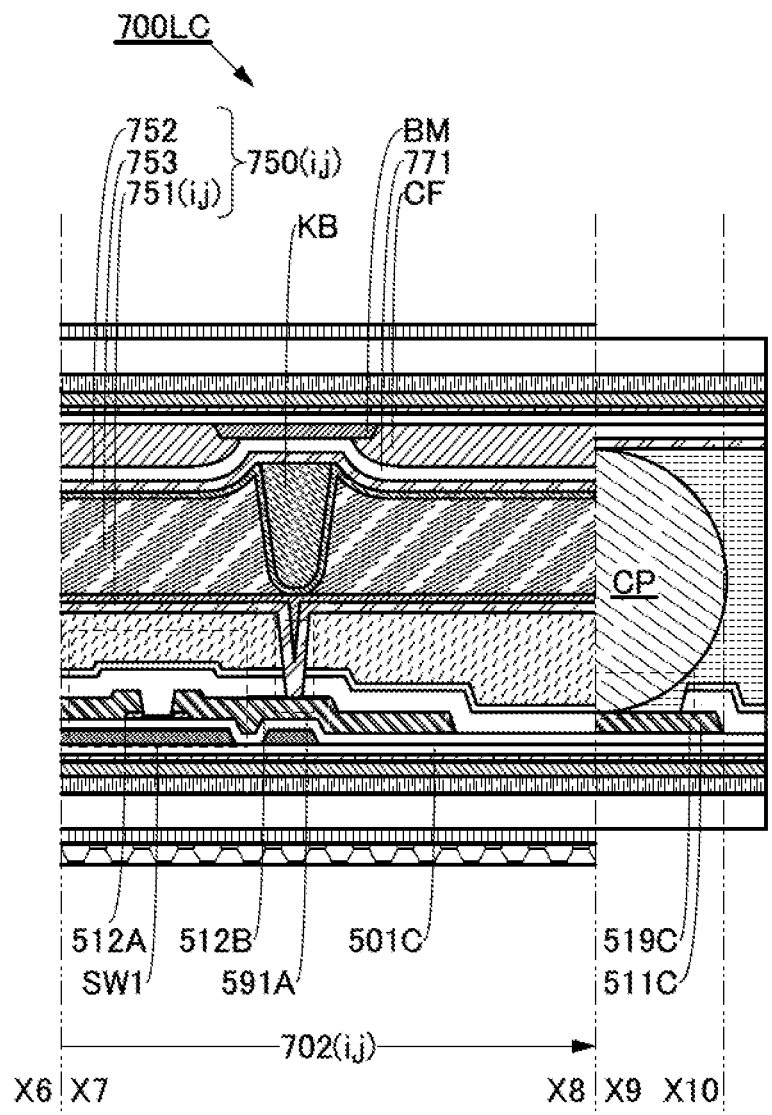
FIGS. 4A and 4B are cross-sectional views illustrating a structure of a display panel of an embodiment.
Figure 4B:
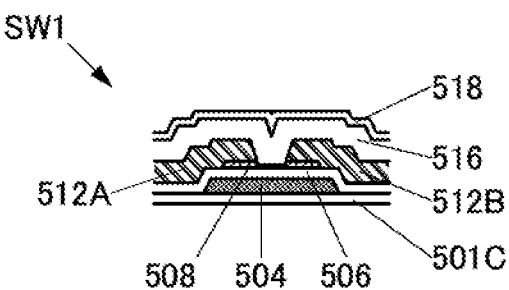

FIG. 4A is a cross-sectional view taken along cutting plane line X7-X8 in FIG. 2A and cutting plane line X9-X10 in FIG. 1A. FIG. 4B illustrates part of FIG. 4A.

Figure 5:
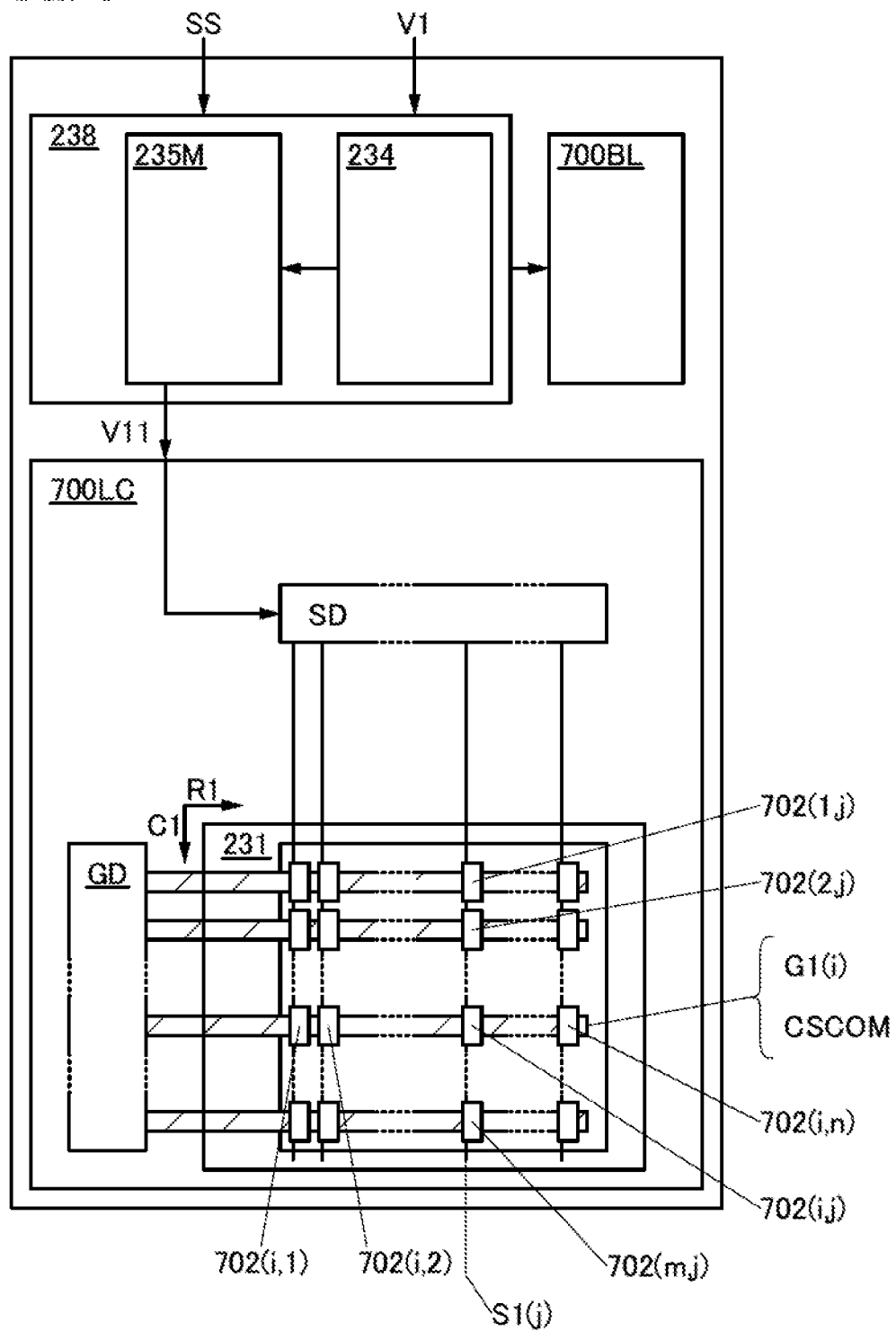
FIG. 5 is a block diagram illustrating a structure of a display panel and a structure of a display device of an embodiment.

FIG. 5 is a block diagram illustrating structures of the display panel of one embodiment of the present invention and a display device including the display panel.

Note that in this specification, an integral variable of 1 or more may be used for reference numerals. For example, "(p)" where p is an integral value of 1 or more may be used for part of a reference numeral that specifies any one of components (p components at a maximum). For another example, "(m, n)" where m and n are each an integral value of 1 or more may be used for part of a reference numeral that specifies any one of components (m×n components at a maximum).

<Structure Example of Display Panel>

A display panel 700LC described in this embodiment includes a base 510A, a base 770A, a functional layer 520, a functional layer 720, a sealing material 705, a structure body KB, and a pixel 70201) (see FIG. 3A and FIG. 4A).

The base 770A includes a region overlapping with the base 510A.

The functional layer 520 includes a region between the base 510A and the base 770A. The functional layer 520 includes a pixel circuit 530($i,j$) and an insulating film 510W. For example, the functional layer 520 includes a switch SW1 included in the pixel circuit 530($i,j$).

The insulating film 510W includes a region between the base 510A and the pixel circuit 530($i,j$) (see FIG. 3A and FIG. 4A). The insulating film 510W has a thickness of greater than or equal to 0.5 μm and less than or equal to 3 μm and a Young's modulus of larger than or equal to 3 GPa and smaller than or equal to 12 GPa. For example, a 2-μm-thick polyimide film can be used as the insulating film 510W.

The functional layer 720 includes a region between the functional layer 520 and the base 770A. The functional layer 720 includes a coloring film CF and an insulating film 770W.

The insulating film 770W includes a region between the base 770A and the coloring film CF. The insulating film 770W has a thickness of greater than or equal to 0.5 μm and less than or equal to 3 μm and a Young's modulus of larger than or equal to 3 GPa and smaller than or equal to 12 GPa. For example, a 2-μm-thick polyimide film can be used as the insulating film 770W.

The sealing material 705 includes a region between the base 510A and the base 770A, and has a function of bonding the base 510A and the base 770A to each other.

The structure body KB includes a region between the base 510A and the base 770A, and has a function of keeping a predetermined gap between the base 510A and the base 770A.

The pixel 702($i,j$) includes a region surrounded by the base 510A, the base 770A, and the sealing material 705. The pixel 702($i,j$) includes a display element 750($i,j$), the pixel circuit 530($i,j$), and the coloring film CF.

The display element 750($i,j$) is electrically connected to the pixel circuit 530($i,j$). The display element 750($i,j$) includes a region overlapping with the coloring film CF. The display element 750($i,j$) includes a layer 753 containing a liquid crystal material.

The layer 753 containing a liquid crystal material fills the gap between the base 510A and the base 770A.

The functional layer 520 described in this embodiment includes the insulating film 510W between the pixel circuit 530($i,j$) and a relieving layer 510C. The functional layer 720 includes the insulating film 770W between the pixel circuit 530($i,j$) and a relieving layer 770C.

The relieving layer 510C has a thickness of greater than or equal to 7 μm and less than or equal to 9.5 μm. The relieving layer 770C has a thickness of greater than or equal to 7 μm and less than or equal to 9.5 μm. For example, an 8-μm-thick acrylic resin can be used for the relieving layer 510C or the relieving layer 770C. Alternatively, polyimide can be used for the reliving layer 510C or the relieving layer 770C.

With such a structure, a liquid crystal layer of the display element can be provided between the first functional layer including the pixel circuit electrically connected to the display element and the second functional layer including the coloring film including the region overlapping with the display element. Thus, a novel display panel that is highly convenient or reliable can be provided.

The display panel 700LC described in this embodiment includes a display region 231 (see FIG. 5).

<<Display Region 231>>

The display region 231 includes a group of pixels 702($i,1$) to 702($i,n$), a different group of pixels 702($i,j$) to 702($m,j$), a scan line G1($i$), and a signal line S1($j$) (see FIG. 5).

The group of pixels 702($i,1$) to 702($i,n$) include the pixel 702($i,j$) and are provided in the row direction (the direction indicated by an arrow R1 in the drawing).

The different group of pixels 702($1,j$) to 702($m,j$) include the pixel 702($i,j$) and are provided in the column direction (the direction indicated by an arrow C1 in the drawing) intersecting the row direction.

The scan line G1($i$) is electrically connected to the group of pixels 702($i,1$) to 702($i,n$).

The signal line S1($j$) is electrically connected to the different group of pixels 702($i,j$) to 702($m,j$).

The group of pixels 702($i,1$) to 702($i,n$) and the different group of pixels 702($i,j$) to 702($m,j$) are provided so that the resolution is higher than or equal to 220 ppi (pixels per inch), preferably higher than or equal to 300 ppi. Alternatively, the group of pixels 702($i,1$) to 702($i,n$) and the different group of pixels 702($i,j$) to 702($m,j$) are preferably provided so that the resolution is higher than or equal to 500 ppi.

The base 510A has a Young's modulus of larger than or equal to 1 GPa and smaller than or equal to 12 GPa. The base 770A has a Young's modulus of larger than or equal to 1 GPa and smaller than or equal to 12 GPa.

With this structure, it is possible to display a high-definition image. Alternatively, toughness against impact accompanying dropping can be increased. Alternatively, coloring layers can be provided to overlap with a plurality of pixels finely provided. Thus, a novel display panel that is highly convenient or reliable can be provided.

Note that the display panel 700LC described in this embodiment can include other components. The above-described components and other components are described in detail below.

The display panel 700LC can include a driver circuit GD and a driver circuit SD (see FIG. 5).

<<Driver Circuit GD>>

The driver circuit GD has a function of supplying a selection signal in accordance with control data.

For example, the driver circuit GD has a function of supplying a selection signal to one scan line at a frequency of 30 Hz or higher, preferably 60 Hz or higher, in accordance with the control data. Accordingly, moving images can be smoothly displayed.

For example, the driver circuit GD has a function of supplying a selection signal to one scan line at a frequency of lower than 30 Hz, preferably lower than 1 Hz, further preferably less than once per minute, in accordance with the control data. Accordingly, a still image can be displayed while flickering is suppressed.

The display panel can include a plurality of driver circuits. For example, in the case where a plurality of driver circuits is provided, one driver circuit and another driver circuit may supply selection signals at different frequencies. Specifically, the selection signal can be supplied at a higher frequency to a region on which a moving image is displayed than to a region on which a still image is displayed. Accordingly, a still image can be displayed in a region with reduced flickering, and moving images can be smoothly displayed in another region.

<<Driver Circuit SD>>

The driver circuit SD has a function of supplying an image signal in accordance with data V11 (see FIG. 5).

The driver circuit SD has a function of generating an image signal and a function of supplying the image signal to a pixel circuit electrically connected to a display element. Specifically, the driver circuit SD has a function of generating a signal whose polarity is inverted. Thus, for example, a liquid crystal display element can be driven.

For example, any of a variety of sequential circuits, such as a shift register, can be used as the driver circuit SD.

For example, an integrated circuit can be used as the driver circuit SD. Specifically, an integrated circuit formed on a silicon substrate can be used as the driver circuit SD.

An integrated circuit can be mounted on a terminal by a chip on glass (COG) method or a chip on film (COF) method, for example. Specifically, an anisotropic conductive film can be used to mount an integrated circuit on the terminal.

<<Structure Example of Pixel>>

The pixel $702(i,j)$ includes part of the functional layer 520 and the display element $750(i,j)$ (see FIG. 3A and FIG. 2B).

<<Functional Layer 520>>

The functional layer 520 includes insulating films and the pixel circuit $530(i,j)$.

The functional layer 520 can also include the driver circuit GD. For example, the driver circuit GD includes a region between an insulating film 501C and an insulating film 521. The driver circuit GD includes a transistor MD, for example (see FIGS. 3A and 3B).

<<Insulating Film 501C, Insulating Film 521, Insulating Film 518, Insulating Film 516, and Insulating Film 510W>>

The functional layer 520 includes, for example, the insulating film 501C, the insulating film 521, an insulating film 518, an insulating film 516, and the insulating film 510W.

The insulating film 501C includes a region between the base 510A and the pixel circuit $530(i,j)$.

The insulating film 521 includes a region between the pixel circuit $530(i,j)$ and the display element $750(i,j)$.

The insulating film 518 includes a region between the insulating film 521 and the pixel circuit $530(i,j)$.

The insulating film 516 includes a region between the insulating film 518 and the pixel circuit $530(i,j)$.

The insulating film 510W includes a region between the insulating film 501C and the base 510A.

<<Pixel Circuit>>

The pixel circuit $530(i,j)$ includes a region between the insulating film 501C and the insulating film 521 (see FIG. 4A and FIG. 3A). For example, the switch SW1 included in the pixel circuit $530(i,j)$ includes a region between the insulating film 501C and the insulating film 521.

The pixel circuit $530(i,j)$ has a function of driving the display element $750(i,j)$ (see FIG. 2B).

A switch, a transistor, a diode, a resistor, an inductor, a capacitor, or the like can be used in the pixel circuit $530(i,j)$.

For example, one or a plurality of transistors can be used for a switch. Alternatively, a plurality of transistors connected in parallel, in series, or in combination of parallel connection and series connection can be used for a switch.

For example, the pixel circuit $530(i,j)$ is electrically connected to the signal line $S1(j)$, the scan line $G1(i)$, and a wiring CSCOM (see FIG. 2B). Note that a conductive film 512A is electrically connected to the signal line $S1(j)$, and a conductive film 512B is electrically connected to the display element $750(i,j)$ (see FIG. 2B and FIG. 4A).

The pixel circuit $530(i,j)$ includes the switch SW1 and a capacitor C11 (see FIG. 2B).

For example, a transistor including a gate electrode electrically connected to the scan line $G1(i)$ and a first electrode electrically connected to the signal line $S1(j)$ can be used as the switch SW1.

The capacitor C11 includes a first electrode electrically connected to a second electrode of the transistor used as the switch SW1 and a second electrode electrically connected to the wiring CSCOM.

A first electrode $751(i,j)$ of the display element $750(i,j)$ is electrically connected to the second electrode of the transistor used as the switch SW1. A second electrode 752 of the display element $750(i,j)$ is electrically connected to a wiring VCOM1. Thus, the display element $750(i,j)$ can be driven.

<<Functional Layer 720>>

The functional layer 720 includes insulating films, the coloring film CF, and a light-blocking film BM. Note that a proximity sensor can be included in the functional layer 720, for example (see FIGS. 3A and 3B).

<<Insulating Film 701C, Insulating Film 771, and Insulating Film 770W>>

The functional layer 720 includes an insulating film 701C, an insulating film 771, and the insulating film 770W.

The insulating film 701C includes a region between the base 770A and the display element $750(i,j)$.

The insulating film 771 includes a region between the coloring film CF and the layer 753 containing a liquid crystal material or between the light-blocking film BM and the layer 753 containing a liquid crystal material. Thus, unevenness due to the thickness of the coloring film CF can be reduced. Furthermore, the insulating film 771 can prevent impurities from diffusing from the light-blocking film BM, the coloring film CF, or the like to the layer 753 containing a liquid crystal material.

The insulating film 770W includes a region between the insulating film 701C and the base 770A.

<<Coloring Film CF>>

The coloring film CF includes a region between the display element $750(i,j)$ and the insulating film 701C. The coloring film CF includes a region overlapping with the display element $750(i,j)$ (see FIG. 3A and FIG. 4A).

<<Light-Blocking Film BM>>

The light-blocking film BM includes an opening in a region overlapping with the display element $750(i,j)$ (see FIG. 4A). The opening partly overlaps with the coloring film CF.

<<Display Element $750(i,j)$>>

A liquid crystal display element can be used as the display element $750(i,j)$. Specifically, a transmissive liquid crystal display element can be used as the display element $750(i,j)$. Alternatively, a transflective liquid crystal display element or a reflective liquid crystal display element can be used as the display element $750(i,j)$.

The display element 750(i,j) includes the first electrode 751(i,j), the second electrode 752, and the layer 753 containing a liquid crystal material. The second electrode 752 is positioned such that an electric field which controls the alignment of the liquid crystal material is generated between the second electrode 752 and the first electrode 751(i,j) (see FIG. 3A and FIG. 4A).

The first display element 750(i,j) includes an alignment film AF1 and an alignment film AF2. The alignment film AF2 includes a region provided so that the layer 753 containing a liquid crystal material is positioned between the alignment film AF2 and the alignment film AF1.

<<Terminal and the Like>>

The display panel described in this embodiment includes a terminal 519B (see FIG. 3A). The terminal 519B is electrically connected to the pixel circuit 530(i,j) and includes a region overlapping with the base 510A.

The base 770A does not overlap with the terminal 519B (see FIGS. 1A and 1B and FIG. 3A). For example, the base 770A can have an opening in a region overlapping with the terminal 519B.

The sealing material 705 does not overlap with the terminal 519B (see FIG. 1B and FIG. 3A). For example, the sealing material 705 can have an opening in a region overlapping with the terminal 519B.

The structure body KB does not overlap with the terminal 519B and includes a region between the sealing material 705 and a region overlapping with the terminal 519B. In other words, the structure body KB includes a region between the sealing material 705 and an opening 732 over the terminal 519B and (see FIG. 3A). For example, the structure body KB can have a ring-like shape so as to surround a region overlapping with the terminal 519B. Alternatively, the structure body KB can have a shape including a region between the sealing material 705 and the region overlapping with the terminal 519B. Note that a connection which is electrically connected to the terminal 519B can be provided in the region.

Thus, the terminal can be exposed. Alternatively, in the case where the sealing material is formed using a fluid material, the sealing material can be formed with the use of the shape of the structure body as a mold. Consequently, a novel display panel that is highly convenient or reliable can be provided.

The display panel described in this embodiment includes a terminal 519C (see FIG. 4A).

The terminal 519B includes a conductive film 511B (see FIG. 3A). The terminal 519B is electrically connected to the signal line S1(j), for example.

The terminal 519C includes a conductive film 511C (see FIG. 4A). The conductive film 511C is electrically connected to the wiring VCOM1, for example.

A conductive material CP is positioned between the terminal 519C and the second electrode 752, and has a function of electrically connecting the terminal 519C and the second electrode 752. For example, a conductive particle can be used as the conductive material CP.

<<Functional Films>>

The display panel described in this embodiment includes a functional film 770P1 and a functional film 770P2. The functional film 770P1 and the functional film 770P2 each include a region overlapping with the display element 750(i,j). The functional film 770P2 includes a region in which the display element 750(i,j) is sandwiched by the functional film 770P2 and the functional film 770P1.

<<Adhesive Layer 510B and Adhesive Layer 770B>>

The display panel 700LC includes an adhesive layer 510B and an adhesive layer 770B.

The adhesive layer 510B includes a region between the base 510A and the functional layer 520, and has a function of bonding the base 510A and the functional layer 520 to each other.

The adhesive layer 770B includes a region between the base 770A and the functional layer 720, and has a function of bonding the base 770A and the functional layer 720 to each other.

<Example of Components>

Individual components of the display panel 700LC will be described below. Note that these components cannot be clearly distinguished and one component may also serve as another component or include part of another component.

The display panel 700LC includes the base 510A, the base 770A, the structure body KB, the sealing material 705, the adhesive layer 510B, and the adhesive layer 770B.

The display panel 700LC includes the functional layer 520, the pixel circuit, the insulating film 501C, the insulating film 521, the insulating film 518, and the insulating film 516.

The display panel 700LC includes the functional layer 720, the coloring film CF, the light-blocking film BM, the insulating film 701C, and the insulating film 771.

The display panel 700LC includes the scan line G1(i), the signal line S1(j), and the wiring CSCOM.

The display panel 700LC includes the terminal 519B, the terminal 519C, the conductive film 511B, and the conductive film 511C.

The display panel 700LC includes the pixel circuit 530(i,j) and the switch SW1.

The display panel 700LC includes the display element 750(i,j), the first electrode 751(i,j), the layer 753 containing a liquid crystal material, and the second electrode 752.

The display panel 700LC includes the alignment film AF1, the alignment film AF2, the functional film 770P1, and the functional film 770P2.

The display panel 700LC includes the driver circuit GD and the driver circuit SD.

<<Base 510A and Base 770A>>

A material having heat resistance high enough to withstand heat treatment in the manufacturing process can be used for the base 510A or the base 770A. For example, a material with a thickness of greater than or equal to 0.1 mm and less than or equal to 0.7 mm can be used for the base 510A or the base 770A. Specifically, a material polished to a thickness of approximately 0.1 mm can be used.

For example, a large-sized glass substrate having any of the following sizes can be used as the base 510A or the base 770A: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 510A or the base 770A, an organic material, an inorganic material, a composite material of an organic material and an inorganic material, or the like can be used. For example, an inorganic material such as glass, ceramic, or metal can be used for the base 510A or the base 770A.

Specifically, non-alkali glass, soda-lime glass, potash glass, crystal glass, aluminosilicate glass, tempered glass, chemically tempered glass, quartz, sapphire, or the like can be used for the base 510A or the base 770A. Specifically, an inorganic oxide film, an inorganic nitride film, an inorganic oxynitride film, or the like can be used for the base 510A or the base 770A. For example, a silicon oxide film, a silicon nitride film, a silicon oxynitride film, an aluminum oxide film, or the like can be used for the base 510A or the base 770A. Stainless steel, aluminum, or the like can be used for the base 510A or the base 770A.

For example, a single crystal semiconductor substrate or a polycrystalline semiconductor substrate of silicon or silicon carbide, a compound semiconductor substrate of silicon germanium or the like, an SOI substrate, or the like can be used for the base 510A or the base 770A. Thus, a semiconductor element can be provided over the base 510A or the base 770A.

For example, an organic material such as a resin, a resin film, or plastic can be used for the base 510A or the base 770A. Specifically, a resin film or a resin plate of polyester, polyolefin, polyamide, polyimide, polycarbonate, an acrylic resin, or the like can be used for the base 510A or the base 770A.

For example, a composite material formed by attaching a metal plate, a thin glass plate, or a film of an inorganic material to a resin film or the like can be used for the base 510A or the base 770A. For example, a composite material formed by dispersing a fibrous or particulate metal, glass, an inorganic material, or the like into a resin film can be used for the base 510A or the base 770A. For example, a composite material formed by dispersing a fibrous or particulate resin, an organic material, or the like into an inorganic material can be used for the base 510A or the base 770A.

Furthermore, a single-layer material or a layered material in which a plurality of layers are stacked can be used for the base 510A or the base 770A. For example, a layered material in which a base, an insulating film that prevents diffusion of impurities contained in the base, and the like are stacked can be used for the base 510A or the base 770A. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the base 510A or the base 770A. Alternatively, a layered material in which a resin and a film for preventing diffusion of impurities that penetrate the resin, such as a silicon oxide film, a silicon nitride film, or a silicon oxynitride film, are stacked can be used for the base 510A or the base 770A.

Specifically, a resin film, a resin plate, a layered material, or the like of polyester, polyolefin, polyamide, polyimide, polycarbonate, an acrylic resin, or the like can be used for the base 510A or the base 770A.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the base 510A or the base 770A. Specifically, polyethylene terephthalate (PET), polyethylene naphthalate (PEN), polyethersulfone (PES), or the like can be used for the base 510A or the base 770A.

Alternatively, a material with low birefringence can be used for the base 510A or the base 770A. Specifically, a resin film of a cyclic olefin polymer (COP), a cyclic olefin copolymer (COC), triacetyl cellulose (TAC), or the like can be used for the base 510A or the base 770A.

Alternatively, paper, wood, or the like can be used for the base 510A or the base 770A.

For example, a flexible substrate can be used for the base 510A or the base 770A.

Note that a transistor, a capacitor, or the like can be directly formed on the substrate. Alternatively, a transistor, a capacitor, or the like formed on a process substrate which can withstand heat applied in the manufacturing process can be transferred to the base 510A or the base 770A. Thus, a transistor, a capacitor, or the like can be formed over a flexible substrate, for example.

In the case where a display element that controls the transmittance of light transmitting the base 510A is used as the display element 750$(i,j)$, a light-transmitting material can be used for the base 510A.

In the case where a display element that controls the transmittance of light transmitting the base 770A is used as the display element 750$(i,j)$, a light-transmitting material can be used for the base 770A.

For example, aluminosilicate glass, tempered glass, chemically tempered glass, sapphire, or the like can be favorably used for the base 770A that is on a side closer to a user of the display panel. This can prevent breakage or damage of the display panel caused by the use. Furthermore, the weight can be reduced. Alternatively, for example, the display device can be made less likely to suffer from damage by dropping or the like.

For example, a material with a Young's modulus of larger than or equal to 1 GPa and smaller than or equal to 12 GPa can be used for the base 510A or the base 770A. Specifically, a resin material with a Young's modulus of larger than or equal to 1 GPa and smaller than or equal to 12 GPa can be used for the base 510A or the base 770A. Thus, the weight can be further reduced. Alternatively, for example, the display device can be made less likely to suffer from damage by dropping or the like.

<<Adhesive Layer 510B and Adhesive Layer 770B>>

A material that transmits visible light can be used for the adhesive layer 510B or the adhesive layer 770B.

For example, an inorganic material, an organic material, a composite material of an inorganic material and an organic material, or the like can be used for the adhesive layer 510B or the adhesive layer 770B.

For example, an organic material such as a thermally fusible resin or a curable resin can be used for the adhesive layer 510B or the adhesive layer 770B. Alternatively, an organic material such as an adhesive resin can be used for the adhesive layer 510B or the adhesive layer 770B. Specifically, an adhesive whose fluidity is inhibited and which is formed in a single wafer shape in advance (also referred to as a sheet-like adhesive) can be used for the adhesive layer 510B or the adhesive layer 770B.

For example, an organic material such as a reactive curable adhesive, a photocurable adhesive, a thermosetting adhesive, and/or an anaerobic adhesive can be used for the adhesive layer 510B or the adhesive layer 770B.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the adhesive layer 510B or the adhesive layer 770B.

<<Insulating Film 501C and Insulating Film 701C>>

For example, an insulating inorganic material, an insulating organic material, or an insulating composite material containing an inorganic material and an organic material can be used for the insulating film 501C or the insulating film 701C.

Specifically, an inorganic oxide film, an inorganic nitride film, an inorganic oxynitride film, or a material in which any of these films are stacked can be used for the insulating film 501C or the insulating film 701C. For example, a film including any of a silicon oxide film, a silicon nitride film, a silicon oxynitride film, an aluminum oxide film, and the like, or a film including a layered material obtained by stacking any of these films can be used for the insulating film 501C or the insulating film 701C.

Specifically, polyester, polyolefin, polyamide, polyimide, polycarbonate, polysiloxane, an acrylic resin, or a stacked or composite material including resins selected from these, or the like can be used for the insulating film 501C or the insulating film 701C. Alternatively, a photosensitive material may be used.

Specifically, a material containing silicon and oxygen can be used for the insulating film 501C or the insulating film 701C. Thus, diffusion of impurities into the pixel circuit, the first display element, or the like can be suppressed.

For example, a 200-nm-thick film containing silicon, oxygen, and nitrogen can be used as the insulating film 501C or the insulating film 701C.

<<Insulating Film 510W, Insulating Film 770W, Relieving Layer 510C, and Relieving Layer 770C>>

For example, an organic material such as a resin, a resin film, or plastic can be used for the insulating film 510W, the insulating film 770W, the relieving layer 510C, or the relieving layer 770C. Specifically, a resin film or a resin plate of polyester, polyolefin, polyamide, polyimide, polycarbonate, an acrylic resin, or the like can be used for the insulating film 510W, the insulating film 770W, the relieving layer 510C, or the relieving layer 770C.

For example, a composite material formed by attaching a metal plate, a thin glass plate, or a film of an inorganic material to a resin film or the like can be used for the insulating film 510W, the insulating film 770W, the relieving layer 510C, or the relieving layer 770C. For example, a composite material formed by dispersing a fibrous or particulate metal, glass, an inorganic material, or the like into a resin film can be used for the insulating film 510W, the insulating film 770W, the relieving layer 510C, or the relieving layer 770C. For example, a composite material formed by dispersing a fibrous or particulate resin, an organic material, or the like into an inorganic material can be used for the insulating film 510W, the insulating film 770W, the relieving layer 510C, or the relieving layer 770C.

Furthermore, a single-layer material or a layered material in which a plurality of layers are stacked can be used for the insulating film 510W, the insulating film 770W, the relieving layer 510C, or the relieving layer 770C. For example, a layered material in which a base, an insulating film that prevents diffusion of impurities contained in the base, and the like are stacked can be used for the insulating film 510W, the insulating film 770W, the relieving layer 510C, or the relieving layer 770C. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the insulating film 510W, the insulating film 770W, the relieving layer 510C, or the relieving layer 770C. Alternatively, a layered material in which a resin and a film for preventing diffusion of impurities that penetrate the resin, such as a silicon oxide film, a silicon nitride film, or a silicon oxynitride film, are stacked can be used for the insulating film 510W, the insulating film 770W, the relieving layer 510C, or the relieving layer 770C.

Specifically, a resin film, a resin plate, a layered material, or the like of polyester, polyolefin, polyamide, polyimide, polycarbonate, an acrylic resin, or the like can be used for the insulating film 510W, the insulating film 770W, the relieving layer 510C, or the relieving layer 770C.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the insulating film 510W, the insulating film 770W, the relieving layer 510C, or the relieving layer 770C. Specifically, polyethylene terephthalate (PET), polyethylene naphthalate (PEN), polyethersulfone (PES), or the like can be used for the insulating film 510W, the insulating film 770W, the relieving layer 510C, or the relieving layer 770C.

Alternatively, a material with low birefringence can be used for the insulating film 510W, the insulating film 770W, the relieving layer 510C, or the relieving layer 770C. Specifically, a resin film of a cyclic olefin polymer (COP), a cyclic olefin copolymer (COC), triacetyl cellulose (TAC), or the like can be used for the insulating film 510W, the insulating film 770W, the relieving layer 510C, or the relieving layer 770C.

For example, a material with a thickness of greater than or equal to 0.5 µm and less than or equal to 3 µm can be used for the insulating film 510W or the insulating film 770W. For example, a material with a Young's modulus of larger than or equal to 3 GPa and smaller than or equal to 12 GPa can be used for the insulating film 510W or the insulating film 770W.

Specifically, a film that includes polyimide and has a thickness of greater than or equal to 0.5 µm and less than or equal to 3 µm can be used for the insulating film 510W or the insulating film 770W. Thus, damage to the functional layer 520 or the functional layer 720 can be prevented in the manufacturing process of the display panel.

For example, a material with a thickness of greater than or equal to 7 µm and less than or equal to 9.5 µm can be used for the relieving layer 510C or the relieving layer 770C. Specifically, acrylic can be used for the relieving layer 510C or the relieving layer 770C.

<<Structure Body KB>>

The structure body KB or the like can be formed using an organic material, an inorganic material, or a composite material of an organic material and an inorganic material. Accordingly, a predetermined gap can be kept between components between which the structure body KB and the like are provided.

Specifically, for the structure body KB, polyester, polyolefin, polyamide, polyimide, polycarbonate, polysiloxane, an acrylic resin, or the like, or a composite material of a plurality of resins selected from these can be used. Alternatively, a photosensitive material may be used.

<<Sealing Material 705>>

For the sealing material 705 or the like, an inorganic material, an organic material, a composite material of an inorganic material and an organic material, or the like can be used.

For example, an organic material such as a thermally fusible resin or a curable resin can be used for the sealing material 705 or the like.

For example, an organic material such as a reactive curable adhesive, a photocurable adhesive, a thermosetting adhesive, and/or an anaerobic adhesive can be used for the sealing material 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the sealing material 705 or the like.

<<Insulating Film 521>>

For example, an insulating inorganic material, an insulating organic material, or an insulating composite material containing an inorganic material and an organic material can be used for the insulating film 521 or the like.

Specifically, an inorganic oxide film, an inorganic nitride film, an inorganic oxynitride film, or a material obtained by stacking any of these films can be used as the insulating film 521 or the like. For example, a film including any of a silicon oxide film, a silicon nitride film, a silicon oxynitride film, an aluminum oxide film, and the like, or a film including a layered material obtained by stacking any of these films can be used for the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<<Wiring, Terminal, and Conductive Film>>

A conductive material can be used for the wiring or the like. Specifically, the conductive material can be used for the signal line S1(j), the scan line G1(i), the wiring CSCOM, the terminal 519B, the terminal 519C, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecular can be used for the wiring or the like.

Note that the terminal 519B can be electrically connected to a flexible printed board or the like using a conductive material such as an anisotropic conductive film, for example.

<<Display Element 750(i,j)>>

For example, a display element having a function of controlling transmission or reflection of light can be used as the display element 750(i,j). For example, a combined structure of a polarizing plate and a liquid crystal element or a MEMS shutter display element can be used.

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The display element 750(i,j) includes the first electrode 751(i,j), the second electrode 752, and the layer 753 containing a liquid crystal material. The layer 753 containing a liquid crystal material contains a liquid crystal material whose orientation is controlled by voltage applied between the first electrode 751(i,j) and the second electrode 752. For example, the orientation of the liquid crystal material can be controlled by an electric field in the thickness direction (also referred to as the vertical direction) or an electric field in the direction that intersects the vertical direction (also referred to as the horizontal direction or the diagonal direction) of the layer 753 containing a liquid crystal material.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer 753 containing a liquid crystal material. Alternatively, a liquid crystal material which exhibits a cholesteric phase, a smectic phase, a cubic phase, a chiral nematic phase, an isotropic phase, or the like can be used. Alternatively, a liquid crystal material which exhibits a blue phase can be used.

<<First Electrode 751(i,j)>>

For example, any of the materials that can be used for the wiring or the like can be used for the first electrode 751(i,j). Specifically, a reflective film can be used for the first electrode 751(i,j). For example, a material in which a light-transmitting conductive film and a reflective film having an opening are stacked can be used for the first electrode 751(i,j).

<<Second Electrode 752>>

For example, any of the materials that can be used for the wiring or the like can be used for the second electrode 752. For example, a light-transmitting material selected from the materials that can be used for the wiring or the like can be used for the second electrode 752.

For example, a conductive oxide, a metal film thin enough to transmit light, a metal nanowire, or the like can be used for the second electrode 752.

Specifically, a conductive oxide containing indium can be used for the second electrode 752. Alternatively, a metal thin film with a thickness of greater than or equal to 1 nm and less than or equal to 10 nm can be used for the second electrode

752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

The alignment film AF1 or the alignment film AF2 can be formed using a material containing polyimide or the like, for example. Specifically, a material formed by rubbing treatment or an optical alignment technique such that a liquid crystal material has a predetermined alignment can be used.

For example, a film containing soluble polyimide can be used for the alignment film AF1 or the alignment film AF2. In this case, the temperature required in forming the alignment film AF1 or the alignment film AF2 can be low. As a result, damage to other components caused when the alignment film AF1 or the alignment film AF2 is formed can be reduced.

<<Coloring Film CF>>

A material that transmits light of a predetermined color can be used for the coloring film CF. In that case, the coloring film CF can be used as a color filter, for example. For example, a material that transmits blue light, green light, or red light can be used for the coloring film CF. Furthermore, a material that transmits yellow light, white light, or the like can be used for the coloring film CF.

<<Light-Blocking Film BM>>

For example, a material that suppresses light transmission can be used for the light-blocking film BM. Thus, the light-blocking film BM can be used as, for example, a black matrix.

Specifically, a resin containing a pigment or dye can be used for the light-blocking film BM. For example, a resin in which carbon black is dispersed can be used for the blocking film BM.

Alternatively, an inorganic compound, an inorganic oxide, a composite oxide containing a solid solution of a plurality of inorganic oxides, or the like can be used for the light-blocking film BM. Specifically, a black chromium film, a film containing cupric oxide, or a film containing copper chloride or tellurium chloride can be used for the light-blocking film BM.

<<Insulating Film 771>>

The insulating film 771 can be formed of polyimide, an epoxy resin, an acrylic resin, or the like.

<<Functional Films 770P1 and 770P2>>

An anti-reflection film, a polarizing film, a retardation film, a light diffusion film, a condensing film, or the like can be used as the functional film 770P1 or the functional film 770P2, for example.

Alternatively, an antistatic film preventing the attachment of a foreign substance, a water repellent film suppressing the attachment of stain, a hard coat film suppressing a scratch in use, or the like can be used as the functional film 770P1.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed in the same process as the semiconductor film of the transistor which can be used as the switch SW1 can be used.

As the transistor MD, a transistor having a different structure from the transistor that can be used as the switch SW1 can be used, for example. Specifically, a transistor including a conductive film 524 can be used as the transistor MD (see FIG. 3B).

<<Transistor>>

For example, semiconductor films formed at the same step can be used for transistors in the driver circuit and the pixel circuit.

As the transistor in the driver circuit or the pixel circuit, a bottom-gate transistor or a top-gate transistor can be used, for example.

A manufacturing line for a bottom-gate transistor including amorphous silicon as a semiconductor can be easily remodeled into a manufacturing line for a bottom-gate transistor including an oxide semiconductor as a semiconductor, for example. Furthermore, for example, a manufacturing line for a top-gate transistor including polysilicon as a semiconductor can be easily remodeled into a manufacturing line for a top-gate transistor including an oxide semiconductor as a semiconductor. In any reconstruction, a conventional manufacturing line can be effectively used.

For example, a transistor including a semiconductor containing an element belonging to Group 14 for a semiconductor film can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature for forming a transistor using polysilicon as a semiconductor is lower than the temperature for forming a transistor using single crystal silicon as a semiconductor.

In addition, the transistor using polysilicon as a semiconductor has higher field-effect mobility than the transistor using amorphous silicon as a semiconductor, and therefore a pixel including the transistor using polysilicon can have a high aperture ratio. Moreover, pixels arranged at very high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

Alternatively, a transistor including a compound semiconductor can be used. Specifically, a semiconductor containing gallium arsenide can be used for a semiconductor film.

Alternatively, a transistor including an organic semiconductor can be used. Specifically, an organic semiconductor containing any of polyacenes and graphene can be used for a semiconductor film.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a smaller leakage current in an off state than a transistor using amorphous silicon for a semiconductor film can be used. Specifically, a transistor using an oxide semiconductor for a semiconductor film can be used.

Thus, a pixel circuit can hold an image signal for a longer time than a pixel circuit including a transistor using amorphous silicon for a semiconductor film. Specifically, the selection signal can be supplied at a frequency of lower than 30 Hz, preferably lower than 1 Hz, further preferably less than once per minute while flickering is suppressed. Consequently, fatigue on a user of a data processing device can be reduced, and power consumption for driving can be reduced.

For example, a transistor including a semiconductor film 508, a conductive film 504, the conductive film 512A, and the conductive film 512B can be used as the switch SW1 (see FIG. 4B). An insulating film 506 includes a region between the semiconductor film 508 and the conductive film 504.

The conductive film 504 includes a region overlapping with the semiconductor film 508. The conductive film 504 functions as a gate electrode. The insulating film 506 functions as a gate insulating film.

The conductive films 512A and 512B are electrically connected to the semiconductor film 508. The conductive film 512A functions as one of a source electrode and a drain electrode, and the conductive film 512B functions as the other of the source electrode and the drain electrode.

Furthermore, a transistor including the conductive film 524 can be used as the transistor included in the driver circuit or the pixel circuit (see FIG. 3B). The conductive film 524 includes a region provided so that the semiconductor film 508 is positioned between the conductive film 524 and the conductive film 504. The insulating film 516 includes a region between the conductive film 524 and the semiconductor film 508. For example, the conductive film 524 can be electrically connected to a wiring supplying the same potential as that supplied to the conductive film 504.

A conductive film in which a 10-nm-thick film containing tantalum and nitrogen and a 300-nm-thick film containing copper are stacked can be used as the conductive film 504, for example. The film containing copper includes a region provided so that the film containing tantalum and nitrogen is positioned between the film containing copper and the insulating film 506.

A material in which a 400-nm-thick film containing silicon and nitrogen and a 200-nm-thick film containing silicon, oxygen, and nitrogen are stacked can be used for the insulating film 506, for example. Note that the film containing silicon and nitrogen includes a region provided so that the film containing silicon, oxygen, and nitrogen is positioned between the film containing silicon and nitrogen and the semiconductor film 508.

A 25-nm-thick film containing indium, gallium, and zinc can be used as the semiconductor film 508, for example.

For example, a conductive film in which a 50-nm-thick film containing tungsten, a 400-nm-thick film containing aluminum, and a 100-nm-thick film containing titanium are stacked in this order can be used as the conductive film 512A or the conductive film 512B. Note that the film containing tungsten includes a region in contact with the semiconductor film 508.

Note that this embodiment can be combined with any of the other embodiments in this specification as appropriate.

Embodiment 2

In this embodiment, a structure of a display device of one embodiment of the present invention is described with reference to FIG. 5.

FIG. 5 is a block diagram illustrating the structure of the display device one embodiment of the present invention.
<Structure Example of Display Device>

The display device described in this embodiment includes a control portion 238, a backlight 700BL, and the display panel 700LC (see FIG. 5).

<<Control Portion 238>>

The control portion 238 has a function of receiving image data V1 and control data SS.

The control portion 238 has a function of generating the data V11 in accordance with the image data V1. The control portion 238 has a function of supplying the data V11. The control portion 238 also has a function of controlling the backlight 700BL in accordance with the control data SS.

For example, the control portion 238 can have a function of supplying a control signal for controlling a color of light emitted from the backlight 700BL. Specifically, the control portion 238 has a function of supplying a control signal for emitting red light, a control signal for emitting green light, or a control signal for emitting blue light. Alternatively, the control portion 238 can have a function of supplying, in synchronization with the control signal, second data V12 corresponding to a color of light emitted from the backlight 700BL. Specifically, the control portion 238 supplies, in synchronization with the control signal for emitting red light, data on red contained in the image data V1 as the second data V12. Alternatively, the control portion 238 supplies, in synchronization with the control signal for emitting green light, data on green contained in the image data V1 as the second data V12. Alternatively, the control portion 238 supplies, in synchronization with the control signal for emitting blue light, data on blue contained in the image data V1 as the second data V12. In this manner, a color image can be displayed by time division using a successive additive color mixing method (a field sequential method).

For example, the control portion 238 includes an expansion circuit 234 and an image processing circuit 235M.

<<Backlight 700BL>>

The backlight 700BL has a function of emitting light to the display panel 700LC. Specifically, a white light-emitting diode, a white organic EL element, or the like can be used.

Alternatively, a plurality of light-emitting diodes emitting different colors can be used as the backlight 700BL, for example. Specifically, a red light-emitting diode, a green light-emitting diode, and a blue light-emitting diode can be used as the backlight 700BL. The backlight 700BL can have a function of emitting light of a different color depending on the control signal supplied by the control portion 238. In this manner, a color image can be displayed by time division using a successive additive color mixing method (a field sequential method).

<<Display Panel 700LC>>

The display panel 700LC has a function of receiving the data V11. The display panel 700LC includes the pixel 702($i,j$).

The display element 750($i,j$) has a function of displaying an image on the basis of the data V11.

For example, the display panel described in Embodiment 1 can be used for the display device of this embodiment.

<<Expansion Circuit 234>>

The expansion circuit 234 has a function of expanding the image data V1 which is supplied in a compressed state. The expansion circuit 234 includes a memory portion. The memory portion has a function of storing expanded image data, for example.

<<Image Processing Circuit 235M>>

The image processing circuit 235M includes a region, which has a function of storing data contained in the image data V1, for example.

The image processing circuit 235M has a function of correcting the image data V1 on the basis of a predetermined characteristic curve to generate the data V11. Specifically, the image processing circuit 235M has a function of generating the data V11 so that the display element displays a high-quality image.

Note that this embodiment can be combined with any of the other embodiments in this specification as appropriate.

Embodiment 3

In this embodiment, a structure of a display panel 700 of one embodiment of the present invention will be described with reference to FIGS. 6A to 6C, FIGS. 7A and 7B, FIGS. 8A and 8B, FIGS. 9A and 9B, FIG. 10, FIG. 11, and FIG. 12.

Figure 6A:
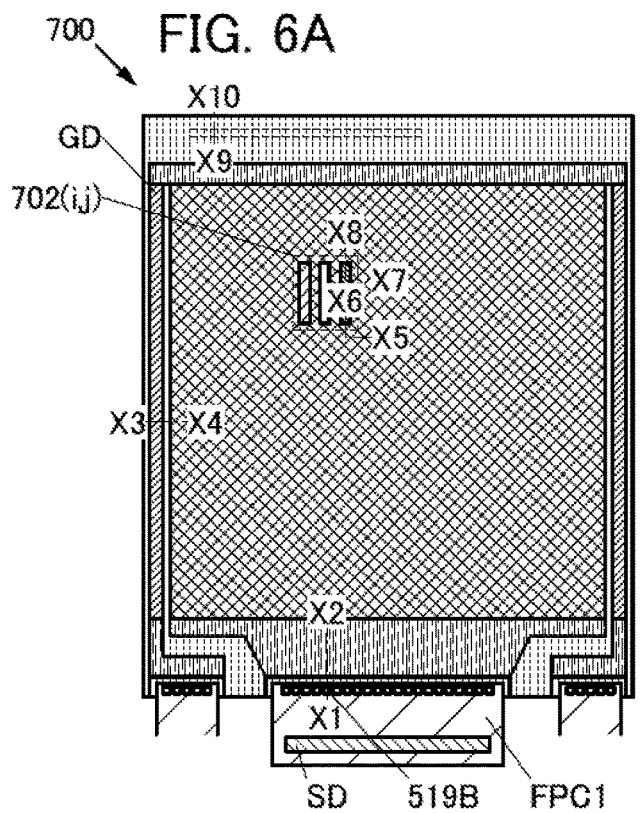
FIGS. 6A to 6C are top views illustrating a structure of a display panel of an embodiment.
Figure 6B:
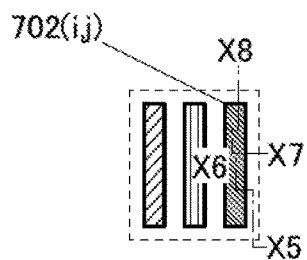
Figure 6C:
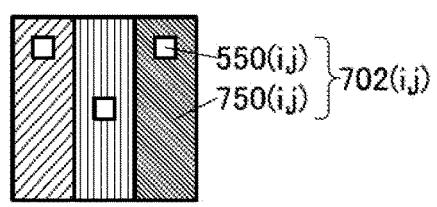

FIGS. 6A to 6C illustrate the structure of the display panel of one embodiment of the present invention. FIG. 6A is a top view of the display panel, and FIG. 6B is a top view illustrating part of a pixel of the display panel in FIG. 6A. FIG. 6C is a schematic view illustrating the structure of the pixel illustrated in FIG. 6B.

Figure 7A:
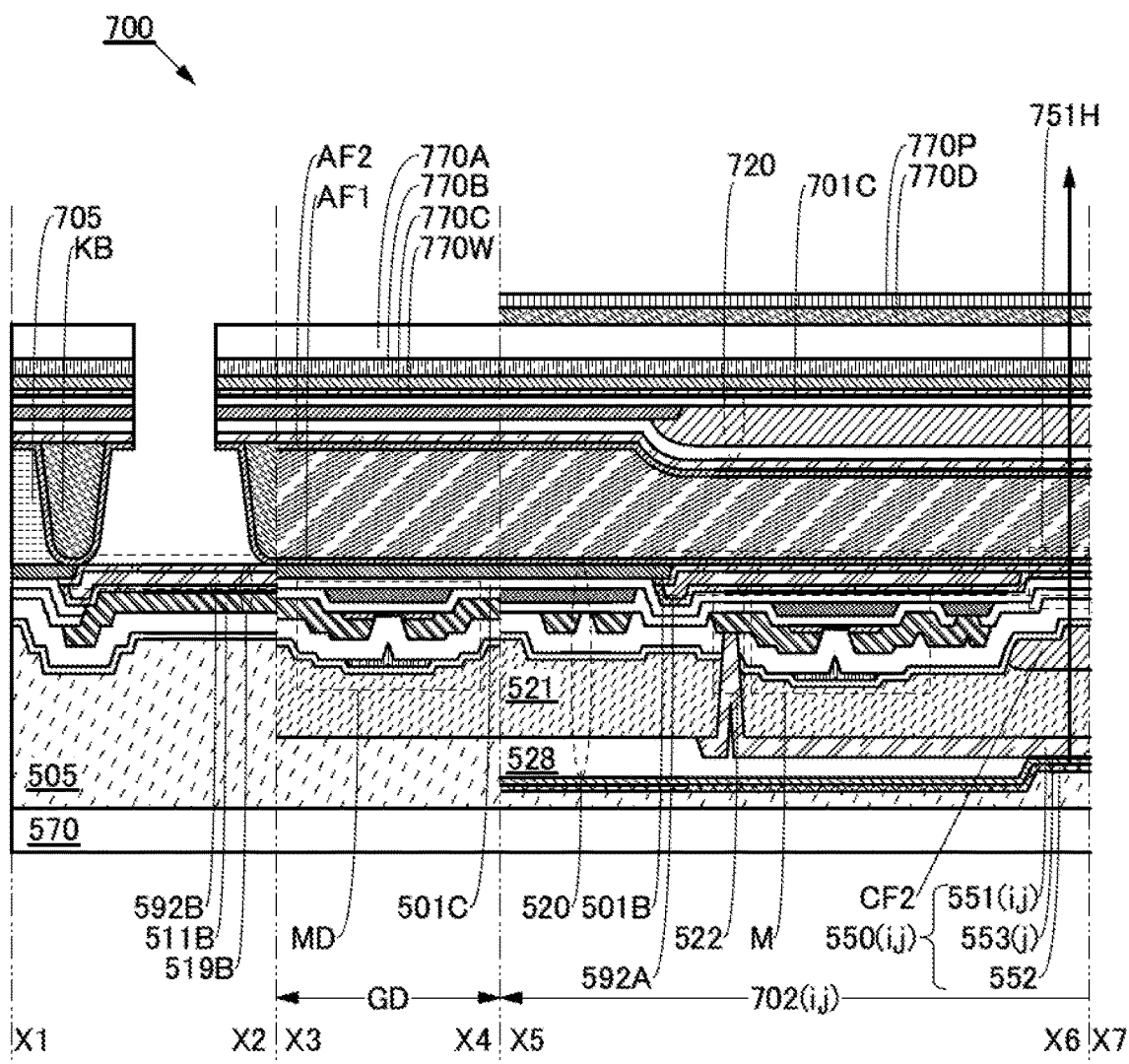
FIGS. 7A and 7B are cross-sectional views illustrating a structure of a display panel of an embodiment.
Figure 7B:
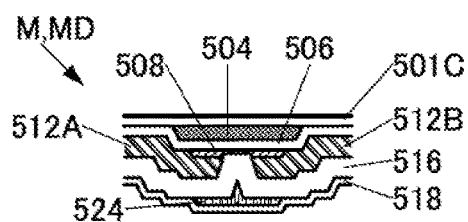

FIGS. 7A and 7B and FIGS. 8A and 8B are cross-sectional views illustrating the structure of the display panel. FIG. 7A is a cross-sectional view taken along cutting plane lines X1-X2, X3-X4, and X5-X6 in FIG. 6A. FIG. 7B illustrates part of FIG. 7A.

Figure 8A:
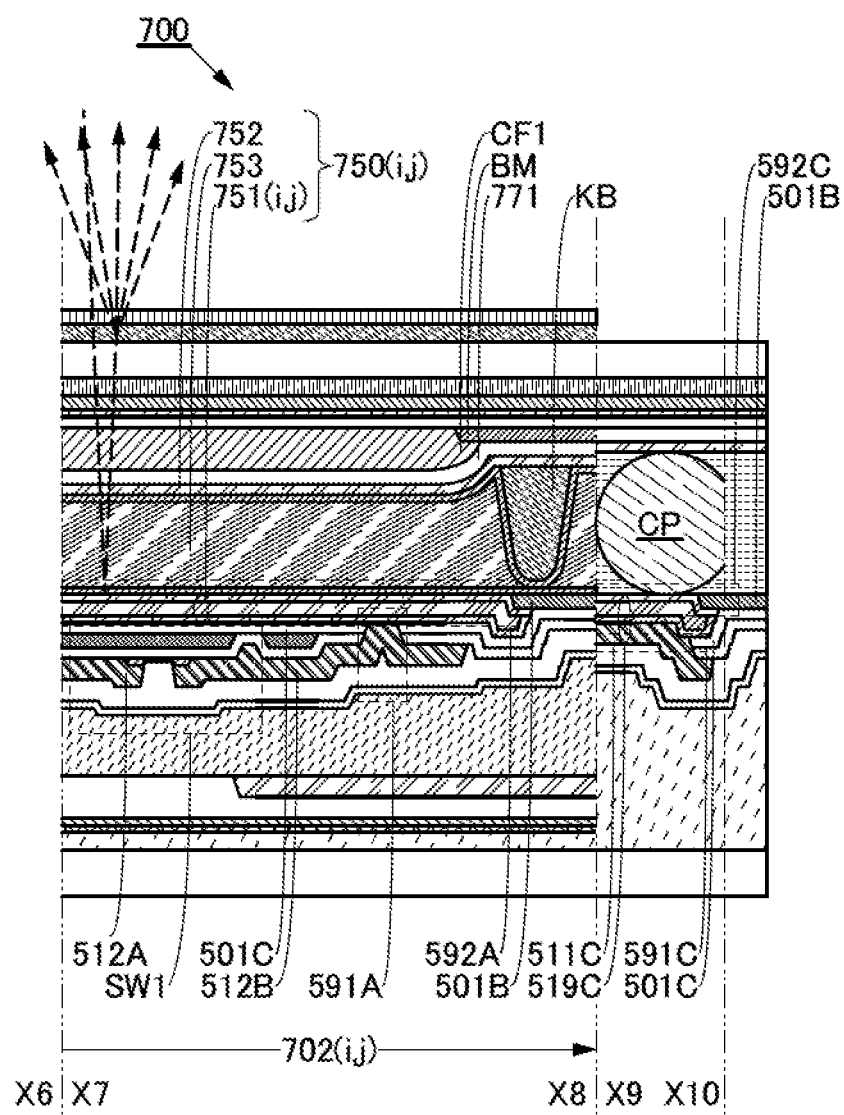
FIGS. 8A and 8B are cross-sectional views illustrating a structure of a display panel of an embodiment.
Figure 8B:
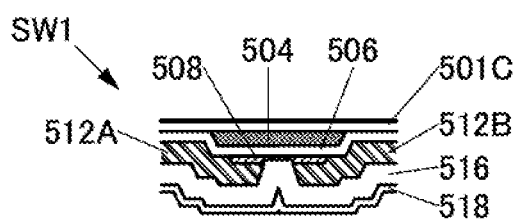

FIG. 8A is a cross-sectional view taken along cutting plane lines X7-X8 and X9-X10 in FIG. 6A. FIG. 8B illustrates part of FIG. 8A.

Figure 9A:
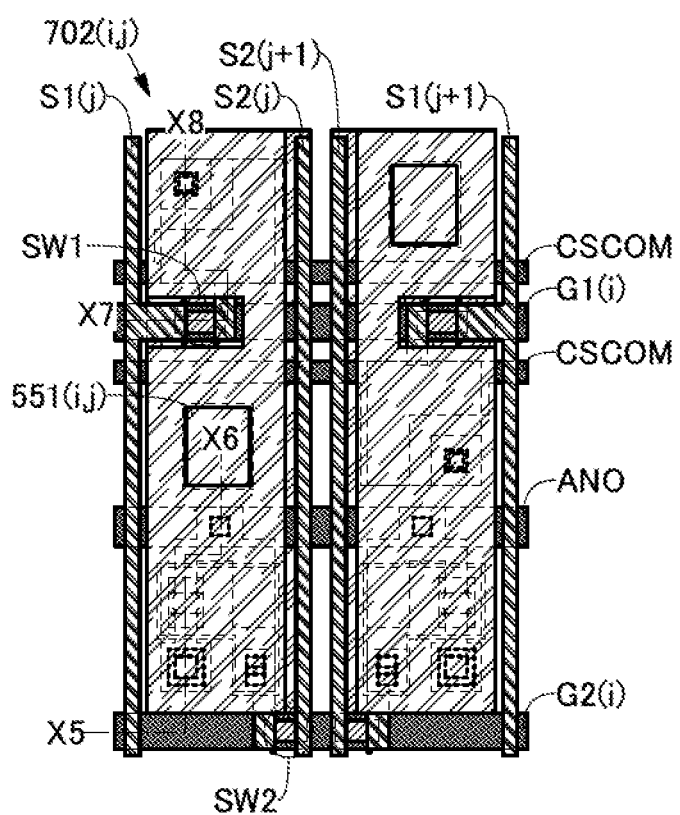
FIGS. 9A and 9B are bottom views illustrating a structure of a display panel of an embodiment.
Figure 9B:
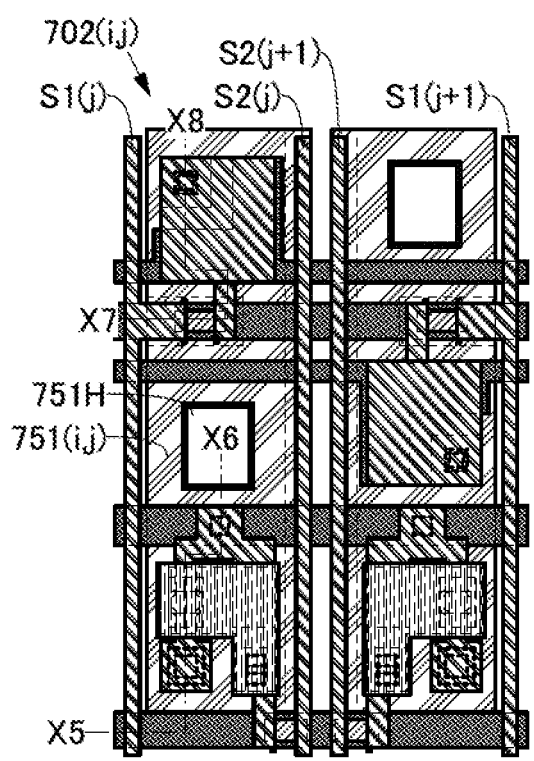

FIG. 9A is a bottom view illustrating part of the pixel of the display panel in FIG. 6B. FIG. 9B is a bottom view illustrating part of the structure in FIG. 9A in which some components are omitted.

Figure 10:
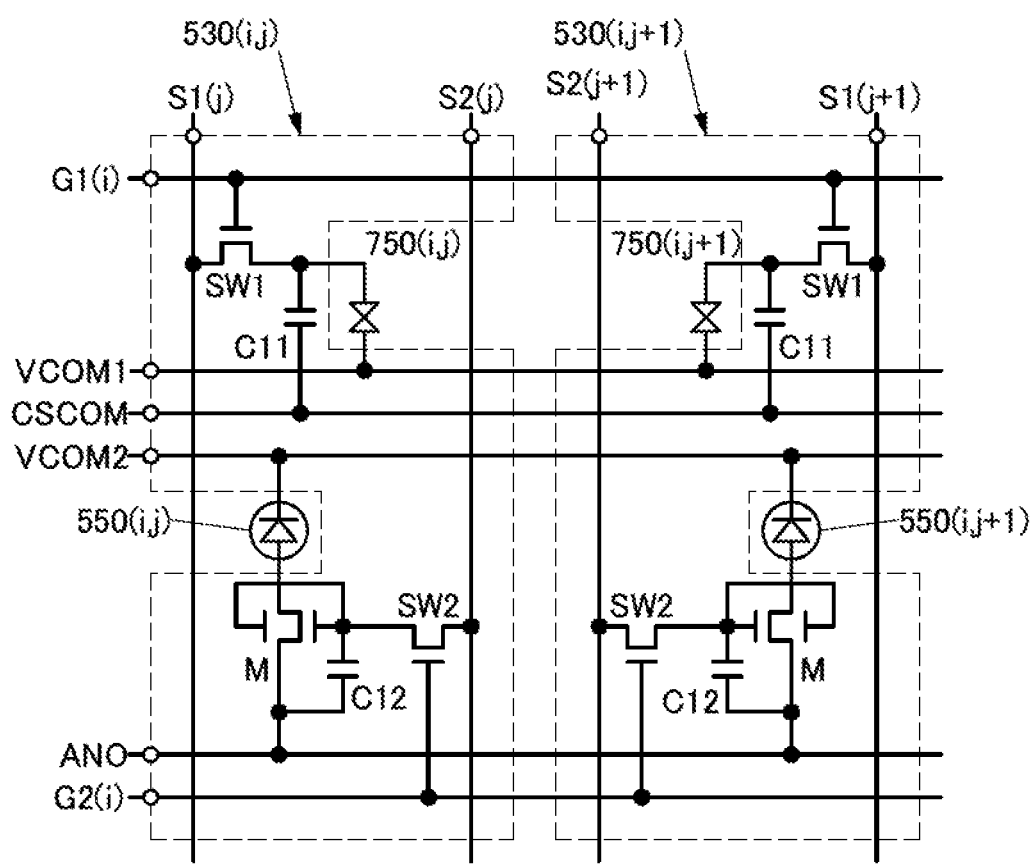
FIG. 10 is a circuit diagram illustrating a pixel circuit of a display panel of an embodiment.

FIG. 10 is a circuit diagram illustrating a structure of a pixel circuit included in the display panel of one embodiment of the present invention.

Figure 11:
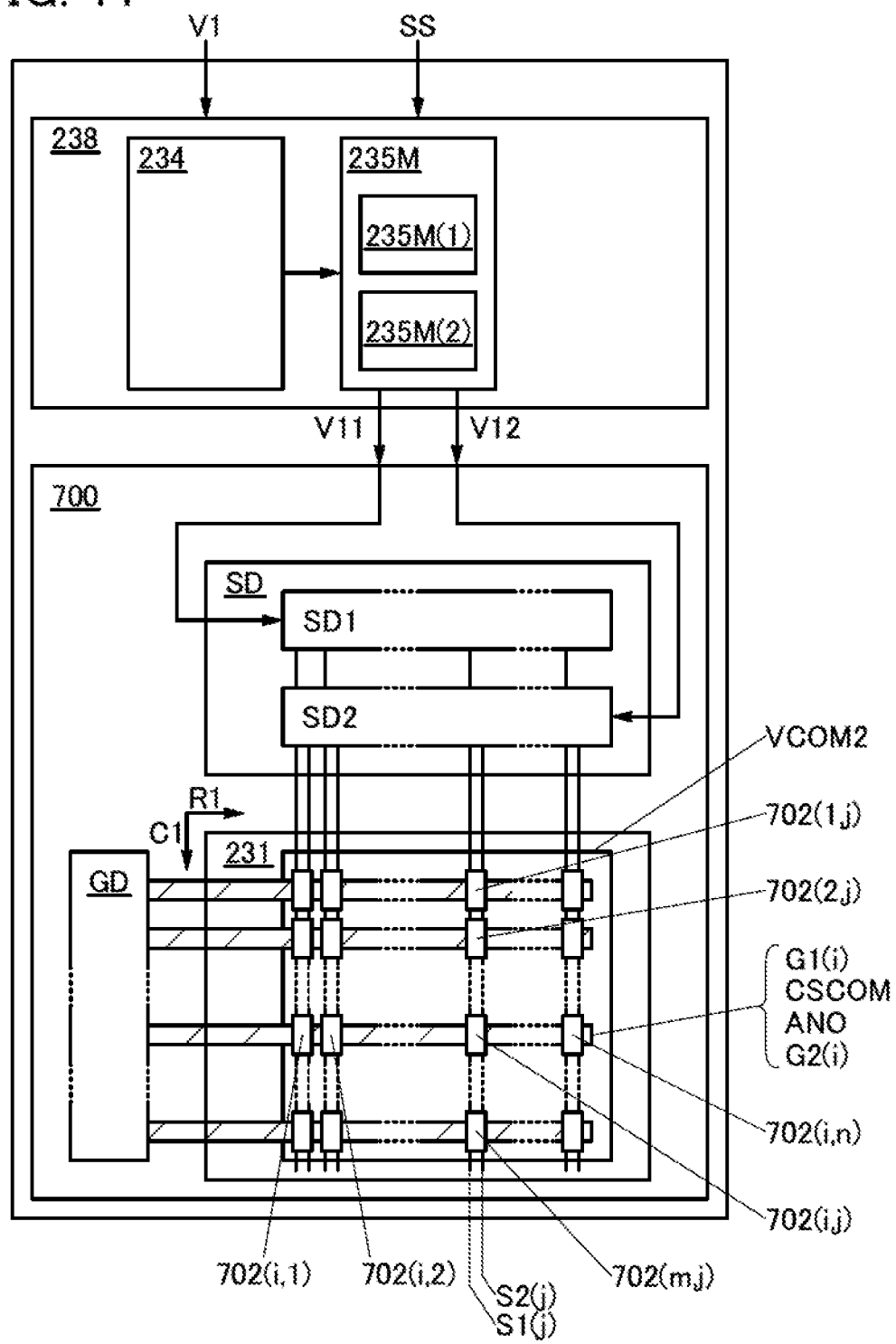
FIG. 11 is a block diagram illustrating a structure of a display panel and a structure of a display device of an embodiment.

FIG. 11 is a block diagram illustrating structures of the display panel of one embodiment of the present invention and a display device including the display panel.

Figure 12:
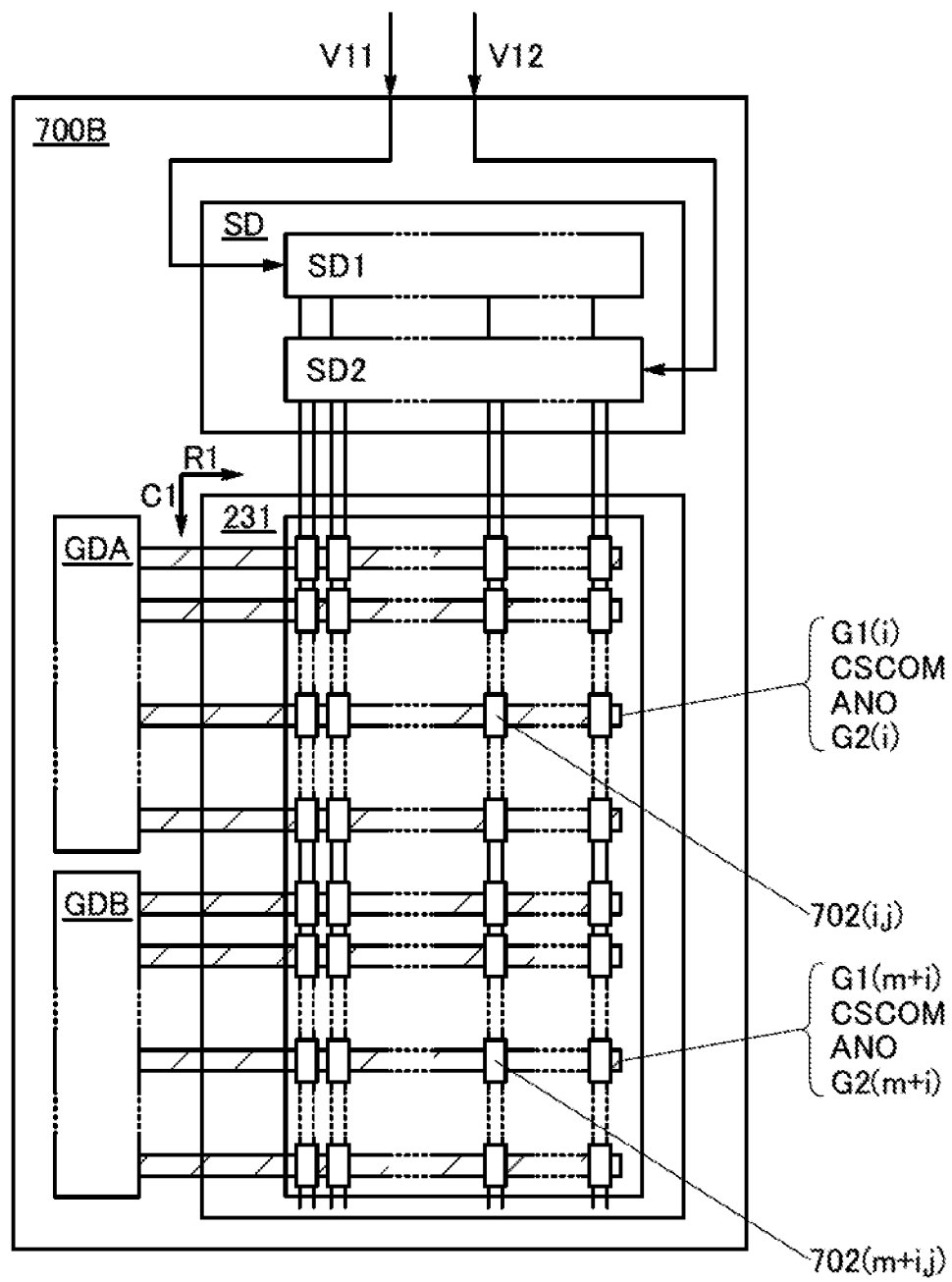
FIG. 12 is a block diagram illustrating a structure of a display panel of an embodiment.

FIG. 12 is a block diagram illustrating the structure of the display panel of one embodiment of the present invention. The structure of the display panel illustrated in the block diagram of FIG. 12 is different from that in FIG. 11.

The display panel described in this embodiment is different from the display panel 700LC, which is described with reference to FIGS. 1A and 1B, FIGS. 2A and 2B, FIGS. 3A and 3B, and FIGS. 4A and 4B, in that the pixel $702(i,j)$ includes a second display element $550(i,j)$ and that a reflective liquid crystal display element is used as the first display element $750(i,j)$. Here, the different portions will be described in detail, and the above description is referred to for the other similar portions.

<Structure Example of Display Panel>

The pixel $702(i,j)$ in the display panel 700 described in this embodiment includes a first conductive film, a second conductive film, the insulating film 501C, the pixel circuit $530(i,j)$, the first display element $750(i,j)$, and the second display element $550(i,j)$.

The second conductive film includes a region overlapping with the first conductive film.

The insulating film 501C includes a region between the first conductive film and the second conductive film. The insulating film 501C has an opening 591A.

The first conductive film is electrically connected to the first display element $750(i,j)$.

The second conductive film is electrically connected to the first conductive film in the opening 591A. The second conductive film is electrically connected to the pixel circuit $530(i,j)$.

The second display element $550(i,j)$ is electrically connected to the pixel circuit $530(i,j)$ and configured to emit light toward the insulating film 501C. The second display element $550(i,j)$ is provided so that an image displayed using the second display element $550(i,j)$ can be seen in part of a range where an image displayed using the first display element $750(i,j)$ is seen.

Thus, the first display element and the second display element that displays an image using a method different from that of the first display element can be driven using pixel circuits that can be formed in the same process. Furthermore, using the insulating film, impurity diffusion between the first display element and the second display element or between the first display element and the pixel circuit can be suppressed. Thus, a novel display panel that is highly convenient or reliable can be provided.

The display panel 700 described in this embodiment includes the display region 231 (see FIG. 11).

<<Display Region 231>>

The display region 231 includes the group of pixels $702(i,1)$ to $702(i,n)$, the different group of pixels $702(i,j)$ to $702(m,j)$, the scan line G1($i$), and the signal line S1($j$) (see FIG. 11 or FIG. 12). The display region 231 includes a scan line G2($i$), the wiring CSCOM, a conductive film ANO, and a signal line S2($j$). Note that i is an integer greater than or equal to 1 and less than or equal to m, j is an integer greater than or equal to 1 and less than or equal to n, and each of m and n is an integer greater than or equal to 1.

The group of pixels $702(i,1)$ to $702(i,n)$ include the pixel $702(i,1)$ and are arranged in the row direction (the direction indicated by the arrow R1 in the drawing).

The different group of pixels $702(1,j)$ to $702(m,j)$ include the pixel $702(i,1)$ and are provided in the column direction (the direction indicated by the arrow C1 in the drawing) intersecting the row direction.

The scan line G1($i$) and the scan line G2($i$) are electrically connected to the group of pixels $702(i,1)$ to $702(i,n)$ provided in the row direction.

The signal line S1($j$) and the signal line S2($j$) are electrically connected to the different group of pixels $702(1,j)$ to $702(m,j)$ provided in the column direction.

<<Driver Circuit GD>>

The driver circuit GD has a function of supplying a selection signal in accordance with the control data.

For example, the driver circuit GD has a function of supplying a selection signal to one scan line at a frequency of 30 Hz or higher, preferably 60 Hz or higher, in accordance with the control data. Accordingly, moving images can be smoothly displayed.

For example, the driver circuit GD has a function of supplying a selection signal to one scan line at a frequency of lower than 30 Hz, preferably lower than 1 Hz, further preferably less than once per minute, in accordance with the control data. Accordingly, a still image can be displayed while flickering is suppressed.

For example, in the case where a plurality of driver circuits is provided, driver circuits GDA and GDB may supply selection signals at different frequencies (see FIG. 12). Specifically, the selection signal can be supplied at a higher frequency to a region on which a moving image is displayed than to a region on which a still image is displayed. Accordingly, a still image can be displayed in a region with reduced flickering, and moving images can be smoothly displayed in another region.

<<Driver Circuit SD>>

The driver circuit SD includes a driver circuit SD1 and a driver circuit SD2. The driver circuit SD1 has a function of supplying an image signal in accordance with the data V11. The driver circuit SD2 has a function of supplying an image signal in accordance with the data V12 (see FIG. 11).

The driver circuit SD1 or the driver circuit SD2 has a function of generating an image signal and a function of supplying the image signal to a pixel circuit electrically connected to a display element. Specifically, the driver circuit SD1 or the driver circuit SD2 has a function of generating a signal whose polarity is inverted. Thus, for example, a liquid crystal display element can be driven.

For example, any of a variety of sequential circuits, such as a shift register, can be used as the driver circuit SD.

For example, an integrated circuit in which the driver circuit SD1 and the driver circuit SD2 are integrated can be used as the driver circuit SD. Specifically, an integrated circuit formed on a silicon substrate can be used as the driver circuit SD.

An integrated circuit can be mounted on a terminal by a chip on glass (COG) method or a chip on film (COF) method, for example. Specifically, an anisotropic conductive film can be used to mount an integrated circuit on the terminal.

<<Structure Example of Pixel>>

The pixel $702(i,1)$ includes a portion of the functional layer 520, the first display element $750(i,j)$, and the second display element $550(i,j)$ (see FIG. 7A and FIG. 8A).

<<Functional Layer 520>>

The functional layer 520 includes the first conductive film, the second conductive film, the insulating film, and the pixel circuit $530(i,j)$ (see FIGS. 7A and 7B and FIG. 10).

The functional layer 520 includes a region between the base 570 and the base 770A.

The functional layer 520 can include the driver circuit GD. For example, the driver circuit GD includes a region between the insulating film 501C and the insulating film 521. The driver circuit GD includes the transistor MD, for example (see FIGS. 7A and 7B).

The functional layer 520 can include a coloring film CF2.

<<Insulating Film 501C, Insulating Film 528, Insulating Film 521, Insulating Film 518, and Insulating Film 516>>

The functional layer 520 includes, for example, the insulating film 501C, an insulating film 528, the insulating film 521, the insulating film 518, and the insulating film 516.

The insulating film 521 includes a region between the pixel circuit $530(i,j)$ and the second display element $550(i,j)$.

The insulating film 528 includes a region between the insulating film 521 and the base 570 and has an opening in a region overlapping with the second display element $550(i,j)$. The insulating film 528 formed along the periphery of a third electrode $551(i,j)$ can prevent a short circuit between the third electrode $551(i,j)$ and a fourth electrode 552.

The insulating film 518 includes a region between the insulating film 521 and the pixel circuit $530(i,j)$.

The insulating film 516 includes a region between the insulating film 518 and the pixel circuit $530(i,j)$.

<<Insulating Film 501C>>

The insulating film 501C includes a region positioned between the first conductive film and the second conductive film and has the opening 591A (see FIG. 8A). In addition, the insulating film 501C has an opening 591C.

<<Insulating Film 501B>>

The display panel described in this embodiment includes an insulating film 501B (see FIG. 7A).

The insulating film 501B has a first opening 592A, a second opening 592B, and an opening 592C (see FIG. 7A and FIG. 8A).

The first opening 592A includes a region overlapping with the first electrode $751(i,j)$ or a region overlapping with the insulating film 501C.

The second opening 592B includes a region overlapping with the conductive film 511B.

Furthermore, the opening 592C includes a region overlapping with the conductive film 511C.

<<First Conductive Film>>

The first conductive film is electrically connected to the first display element. Specifically, the first conductive film is electrically connected to the first electrode $751(i,j)$. For example, the first electrode $751(i,j)$ of the first display element $750(i,j)$ can be used as the first conductive film.

<<Second Conductive Film>>

The second conductive film includes a region overlapping with the first conductive film. The second conductive film is electrically connected to the first conductive film in the opening 591A. For example, the conductive film 512B can be used as the second conductive film. Note that the first conductive film electrically connected to the second conductive film in the opening 591A that is formed in the insulating film 501C can be referred to as a through electrode.

The second conductive film is electrically connected to the pixel circuit $530(i,j)$. For example, a conductive film which functions as a source electrode or a drain electrode of a transistor used as the switch SW1 of the pixel circuit $530(i,j)$ can be used as the second conductive film.

<<Pixel Circuit>>

The pixel circuit $530(i,j)$ has a function of driving the first display element $750(i,j)$ and the second display element $550(i,j)$ (see FIG. 10).

Thus, the first display element and the second display element that displays an image using a method different from that of the first display element can be driven using pixel circuits that can be formed in the same process. Specifically, a reflective display element is used as the first display element, whereby the power consumption can be reduced. In addition, an image with high contrast can be favorably displayed in an environment with bright external light. Moreover, the second display element which emits light is used, whereby an image can be favorably displayed in a dark environment. Furthermore, using the insulating film, impurity diffusion between the first display element and the second display element or between the first display element and the pixel circuit can be suppressed. Consequently, a novel display device that is highly convenient or reliable can be provided.

A switch, a transistor, a diode, a resistor, an inductor, a capacitor, or the like can be used in the pixel circuit $530(i,j)$.

For example, one or a plurality of transistors can be used for a switch. Alternatively, a plurality of transistors connected in parallel, in series, or in combination of parallel connection and series connection can be used for a switch.

For example, the pixel circuit $530(i,j)$ is electrically connected to the signal line $S1(j)$, the signal line $S2(j)$, the scan line $G1(i)$, the scan line $G2(i)$, the wiring CSCOM, and the third conductive film ANO (see FIG. 10). Note that the conductive film 512A is electrically connected to the signal line $S1(j)$ (see FIG. 8A and FIG. 10).

The pixel circuit $530(i,j)$ includes the switch SW1 and the capacitor C11 (see FIG. 10).

The pixel circuit $530(i,j)$ includes a switch SW2, a transistor M, and the capacitor C12.

For example, a transistor including a gate electrode electrically connected to the scan line G1(i) and a first electrode electrically connected to the signal line S1(j) can be used as the switch SW1.

The capacitor C11 includes a first electrode electrically connected to a second electrode of the transistor used as the switch SW1 and a second electrode electrically connected to the wiring CSCOM.

For example, a transistor including a gate electrode electrically connected to the scan line G2(i) and a first electrode electrically connected to the signal line S2(j) can be used for the switch SW2.

The transistor M includes a gate electrode electrically connected to a second electrode of the transistor used as the switch SW2 and a first electrode electrically connected to the third conductive film ANO.

Note that a transistor including a conductive film provided such that a semiconductor film is interposed between a gate electrode and the conductive film can be used as the transistor M. For example, as the conductive film, a conductive film electrically connected to a wiring that can supply the same potential as that of the gate electrode of the transistor M can be used.

The capacitor C12 includes a first electrode electrically connected to the second electrode of the transistor used as the switch SW2 and a second electrode electrically connected to the first electrode of the transistor M.

The first electrode of the first display element $750(i,j)$ is electrically connected to the second electrode of the transistor used for the switch SW1. The second electrode of the first display element $750(i,j)$ is electrically connected to the wiring VCOM1. This enables the first display element $750(i,j)$ to be driven.

Furthermore, the third electrode $551(i,j)$ and the fourth electrode 552 of the second display element $550(i,j)$ are electrically connected to the second electrode of the transistor M and a fourth conductive film VCOM2, respectively. This enables the second display element $550(i,j)$ to be driven.

<<Functional Layer 720>>

The functional layer 720 includes insulating films, a coloring film CF1, and the light-blocking film BM. Note that a proximity sensor can be included in the functional layer 720, for example (see FIG. 7A).

<<Insulating Film 701C, Insulating Film 771, and Insulating Film 770W>>

The functional layer 720 includes the insulating film 701C, the insulating film 771, and the insulating film 770W.

The insulating film 701C includes a region between the base 770A and the first display element $750(i,j)$.

The insulating film 771 includes a region between the coloring film CF1 and the layer 753 containing a liquid crystal material or between the light-blocking film BM and the layer 753 containing a liquid crystal material. Thus, unevenness due to the thickness of the coloring film CF1 can be reduced. Furthermore, the insulating film 771 can prevent impurities from diffusing from the light-blocking film BM, the coloring film CF1, or the like to the layer 753 containing a liquid crystal material.

The insulating film 770W includes a region between the insulating film 701C and the base 770A.

<<Coloring Film CF1>>

The coloring film CF1 includes a region between the first display element $750(i,j)$ and the insulating film 701C. The coloring film CF1 includes a region overlapping with the first display element $750(i,j)$ (see FIG. 7A and FIG. 8A).

The light-blocking film BM has an opening in a region overlapping with the first display element $750(i,j)$ (see FIG. 8A). The opening includes a region overlapping with the coloring film CF1.

<<First Display Element $750(i,j)$>>

For example, a display element having a function of controlling transmission or reflection of light can be used as the first display element $750(i,j)$. Specifically, a reflective liquid crystal display element can be used as the first display element $750(i,j)$. Alternatively, a MEMS shutter display element, an optical interference type MEMS display element, or the like can be used as the display element. The use of a reflective display element can reduce the power consumption of a display panel. Alternatively, a display element using a microcapsule method, an electrophoretic method, an electrowetting method, or the like can be used as the first display element $750(i,j)$, for example.

The first display element $750(i,j)$ includes the first electrode $751(i,j)$, the second electrode 752, and the layer 753 containing a liquid crystal material. The second electrode 752 is positioned such that an electric field which controls the alignment of the liquid crystal material is generated between the second electrode 752 and the first electrode $751(i,j)$ (see FIG. 7A and FIG. 8A).

The first display element $750(i,j)$ includes the alignment film AF1 and the alignment film AF2. The alignment film AF2 includes a region provided so that the layer 753 containing a liquid crystal material is positioned between the alignment film AF2 and the alignment film AF1.

<<Second Display Element $550(i,j)$>>

The second display element $550(i,j)$ has a function of emitting light toward the insulating film 501C (see FIG. 7A).

The second display element $550(i,j)$ is provided so that the display using the second display element $550(i,j)$ can be seen from part of a region from which the display using the first display element $750(i,j)$ can be seen. For example, dashed arrows shown in FIG. 8A denote the directions in which external light is incident on and reflected by the first display element $750(i,j)$ that displays image data by controlling the intensity of external light reflection. In addition, a solid arrow shown in FIG. 7A denotes the direction in which the second display element $550(i,j)$ emits light to the part of the region from which the display using the first display element $750(i,j)$ can be seen.

Accordingly, display using the second display element can be seen from part of the region where display using the first display element can be seen. Alternatively, users can see display without changing the attitude or the like of the display panel. Thus, a novel display panel that is highly convenient or reliable can be provided.

The second display element $550(i,j)$ includes the third electrode $551(i,j)$, the fourth electrode 552, and a layer $553(j)$ containing a light-emitting material (see FIG. 7A).

The fourth electrode 552 includes a region overlapping with the third electrode $551(i,j)$.

The layer $553(j)$ containing a light-emitting material includes a region between the third electrode $551(i,j)$ and the fourth electrode 552.

The third electrode $551(i,j)$ is electrically connected to the pixel circuit $530(i,j)$ at a connection portion 522. Note that the third electrode $551(i,j)$ and the fourth electrode 552 are electrically connected to the third conductive film ANO and the fourth conductive film VCOM2, respectively (see FIG. 10).

<<Terminal and the Like>>

The display panel described in this embodiment includes the terminal 519B and the terminal 519C.

The terminal 519B includes the conductive film 511B. The terminal 519B is electrically connected to the signal line S1($j$), for example.

The terminal 519C includes the conductive film 511C. The conductive film 511C is electrically connected to the wiring VCOM1, for example.

The conductive material CP is positioned between the terminal 519C and the second electrode 752, and has a function of electrically connecting the terminal 519C and the second electrode 752. For example, a conductive particle can be used as the conductive material CP.

<<Functional Film>>

The display panel described in this embodiment includes a functional film 770P and a functional film 770D.

The light-blocking film BM has an opening in a region overlapping with the first display element 750($i,j$).

The coloring film CF1 includes a region between the base 770A and the first display element 750($i,j$).

The coloring film CF2 includes a region between the insulating film 501C and the second display element 550($i,j$) and a region overlapping with a region 751H which does not block light emitted from the second display element 550($i,j$).

The insulating film 771 includes a region between the coloring film CF1 and the layer 753 containing a liquid crystal material or between the light-blocking film BM and the layer 753 containing a liquid crystal material. Thus, unevenness due to the thickness of the coloring film CF1 can be reduced. Furthermore, the insulating film 771 can prevent impurities from diffusing from the light-blocking film BM, the coloring film CF1, or the like to the layer 753 containing a liquid crystal material.

The functional film 770P includes a region overlapping with the first display element 750($i,j$).

The functional film 770D includes a region overlapping with the first display element 750($i,j$). The functional film 770D is provided so that the base 770A lies between the functional film 770D and the first display element 750($i,j$). Thus, for example, light reflected by the first display element 750($i,j$) can be diffused.

<<Bonding Layer, Sealant, Structure Body, and the Like>>

The display panel described in this embodiment also includes a bonding layer 505, the sealing material 705, and the structure body KB.

The bonding layer 505 includes a region between the functional layer 520 and the base 570, and has a function of attaching the functional layer 520 and the base 570 to each other.

The sealing material 705 includes a region between the functional layer 520 and the base 770A, and has a function of attaching the functional layer 520 and the base 770A to each other.

The structure body KB has a function of keeping a predetermined gap between the functional layer 520 and the base 770A.

<<Base 570 and Base 770A>>

The display panel described in this embodiment includes the base 570 and the base 770A.

The base 770A includes a region overlapping with the base 570. The base 770A includes a region provided so that the functional layer 520 is positioned between the base 770A and the base 570.

The base 770A includes a region overlapping with the first display element 750($i,j$). For example, a material with low birefringence can be used for the region.

<<Adhesive Layer 770B>>

The display panel 700 includes the adhesive layer 770B. The adhesive layer 770B includes a region between the base 770A and the functional layer 720, and has a function of bonding the base 770A and the functional layer 720 to each other.

<Example of Components>

The display panel 700 includes the base 570, the base 770A, the structure body KB, the sealing material 705, and the bonding layer 505.

The display panel 700 includes the functional layer 520, the insulating film 521, and the insulating film 528.

The display panel 700 also includes the signal line S1($j$), the signal line S2($j$), the scan line G1($i$), the scan line G2($i$), the wiring CSCOM, and the third conductive film ANO.

The display panel 700 also includes the first conductive film and the second conductive film.

The display panel 700 includes the terminal 519B, the terminal 519C, the conductive film 511B, and the conductive film 511C.

The display panel 700 includes the pixel circuit 530($i,j$) and the switch SW1.

The display panel 700 also includes the first display element 750($i,j$), the first electrode 751($i,j$), the reflective film, the opening, the layer 753 containing a liquid crystal material, and the second electrode 752.

The display panel 700 includes the alignment film AF1, the alignment film AF2, the coloring film CF1, the coloring film CF2, the light-blocking film BM, the insulating film 771, the functional film 770P, and the functional film 770D.

In addition, the display panel 700 includes the second display element 550($i,j$), the third electrode 551($i,j$), the fourth electrode 552, and the layer 553($j$) containing a light-emitting material.

The display panel 700 includes the insulating film 501B and the insulating film 501C.

The display panel 700 includes the driver circuit GD and the driver circuit SD.

<<Base 570>>

The base 570 or the like can be formed using a material having heat resistance high enough to withstand heat treatment in the manufacturing process. For example, a material with a thickness of greater than or equal to 0.1 mm and less than or equal to 0.7 mm can be used for the base 570. Specifically, a material polished to a thickness of approximately 0.1 mm can be used.

For example, a large-sized glass substrate having any of the following sizes can be used as the base 570 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 570 or the like, an organic material, an inorganic material, a composite material of an organic material and an inorganic material, or the like can be used. For example, an inorganic material such as glass, ceramic, or metal can be used for the base 570 or the like.

Specifically, non-alkali glass, soda-lime glass, potash glass, crystal glass, aluminosilicate glass, tempered glass, chemically tempered glass, quartz, sapphire, or the like can be used for the base 570 or the like. Specifically, an inorganic oxide film, an inorganic nitride film, an inorganic oxynitride film, or the like can be used for the base 570 or the like. For example, a silicon oxide film, a silicon nitride film, a silicon oxynitride film, an aluminum oxide film, or the like can be used for the base 570 or the like. Stainless steel, aluminum, or the like can be used for the base 570 or the like.

For example, a single crystal semiconductor substrate or a polycrystalline semiconductor substrate of silicon or silicon carbide, a compound semiconductor substrate of silicon germanium or the like, an SOI substrate, or the like can be used for the base 570 or the like. Thus, a semiconductor element can be provided over the base 570 or the like.

For example, an organic material such as a resin, a resin film, or plastic can be used for the base 570 or the like. Specifically, a resin film or a resin plate of polyester, polyolefin, polyamide, polyimide, polycarbonate, an acrylic resin, or the like can be used for the base 570 or the like.

For example, a composite material formed by attaching a metal plate, a thin glass plate, or a film of an inorganic material to a resin film or the like can be used for the base 570 or the like. For example, a composite material formed by dispersing a fibrous or particulate metal, glass, an inorganic material, or the like into a resin film can be used for the base 570 or the like. For example, a composite material formed by dispersing a fibrous or particulate resin, an organic material, or the like into an inorganic material can be used for the base 570 or the like.

Furthermore, a single-layer material or a layered material in which a plurality of layers are stacked can be used for the base 570 or the like. For example, a layered material in which a base, an insulating film that prevents diffusion of impurities contained in the base, and the like are stacked can be used for the base 570 or the like. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the base 570 or the like. Alternatively, a layered material in which a resin and a film for preventing diffusion of impurities that penetrate the resin, such as a silicon oxide film, a silicon nitride film, or a silicon oxynitride film, are stacked can be used for the base 570 or the like.

Specifically, a resin film, a resin plate, a layered material, or the like of polyester, polyolefin, polyamide, polyimide, polycarbonate, an acrylic resin, or the like can be used for the base 570 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the base 570 or the like.

Specifically, polyethylene terephthalate (PET), polyethylene naphthalate (PEN), polyethersulfone (PES), acrylic, or the like can be used for the base 570 or the like. Alternatively, a cyclic olefin polymer (COP), a cyclic olefin copolymer (COC), or the like can be used.

Alternatively, paper, wood, or the like can be used for the base 570 or the like.

For example, a flexible substrate can be used for the base 570 or the like.

Note that a transistor, a capacitor, or the like can be directly formed on the substrate. Alternatively, a transistor, a capacitor, or the like formed on a process substrate which can withstand heat applied in the manufacturing process can be transferred to the base 570 or the like. Thus, a transistor, a capacitor, or the like can be formed over a flexible substrate, for example.

For example, a material with a Young's modulus of larger than or equal to 1 GPa and smaller than or equal to 12 GPa can be used for the base 570. Specifically, a resin material with a Young's modulus of larger than or equal to 1 GPa and smaller than or equal to 12 GPa can be used for the base 570. Thus, the weight can be further reduced. Alternatively, for example, the display device can be made less likely to suffer from damage by dropping or the like.

<<Base 770A>>

For example, a material that can be used for the base 570 can be used for the base 770A. For example, a light-transmitting material that can be used for the base 570 can be used for the base 770A. Alternatively, a material with low birefringence that can be used for the base 570 can be used for the base 770A.

For example, aluminosilicate glass, tempered glass, chemically tempered glass, sapphire, or the like can be favorably used for the base 770A that is on a side closer to a user of the display panel. This can prevent breakage or damage of the display panel caused by the use.

For example, a resin film of a cyclic olefin polymer (COP), a cyclic olefin copolymer (COC), or triacetyl cellulose (TAC) can be favorably used for the base 770A. As a result, the weight can be reduced. Alternatively, for example, the display panel can be made less likely to suffer from damage by dropping or the like.

A material with a thickness of greater than or equal to 0.1 mm and less than or equal to 0.7 mm can also be used for the base 770A, for example. Specifically, a substrate polished for reducing the thickness can be used. In that case, the functional film 770D can be close to the first display element 750($i,j$). As a result, image blur can be reduced and an image can be displayed clearly.

For example, a material with a Young's modulus of larger than or equal to 1 GPa and smaller than or equal to 12 GPa can be used for the base 770A. Specifically, a resin material with a Young's modulus of larger than or equal to 1 GPa and smaller than or equal to 12 GPa can be used for the base 770A. Thus, the weight can be further reduced. Alternatively, for example, the display device can be made less likely to suffer from damage by dropping or the like.

<<Adhesive Layer 770B>>

A material that transmits visible light can be used for the adhesive layer 770B.

For example, an inorganic material, an organic material, a composite material of an inorganic material and an organic material, or the like can be used for the adhesive layer 770B.

For example, an organic material such as a thermally fusible resin or a curable resin can be used for the adhesive layer 770B. Alternatively, an organic material such as an adhesive resin can be used for the adhesive layer 770B. Specifically, an adhesive whose fluidity is inhibited and which is formed in a single wafer shape in advance (also referred to as a sheet-like adhesive) can be used for the adhesive layer 770B.

For example, an organic material such as a reactive curable adhesive, a photocurable adhesive, a thermosetting adhesive, and/or an anaerobic adhesive can be used for the adhesive layer 770B.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the adhesive layer 770B.

<<Insulating Film 701C>>

For example, an insulating inorganic material, an insulating organic material, or an insulating composite material containing an inorganic material and an organic material can be used for the insulating film 701C.

Specifically, an inorganic oxide film, an inorganic nitride film, an inorganic oxynitride film, or a material in which any of these films are stacked can be used for the insulating film 701C. For example, a film including any of a silicon oxide film, a silicon nitride film, a silicon oxynitride film, an aluminum oxide film, and the like, or a film including a layered material obtained by stacking any of these films can be used for the insulating film 701C.

Specifically, polyester, polyolefin, polyamide, polyimide, polycarbonate, polysiloxane, an acrylic resin, or a stacked or composite material including resins selected from these, or the like can be used for the insulating film 701C. Alternatively, a photosensitive material may be used.

Specifically, a material containing silicon and oxygen can be used for the insulating film 701C. Thus, diffusion of impurities into the pixel circuit, the first display element, or the like can be suppressed.

For example, a 200-nm-thick film containing silicon, oxygen, and nitrogen can be used as the insulating film 701C.

<<Insulating Film 770W and Relieving Layer 770C>>

For example, an organic material such as a resin, a resin film, or plastic can be used for the insulating film 770W or the relieving layer 770C. Specifically, a resin film or a resin plate of polyester, polyolefin, polyamide, polyimide, polycarbonate, an acrylic resin, or the like can be used for the insulating film 770W or the relieving layer 770C.

For example, a composite material formed by attaching a metal plate, a thin glass plate, or a film of an inorganic material to a resin film or the like can be used for the insulating film 770W or the relieving layer 770C. For example, a composite material formed by dispersing a fibrous or particulate metal, glass, an inorganic material, or the like into a resin film can be used for the insulating film 770W or the relieving layer 770C. For example, a composite material formed by dispersing a fibrous or particulate resin, an organic material, or the like into an inorganic material can be used for the insulating film 770W or the relieving layer 770C.

Furthermore, a single-layer material or a layered material in which a plurality of layers are stacked can be used for the insulating film 770W or the relieving layer 770C. For example, a layered material in which a base, an insulating film that prevents diffusion of impurities contained in the base, and the like are stacked can be used for the insulating film 770W or the relieving layer 770C. Specifically, a layered material in which glass and one or a plurality of films that are selected from a silicon oxide layer, a silicon nitride layer, a silicon oxynitride layer, and the like and that prevent diffusion of impurities contained in the glass are stacked can be used for the insulating film 770W or the relieving layer 770C. Alternatively, a layered material in which a resin and a film for preventing diffusion of impurities that penetrate the resin, such as a silicon oxide film, a silicon nitride film, or a silicon oxynitride film, are stacked can be used for the insulating film 770W or the relieving layer 770C.

Specifically, a resin film, a resin plate, a layered material, or the like of polyester, polyolefin, polyamide, polyimide, polycarbonate, an acrylic resin, or the like can be used for the insulating film 770W or the relieving layer 770C.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the insulating film 770W or the relieving layer 770C. Specifically, polyethylene terephthalate (PET), polyethylene naphthalate (PEN), polyethersulfone (PES), or the like can be used for the insulating film 770W or the relieving layer 770C.

Alternatively, a material with low birefringence can be used for the insulating film 770W or the relieving layer 770C. Specifically, a resin film of a cyclic olefin polymer (COP), a cyclic olefin copolymer (COC), triacetyl cellulose (TAC), or the like can be used for the insulating film 770W or the relieving layer 770C.

For example, a material with a thickness of greater than or equal to 0.5 μm and less than or equal to 3 μm can be used for the insulating film 770W. For example, a material with a Young's modulus of larger than or equal to 3 GPa and smaller than or equal to 12 GPa can be used for the insulating film 770W.

Specifically, a film that includes polyimide and has a thickness of greater than or equal to 0.5 μm and less than or equal to 3 μm can be used for the insulating film 770W. Thus, damage to the functional layer 720 can be prevented in the manufacturing process of the display panel.

<<Structure Body KB>>

The structure body KB or the like can be formed using an organic material, an inorganic material, or a composite material of an organic material and an inorganic material. Accordingly, a predetermined gap can be provided between components between which the structure body KB and the like are provided.

Specifically, for the structure body KB, polyester, polyolefin, polyamide, polyimide, polycarbonate, polysiloxane, an acrylic resin, or the like, or a composite material of a plurality of resins selected from these can be used. Alternatively, a photosensitive material may be used.

<<Sealing Material 705>>

For the sealing material 705 or the like, an inorganic material, an organic material, a composite material of an inorganic material and an organic material, or the like can be used.

For example, an organic material such as a thermally fusible resin or a curable resin can be used for the sealing material 705 or the like.

For example, an organic material such as a reactive curable adhesive, a photocurable adhesive, a thermosetting adhesive, and/or an anaerobic adhesive can be used for the sealing material 705 or the like.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, an ethylene vinyl acetate (EVA) resin, or the like can be used for the sealing material 705 or the like.

<<Bonding Layer 505>>

For example, any of the materials that can be used for the sealing material 705 can be used for the bonding layer 505.

<<Insulating Film 521>>

For example, an insulating inorganic material, an insulating organic material, or an insulating composite material containing an inorganic material and an organic material can be used for the insulating film 521 or the like.

Specifically, for example, an inorganic oxide film, an inorganic nitride film, an inorganic oxynitride film, or a material obtained by stacking any of these films can be used as the insulating film 521 or the like. For example, a film including any of a silicon oxide film, a silicon nitride film, a silicon oxynitride film, an aluminum oxide film, and the like, or a film including a layered material obtained by stacking any of these films can be used as the insulating film 521 or the like.

Specifically, for the insulating film 521 or the like, polyester, polyolefin, polyamide, polyimide, polycarbonate, polysiloxane, an acrylic resin, or the like, or a layered or composite material of a plurality of kinds of resins selected from these can be used. Alternatively, a photosensitive material may be used.

Thus, steps due to various components overlapping with the insulating film 521, for example, can be reduced.

<<Insulating Film 528>>

For example, any of the materials that can be used for the insulating film 521 can be used for the insulating film 528 or the like. Specifically, a 1-μm-thick polyimide-containing film can be used as the insulating film 528.

<<Insulating Film 501B>>

For example, any of the materials that can be used for the insulating film 521 can be used for the insulating film 501B. For example, a material having a function of supplying hydrogen can be used for the insulating film 501B.

Specifically, a material obtained by stacking a material containing silicon and oxygen and a material containing silicon and nitrogen can be used for the insulating film 501B. For example, a material having a function of releasing hydrogen by heating or the like to supply the hydrogen to another component can be used for the insulating film 501B. Specifically, a material having a function of releasing hydrogen taken in the manufacturing process, by heating or the like, to supply the hydrogen to another component can be used for the insulating film 501B.

For example, a film containing silicon and oxygen that is formed by a chemical vapor deposition method using silane or the like as a source gas can be used as the insulating film 501B.

Specifically, a material obtained by stacking a material containing silicon and oxygen and having a thickness of greater than or equal to 200 nm and less than or equal to 600 nm and a material containing silicon and nitrogen and having a thickness of approximately 200 nm can be used for the insulating film 501B.

<<Insulating Film 501C>>

For example, any of the materials that can be used for the insulating film 521 can be used for the insulating film 501C. Specifically, a material containing silicon and oxygen can be used for the insulating film 501C. Thus, diffusion of impurities into the pixel circuit, the second display element, or the like can be inhibited.

For example, a 200-nm-thick film containing silicon, oxygen, and nitrogen can be used as the insulating film 501C.

<<Wiring, Terminal, and Conductive Film>>

A conductive material can be used for the wiring or the like. Specifically, the conductive material can be used for the signal line S1(*j*), the signal line S2(*j*), the scan line G1(*i*), the scan line G2(*i*), the wiring CSCOM, the third conductive film ANO, the terminal 519B, the terminal 519C, the conductive film 511B, the conductive film 511C, or the like.

For example, an inorganic conductive material, an organic conductive material, a metal, conductive ceramics, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film including graphene oxide is formed and is subjected to reduction, so that a film including graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecular can be used for the wiring or the like.

Note that the terminal 519B can be electrically connected to a flexible printed board or the like using a conductive material such as an anisotropic conductive film, for example.

<<First Conductive Film and Second Conductive Film>>

For example, any of the materials that can be used for the wiring or the like can be used for the first conductive film or the second conductive film.

Alternatively, the first electrode 751(*i,j*), the wiring, or the like can be used as the first conductive film.

The conductive film 512B functioning as the source electrode or the drain electrode of the transistor that can be used for the switch SW1, the wiring, or the like can be used for the second conductive film.

<<First Display Element 750(*i,j*)>>

For example, a display element having a function of controlling transmission or reflection of light can be used as the first display element 750(*i,j*). For example, a combined structure of a polarizing plate and a liquid crystal element or a MEMS shutter display element can be used. Specifically, a reflective liquid crystal display element can be used as the first display element 750(*i,j*). The use of a reflective display element can reduce the power consumption of a display panel.

For example, a liquid crystal element driven in any of the following driving modes can be used: an in-plane switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

The first display element 750(*i,j*) includes the first electrode 751(*i,j*), the second electrode 752, and the layer 753 containing a liquid crystal material. The layer 753 containing a liquid crystal material contains a liquid crystal material whose orientation is controlled by voltage applied between the first electrode 751(*i,j*) and the second electrode 752. For example, the orientation of the liquid crystal material can be controlled by an electric field in the thickness direction (also referred to as the vertical direction) or an electric field in the direction that intersects the vertical direction (also referred to as the horizontal direction or the diagonal direction) of the layer 753 containing a liquid crystal material.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, anti-ferroelectric liquid crystal, or the like can be used for the layer 753 containing a liquid crystal material. Alternatively, a liquid crystal material which exhibits a cholesteric phase, a smectic phase, a cubic phase, a chiral nematic phase, an isotropic phase, or the like can be used. Alternatively, a liquid crystal material which exhibits a blue phase can be used.

<<First Electrode 751(i,j)>>

For example, any of the materials that can be used for the wiring or the like can be used for the first electrode 751(i,j). Specifically, a reflective film can be used for the first electrode 751(i,j). For example, a material in which a light-transmitting conductive film and a reflective film having an opening are stacked can be used for the first electrode 751(i,j).

<<Reflective Film>>

For example, a material that reflects visible light can be used for the reflective film. Specifically, a material containing silver can be used for the reflective film. For example, a material containing silver, palladium, and the like or a material containing silver, copper, and the like can be used for the reflective film.

The reflective film reflects light that passes through the layer 753 containing a liquid crystal material, for example. This allows the first display element 750(i,j) to serve as a reflective liquid crystal element. Alternatively, for example, a material with unevenness on its surface can be used for the reflective film. In that case, incident light can be reflected in various directions so that a white image can be displayed.

For example, the first conductive film, the first electrode 751(i,j), or the like can be used as the reflective film.

Figure 13A:
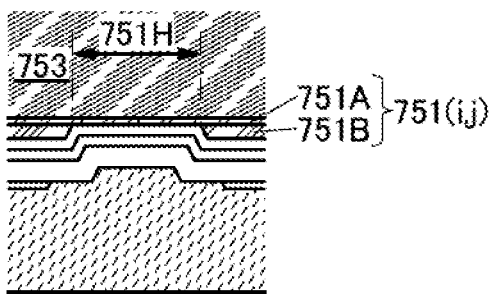
FIGS. 13A to 13D are cross-sectional views each illustrating a structure of a reflective film of a display panel of an embodiment.

For example, a reflective film 751B can be provided so that a light-transmitting conductive film 751A is positioned between the layer 753 containing a liquid crystal material and a region of the conductive film 751B (see FIG. 13A).

Figure 13B:
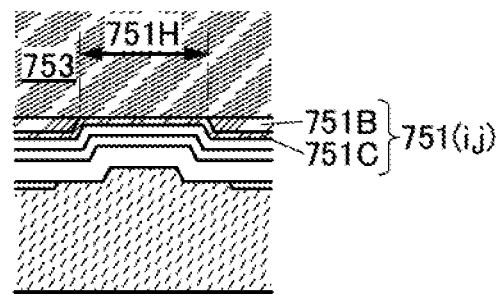

For example, the reflective film 751B can be provided so that a region thereof is positioned between the layer 753 containing a liquid crystal material and a light-transmitting conductive film 751C (see FIG. 13B).

Figure 13C:
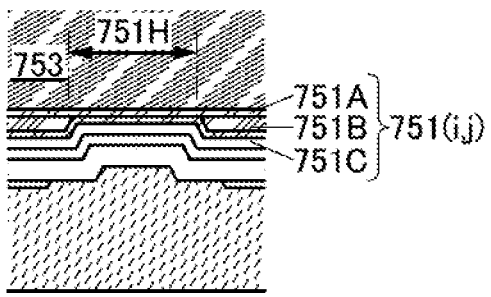

For example, the reflective film 751B can be provided so that a region thereof is positioned between the light-transmitting conductive film 751A and the light-transmitting conductive film 751C (see FIG. 13C).

Figure 13D:
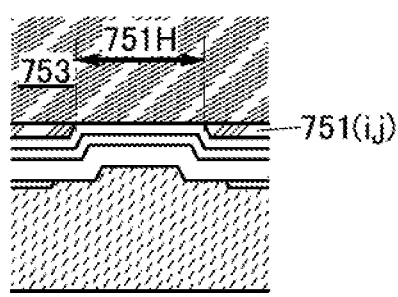

For example, a film that reflects visible light may be used for the first electrode 751(0 (see FIG. 13D).

Figure 14A:
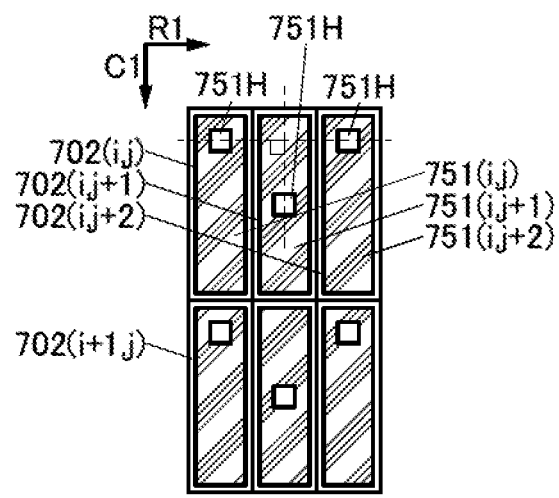
FIGS. 14A to 14C are top views each illustrating a structure of a reflective film of a display panel of an embodiment.
Figure 14B:
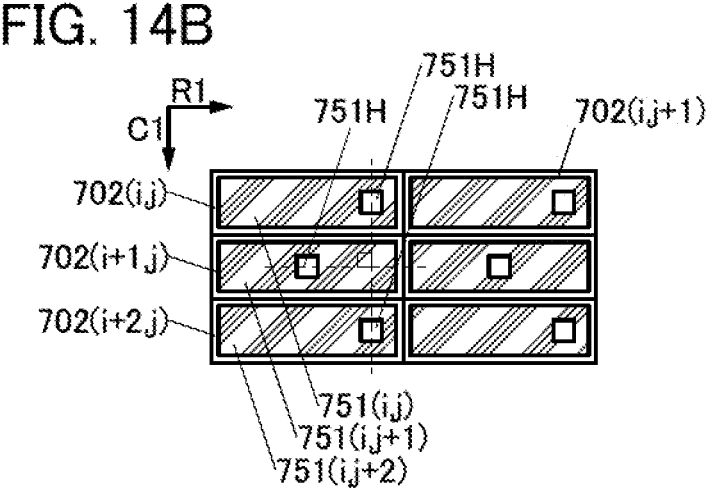
Figure 14C:
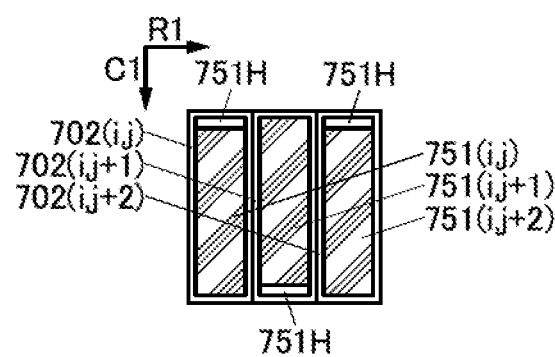

The reflective film has a shape including the region 751H that does not block light emitted from the second display element 550(i,j), for example (see FIGS. 14A to 14C).

For example, the reflective film can have one or more openings. Specifically, the region 751H may have a polygonal shape, a quadrangular shape, an elliptical shape, a circular shape, a cross-like shape, or the like. The region 751H may also have a stripe shape, a slit-like shape, or a checkered pattern.

If the ratio of the total area of the region 751H to the total area of the reflective film is too high, an image displayed using the first display element 750(i,j) is dark.

If the ratio of the total area of the region 751H to the total area of the reflective film is too low, an image displayed using the second display element 550(i,j) is dark. The reliability of the second display element 550(i,j) may be degraded.

For example, the region 751H provided in the pixel 702(i,j+1) is not provided on a line that extends in the row direction (the direction indicated by the arrow R1 in the drawing) through the region 751H provided in the pixel 702(i,j) (see FIG. 14A). Alternatively, for example, the region 751H provided in the pixel 702(i+1,j) is not provided on a line that extends in the column direction (the direction indicated by the arrow C1 in the drawing) through the region 751H provided in the pixel 702(i,j) (see FIG. 14B).

For example, the region 751H provided in the pixel 702(i,j+2) is provided on a line that extends in the row direction through the region 751H provided in the pixel 702(i,j) (see FIG. 14A). In addition, the region 751H provided in the pixel 702(i,j+1) is provided on a line that is perpendicular to the above-mentioned line between the region 751H provided in the pixel 702(i,j) and the region 751H provided in the pixel 702(i,j+2).

Alternatively, for example, the region 751H provided in the pixel 702(i+2,j) is provided on a line that extends in the column direction through the region 751H provided in the pixel 702(i,j) (see FIG. 14B). In addition, for example, the region 751H provided in the pixel 702(i+1,j) is provided on a line that is perpendicular to the above-mentioned line between the region 751H provided in the pixel 702(i,j) and the region 751H provided in the pixel 702(i+2,j).

When the second display elements are provided to overlap with the regions that do not block light and are provided in the above manner, a second display element of another pixel adjacent to one pixel can be apart from a second display element of the one pixel. A display element which displays color different from that displayed from a second display element of one pixel can be provided as a second display element of another pixel adjacent to the one pixel. The difficulty in arranging a plurality of display elements displaying different colors adjacent to each other can be lowered. Thus, a novel display panel that is highly convenient or reliable can be provided.

The reflective film can have a shape in which an end portion is cut off so as to form the region 751H (see FIG. 14C). Specifically, the reflective film can have a shape in which an end portion is cut off so as to be shorter in the column direction (the direction indicated by the arrow C1 in the drawing).

<<Second Electrode 752>>

For example, any of the materials that can be used for the wiring or the like can be used for the second electrode 752. For example, a light-transmitting material selected from the materials that can be used for the wiring or the like can be used for the second electrode 752.

For example, a conductive oxide, a metal film thin enough to transmit light, a metal nanowire, or the like can be used for the second electrode 752.

Specifically, a conductive oxide containing indium can be used for the second electrode 752. Alternatively, a metal thin film with a thickness of greater than or equal to 1 nm and less than or equal to 10 nm can be used for the second electrode 752. Alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

The alignment film AF1 or the alignment film AF2 can be formed using a material containing polyimide or the like, for example. Specifically, a material formed by rubbing treatment or an optical alignment technique such that a liquid crystal material has a predetermined alignment can be used.

For example, a film containing soluble polyimide can be used for the alignment film AF1 or the alignment film AF2. In this case, the temperature required in forming the alignment film AF1 or the alignment film AF2 can be low. As a result, damage to other components caused when the alignment film AF1 or the alignment film AF2 is formed can be reduced.

<<Coloring Films CF1 and CF2>>

A material that transmits light of a predetermined color can be used for the coloring film CF1 or the coloring film CF2. In that case, the coloring film CF1 or the coloring film CF2 can be used as a color filter, for example. For example, a material that transmits blue light, green light, or red light can be used for the coloring film CF1 or the coloring film CF2. Furthermore, a material that transmits yellow light, white light, or the like can be used for the coloring film CF1 or the coloring film CF2.

Note that a material having a function of converting the emitted light to a predetermined color light can be used for the coloring film CF2. Specifically, quantum dots can be used for the coloring film CF2. Thus, display with high color purity can be achieved.

<<Light-Blocking Film BM>>

For example, a material that suppresses light transmission can be used for the light-blocking film BM. Thus, the light-blocking film BM can be used as, for example, a black matrix.

Specifically, a resin containing a pigment or dye can be used for the light-blocking film BM. For example, a resin in which carbon black is dispersed can be used for the blocking film.

Alternatively, an inorganic compound, an inorganic oxide, a composite oxide containing a solid solution of a plurality of inorganic oxides, or the like can be used for the light-blocking film BM. Specifically, a black chromium film, a film containing cupric oxide, or a film containing copper chloride or tellurium chloride can be used for the light-blocking film BM.

<<Insulating Film 771>>

The insulating film 771 can be formed of polyimide, an epoxy resin, an acrylic resin, or the like.

<<Functional Films 770P and 770D>>

An anti-reflection film, a polarizing film, a retardation film, a light diffusion film, a condensing film, or the like can be used for the functional film 770P or the functional film 770D, for example.

Specifically, a film containing a dichromatic pigment can be used for the functional film 770P or the functional film 770D. Alternatively, a material with a columnar structure having an axis along the direction intersecting a surface of a base can be used for the functional film 770P or the functional film 770D. In that case, light can be transmitted in the direction along the axis and scattered in other directions easily.

Alternatively, an antistatic film preventing the attachment of a foreign substance, a water repellent film suppressing the attachment of stain, a hard coat film suppressing a scratch in use, or the like can be used as the functional film 770P.

Specifically, a circularly polarizing film can be used for the functional film 770P. Furthermore, a light diffusion film can be used for the functional film 770D.

<<Second Display Element 550(i,j)>>

A display element having a function of emitting light can be used as the second display element 550(i,j), for example. Specifically, an organic electroluminescent element, an inorganic electroluminescent element, a light-emitting diode, a quantum-dot LED (QDLED), or the like can be used as the second display element 550(i,j).

For example, a light-emitting organic compound can be used for the layer 553(j) containing a light-emitting material.

For example, quantum dots can be used for the layer 553(j) containing a light-emitting material. Accordingly, the half width becomes narrow, and light of a bright color can be emitted.

A stacked-layer material for emitting blue light, green light, or red light can be used for the layer 553(j) containing a light-emitting material, for example.

For example, a belt-like layered material that extends in the column direction along the signal line S2(j) can be used for the layer 553(j) containing a light-emitting material.

Alternatively, a layered material for emitting white light can be used for the layer 553(j) containing a light-emitting material. Specifically, a layered material in which a layer containing a light-emitting material including a fluorescent material that emits blue light, and a layer containing materials that are other than a fluorescent material and that emit green light and red light or a layer containing a material that is other than a fluorescent material and that emits yellow light are stacked can be used for the layer 553(j) containing a light-emitting material.

For example, any of the materials that can be used for the wiring or the like can be used for the third electrode 551(i,j).

For example, a material that transmits visible light among the materials that can be used for the wiring or the like can be used for the third electrode 551(i,j).

Specifically, conductive oxide, indium-containing conductive oxide, indium oxide, indium tin oxide, indium zinc oxide, zinc oxide, zinc oxide to which gallium is added, or the like can be used for the third electrode 551(i,j). Alternatively, a metal film thin enough to transmit light can be used for the third electrode 551(i,j). Further alternatively, a metal film that transmits part of light and reflects another part of light can be used for the third electrode 551(i,j). Accordingly, the second display element 550(i,j) can have a microcavity structure. As a result, light of a predetermined wavelength can be extracted more efficiently than light of other wavelengths.

For example, any of the materials that can be used for the wiring or the like can be used for the fourth electrode 552. Specifically, a material that reflects visible light can be used for the fourth electrode 552.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed in the same process as the semiconductor film of the transistor M or the transistor which can be used as the switch SW1 can be used.

As the transistor MD, a transistor having a different structure from the transistor that can be used as the switch SW1 can be used, for example. Specifically, a transistor including the conductive film 524 can be used as the transistor MD (see FIG. 7B).

Note that the transistor MD can have the same structure as the transistor M.

<<Transistor>>

For example, semiconductor films formed at the same step can be used for transistors in the driver circuit and the pixel circuit.

As the transistor in the driver circuit or the pixel circuit, a bottom-gate transistor or a top-gate transistor can be used, for example.

For example, a transistor including a semiconductor containing an element belonging to Group 14 for a semiconductor film can be used. Specifically, a semiconductor containing silicon can be used for a semiconductor film. For example, single crystal silicon, polysilicon, microcrystalline silicon, or amorphous silicon can be used for the semiconductor film of the transistor.

Note that the temperature for forming a transistor using polysilicon as a semiconductor is lower than the temperature for forming a transistor using single crystal silicon as a semiconductor.

In addition, the transistor using polysilicon as a semiconductor has higher field-effect mobility than the transistor using amorphous silicon as a semiconductor, and therefore a pixel including the transistor using polysilicon can have a high aperture ratio. Moreover, pixels arranged at very high resolution, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

Alternatively, a transistor including a compound semiconductor can be used. Specifically, a semiconductor containing gallium arsenide can be used for a semiconductor film.

Alternatively, a transistor including an organic semiconductor can be used. Specifically, an organic semiconductor containing any of polyacenes and graphene can be used for a semiconductor film.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a smaller leakage current in an off state than a transistor using amorphous silicon for a semiconductor film can be used. Specifically, a transistor using an oxide semiconductor for a semiconductor film can be used.

Thus, a pixel circuit can hold an image signal for a longer time than a pixel circuit including a transistor using amorphous silicon for a semiconductor film. Specifically, the selection signal can be supplied at a frequency of lower than 30 Hz, preferably lower than 1 Hz, further preferably less than once per minute while flickering is suppressed. Consequently, fatigue on a user of a data processing device can be reduced, and power consumption for driving can be reduced.

For example, a transistor including the semiconductor film 508, the conductive film 504, the conductive film 512A, and the conductive film 512B can be used as the switch SW1 (see FIG. 8B). The insulating film 506 includes a region between the semiconductor film 508 and the conductive film 504.

The conductive film 504 includes a region overlapping with the semiconductor film 508. The conductive film 504 functions as a gate electrode. The insulating film 506 functions as a gate insulating film.

The conductive films 512A and 512B are electrically connected to the semiconductor film 508. The conductive film 512A functions as one of a source electrode and a drain electrode, and the conductive film 512B functions as the other of the source electrode and the drain electrode.

Furthermore, a transistor including the conductive film 524 can be used as the transistor included in the driver circuit or the pixel circuit (see FIG. 7B). The conductive film 524 includes a region provided so that the semiconductor film 508 is positioned between the conductive film 524 and the conductive film 504. The insulating film 516 includes a region between the conductive film 524 and the semiconductor film 508. For example, the conductive film 524 can be electrically connected to a wiring supplying the same potential as that supplied to the conductive film 504.

A conductive film in which a 10-nm-thick film containing tantalum and nitrogen and a 300-nm-thick film containing copper are stacked can be used as the conductive film 504, for example. The film containing copper includes a region provided so that the film containing tantalum and nitrogen is positioned between the film containing copper and the insulating film 506.

A material in which a 400-nm-thick film containing silicon and nitrogen and a 200-nm-thick film containing silicon, oxygen, and nitrogen are stacked can be used for the insulating film 506, for example. Note that the film containing silicon and nitrogen includes a region provided so that the film containing silicon, oxygen, and nitrogen is positioned between the film containing silicon and nitrogen and the semiconductor film 508.

A 25-nm-thick film containing indium, gallium, and zinc can be used as the semiconductor film 508, for example.

For example, a conductive film in which a 50-nm-thick film containing tungsten, a 400-nm-thick film containing aluminum, and a 100-nm-thick film containing titanium are stacked in this order can be used as the conductive film 512A or the conductive film 512B. Note that the film containing tungsten includes a region in contact with the semiconductor film 508.

Note that this embodiment can be combined with any of the other embodiments in this specification as appropriate.

Embodiment 4

In this embodiment, a structure of an input/output device which is one embodiment of the present invention will be described with reference to FIG. 15, FIGS. 16A to 16C, FIGS. 17A and 17B, and FIG. 18.

Figure 15:
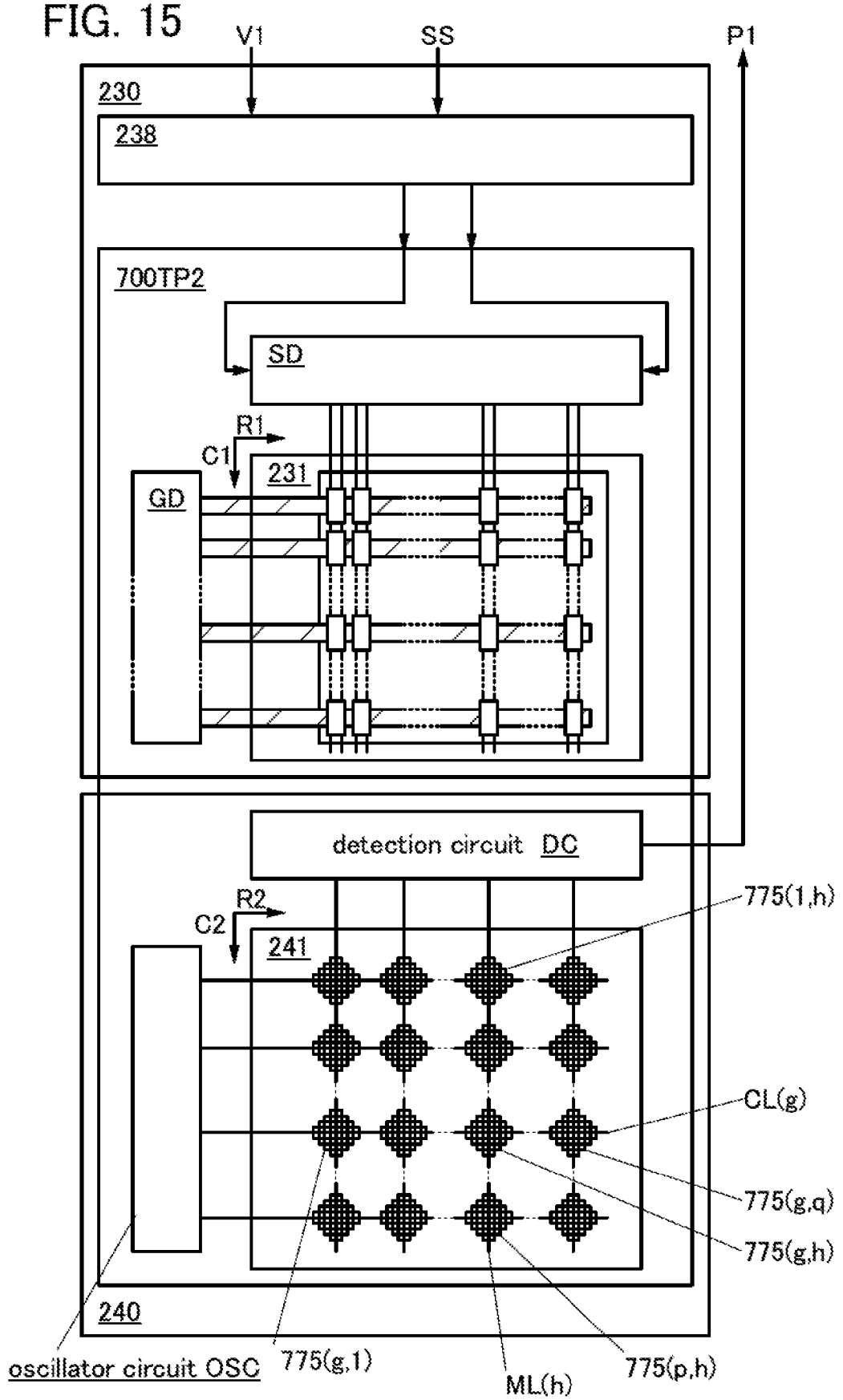
FIG. 15 is a block diagram illustrating a structure of an input/output panel and a structure of a display device of an embodiment.

FIG. 15 is a block diagram illustrating a structure of the input/output device of one embodiment of the present invention.

Figure 16A:
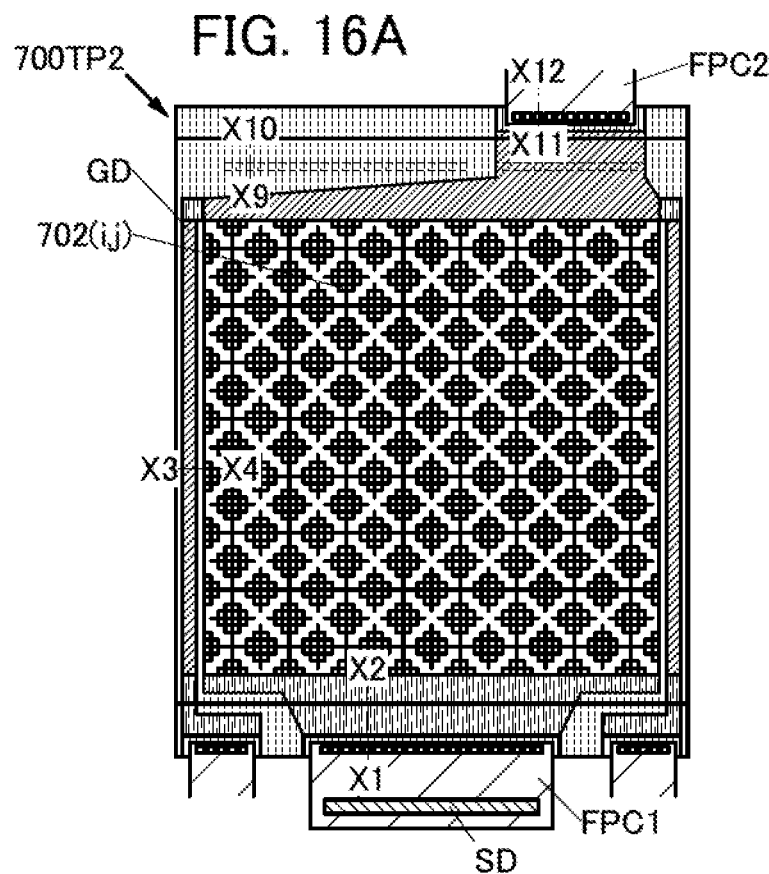
FIGS. 16A to 16C are top views illustrating a structure of an input/output panel of an embodiment.
Figure 16B:
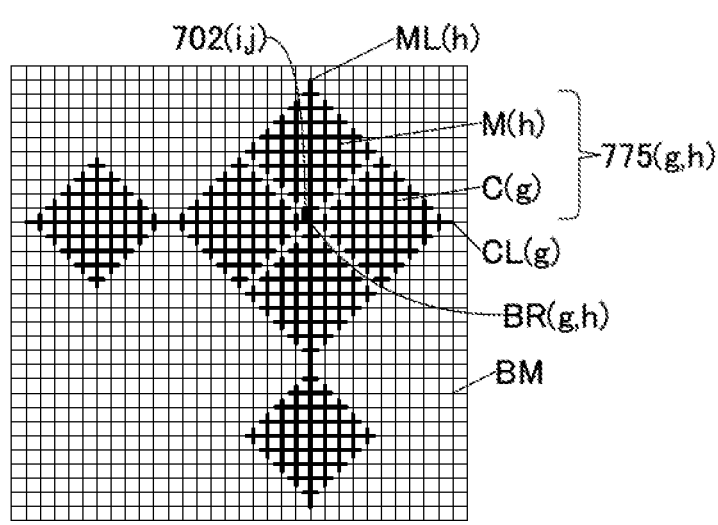
Figure 16C:
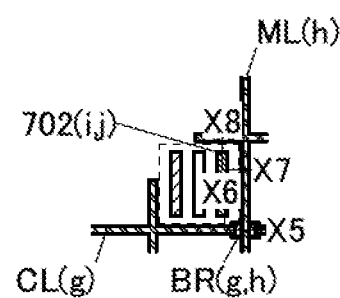

FIGS. 16A to 16C illustrate a structure of an input/output panel which can be used for the input/output device of one embodiment of the present invention. FIG. 16A is a top view of the input/output panel. FIG. 16B is a schematic diagram illustrating part of an input portion of the input/output panel. FIG. 16C is a schematic diagram illustrating part of FIG. 16B.

Figure 17A:
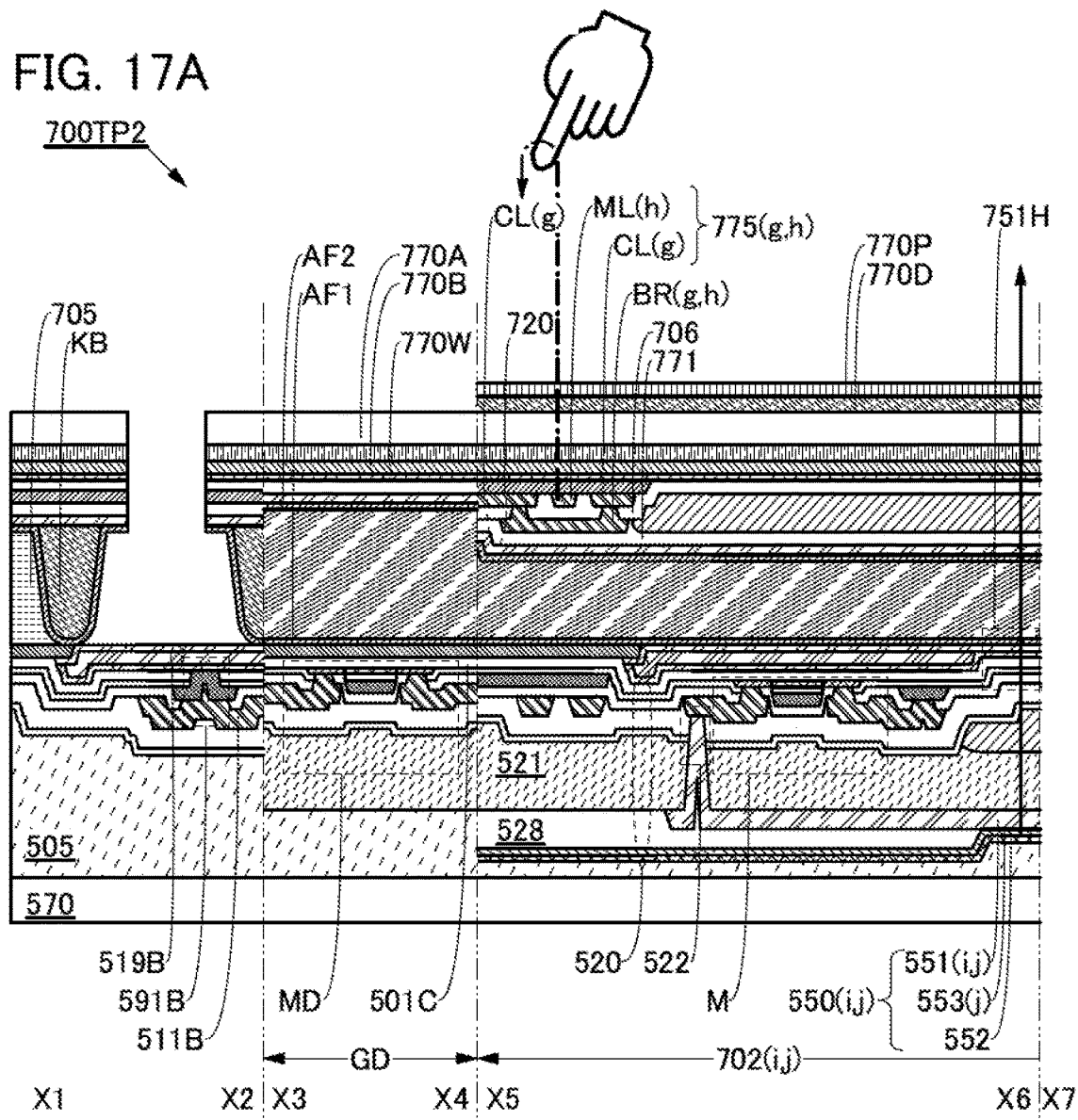
FIGS. 17A and 17B are cross-sectional views illustrating a structure of an input/output panel of an embodiment.
Figure 17B:
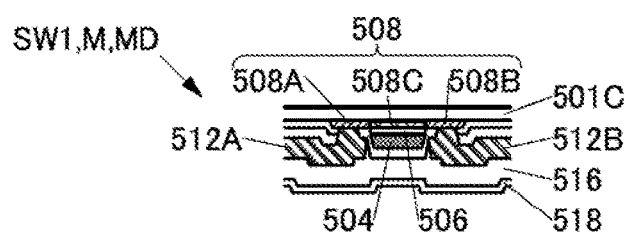
Figure 18:
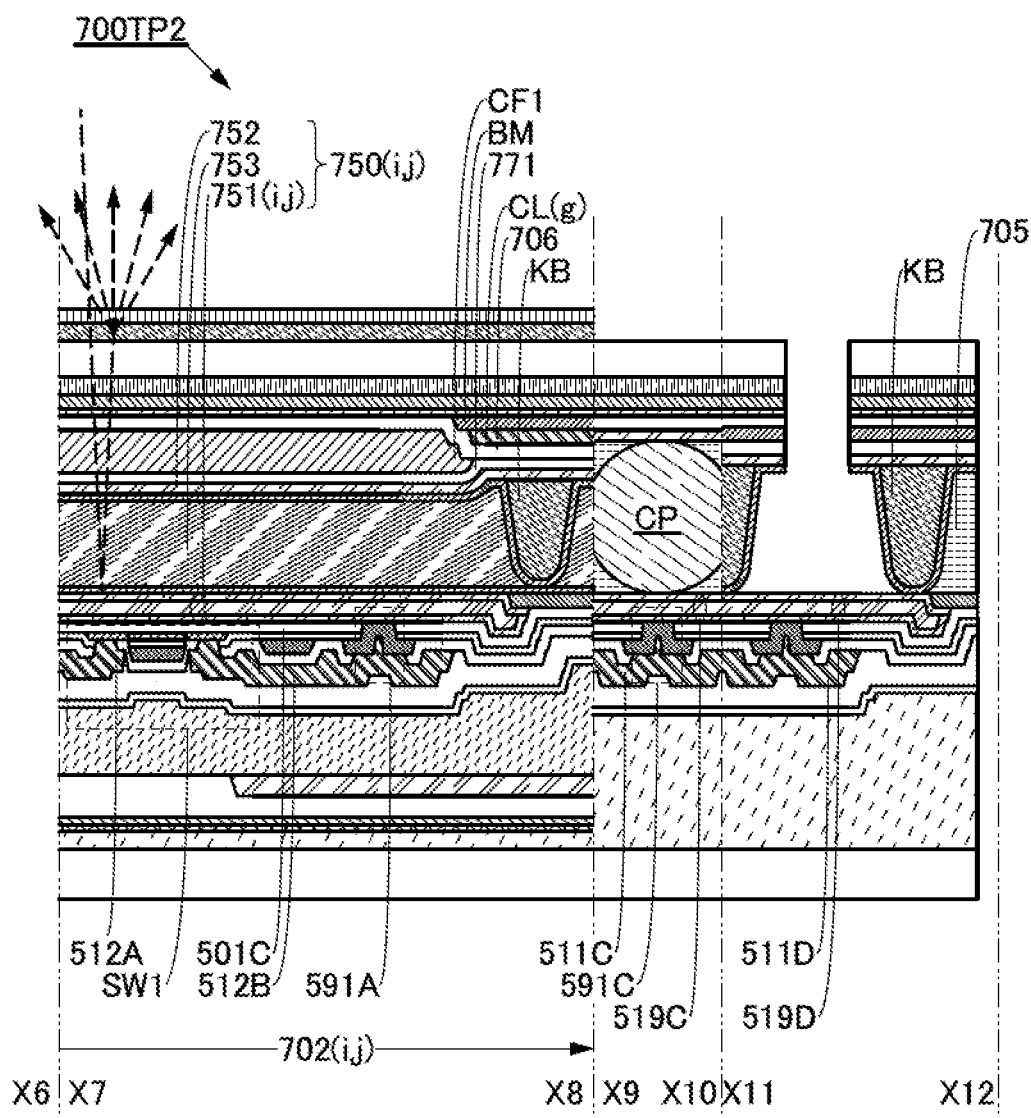
FIG. 18 is a cross-sectional view illustrating a structure of an input/output panel of an embodiment.

FIGS. 17A and 17B and FIG. 18 illustrate a structure of the input/output panel which can be used in the input/output device of one embodiment of the present invention. FIG. 17A is a cross-sectional view taken along cutting plane lines X1-X2 and X3-X4 in FIG. 16A and cutting plane line X5-X6 in FIG. 16C. FIG. 17B is a cross-sectional view illustrating part of the structure illustrated in FIG. 17A.

FIG. 18 is a cross-sectional view taken along cutting plane line X7-X8 in FIG. 16C and cutting plane lines X9-X10 and X11-X12 in FIG. 16A.

<Structure Example of Input/Output Device>

The input/output device described in this embodiment includes a display portion 230 and an input portion 240 (see FIG. 15). Note that the input/output device includes an input/output panel 700TP2.

The input portion 240 includes a sensing region 241. The sensing region 241 includes a region overlapping with the display region 231 of the display portion 230. The sensing region 241 has a function of sensing an object that approaches the region overlapping with the display region 231 (see FIG. 17A).

<<Input Portion 240>>

The input portion 240 includes the sensing region 241, an oscillator circuit OSC, and a detection circuit DC (see FIG. 15).

The sensing region 241 includes a group of sensing elements 775($g$,1) to 775($g$,$q$) and a different group of sensing elements 775(1,$h$) to 775($p$,$h$) (see FIG. 15). Note that g is an integer greater than or equal to 1 and less than or equal top, h is an integer greater than or equal to 1 and less than or equal to q, and each of p and q is an integer greater than or equal to 1.

The group of the sensing elements 775($g$,1) to 775($g$,$q$) include the sensing element 775($g$,$h$) and are arranged in the row direction (indicated by an arrow R2 in the drawing). Note that the direction indicated by the arrow R2 in FIG. 15 may be the same as or different from the direction indicated by the arrow R1 in FIG. 15.

The different group of sensing elements 775(1,$h$) to 775($p$,$h$) include the sensing element 775($g$,$h$) and are arranged in the column direction (indicated by an arrow C2 in the drawing) intersecting the row direction.

Each of the group of sensing elements 775($g$,1) to 775($g$,$q$) arranged in the row direction includes an electrode C(g) that is electrically connected to a control line CL(g) (see FIG. 16B).

Each of the different group of sensing elements 775(1,$h$) to 775($p$,$h$) arranged in the column direction includes an electrode M(h) that is electrically connected to a sensing signal line ML(h).

The control line CL(g) includes a conductive film BR(g,h) (see FIG. 16C and FIG. 17A). The conductive film BR(g,h) includes a region overlapping with the sensing signal line ML(h).

An insulating film 706 includes a region positioned between the sensing signal line ML(h) and the conductive film BR(g,h). Thus, a short circuit between the sensing signal line ML(h) and the conductive film BR(g,h) can be prevented.

<<Sensing Element 775($g$,$h$)>>

The sensing element 775($g$,$h$) is electrically connected to the control line CL(g) and the sensing signal line ML(h).

The sensing element 775($g$,$h$) has a light-transmitting property. The sensing element 775($g$,$h$) includes the electrode C(g) and the electrode M(h).

For example, a conductive film having an opening in a region overlapping with the pixel 702 ($i$,$j$) can be used for the electrode C(g) and the sensing signal line ML(h). Thus, an object that approaches the region overlapping with the display panel can be sensed without disturbing display of the display panel. Moreover, the thickness of the input/output device can be reduced. Note that the light-blocking film BM can be used. The light-blocking film BM includes a region overlapping with the electrode C(g) and the sensing signal line ML(h) and a region positioned between the base 770A and the electrode C(g) or between the base 770A and the sensing signal line ML(h), for example. Thus, the intensity of external light reflected by the sensing element 775($g$,$h$) can be reduced. As a result, a novel input/output device that is highly convenient or reliable can thus be provided.

The electrode C(g) is electrically connected to the control line CL(g).

The electrode M(h) is electrically connected to the sensing signal line ML(h) and is positioned so that an electric field part of which is blocked by an object approaching a region overlapping with the display region 231 is generated between the electrode M(h) and the electrode C(g).

The control line CL(g) has a function of supplying a control signal.

The sensing signal line ML(h) has a function of being supplied with a sensing signal.

The sensing element 775($g$,$h$) has a function of supplying the sensing signal which changes in accordance with the control signal and a distance between the sensing element and an object approaching a region overlapping with the display region 231.

Thus, the object approaching the region overlapping with the display region 231 can be sensed while the image data is displayed by the display region 231. As a result, a novel input/output device that is highly convenient or reliable can be provided.

<<Oscillator Circuit OSC>>

The oscillator circuit OSC is electrically connected to the control line CL(g) and has a function of supplying a control signal. For example, a rectangular wave, a sawtooth wave, a triangular wave, or the like can be used as the control signal.

<<Detection Circuit DC>>

The detection circuit DC is electrically connected to the sensing signal line ML(h) and has a function of supplying a sensing signal on the basis of a change in the potential of the sensing signal line ML(h). Note that the sensing signal includes positional data P1, for example.

<<Display Portion 230>>

The display device described in Embodiment 2 can be used as the display portion 230, for example.

<<Input/Output Panel 700TP2>>

The input/output panel 700TP2 is different from, for example, the display panel 700 described in Embodiment 3 in that the functional layer 720 and a top-gate transistor are provided. Different structures will be described in detail below, and the above description is referred to for the other similar structures.

<<Functional Layer 720>>

The functional layer 720 includes a region surrounded by the base 770A, the insulating film 501C, and the sealing material 705, for example (see FIGS. 17A and 17B and FIG. 18).

The functional layer 720 includes the control line CL(g), the sensing signal line ML(h), and the sensing element 775($g$,$h$), for example.

Note that a gap between the control line CL(g) and the second electrode 752 or between the sensing signal line ML(h) and the second electrode 752 is greater than or equal to 0.2 μm and less than or equal to 16 μm, preferably greater than or equal to 1 μm and less than or equal to 8 μm, further preferably greater than or equal to 2.5 μm and less than or equal to 4 μm.

<<Conductive Film 511D>>

The input/output panel 700TP2 described in this embodiment includes a conductive film 511D (see FIG. 18).

Note that the conductive material CP or the like can be provided between the control line CL(g) and the conductive film 511D to electrically connect the control line CL(g) and the conductive film 511D. Alternatively, the conductive material CP or the like can be provided between the sensing signal line ML(h) and the conductive film 511D to electrically connect the sensing signal line ML(h) and the conductive film 511D.

A material that can be used for a wiring or the like can be used for the conductive film 511D, for example.

<<Terminal 519D>>

The input/output panel 700TP2 described in this embodiment includes a terminal 519D. The terminal 519D is electrically connected to the conductive film 511D.

For example, a material that can be used for a wiring or the like can be used for the terminal 519D. Specifically, the terminal 519D can have the same structure as the terminal 519B or the terminal 519C (see FIG. 18).

Note that the terminal 519D can be electrically connected to a flexible printed board or the like using a conductive material such as an anisotropic conductive film, for example. Accordingly, a control signal can be supplied to the control line CL(g) using the terminal 519D, or a sensing signal can be supplied from the sensing signal line ML(h) using the terminal 519D, for example.

<<Switch SW1, Transistor M, Transistor MD>>

A transistor that can be used for the switch SW1, the transistor M, and the transistor MD each include the conductive film 504 including a region overlapping with the insulating film 501C and the semiconductor film 508 including a region located between the insulating film 501C and the conductive film 504. Note that the conductive film 504 functions as a gate electrode (see FIG. 17B).

The semiconductor film 508 includes a first region 508A, a second region 508B, and a third region 508C. The first region 508A and the second region 508B do not overlap with the conductive film 504. The third region 508C is positioned between the first region 508A and the second region 508B and overlaps with the conductive film 504.

Each of the switch SW1, the transistor M, and the transistor MD includes the insulating film 506 between the third region 508C and the conductive film 504. Note that the insulating film 506 functions as a gate insulating film.

The first region 508A and the second region 508B have a lower resistivity than the third region 508C, and function as a source region and a drain region.

For example, plasma treatment using a gas containing a rare gas is performed on an oxide semiconductor film, whereby the first region 508A and the second region 508B can be formed in the semiconductor film 508.

For example, the conductive film 504 can be used as a mask. The use of the conductive film 504 as a mask allows the shape of part of the third region 508C to be self-aligned with the shape of an end of the conductive film 504.

Each of the switch SW1, the transistor M, and the transistor MD includes the conductive film 512A and the conductive film 512B that are in contact with the first region 508A and the second region 508B, respectively. The conductive film 512A and the conductive film 512B function as a source electrode and a drain electrode.

For example, a transistor which can be formed in the same process as the transistor MD can be used as the transistor M.

Note that this embodiment can be combined with any of the other embodiments in this specification as appropriate.

Embodiment 5

In this embodiment, electronic devices each of which includes a display panel of one embodiment of the present invention will be described with reference to FIGS. 19A to 19H.

FIGS. 19A to 19G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 19A:
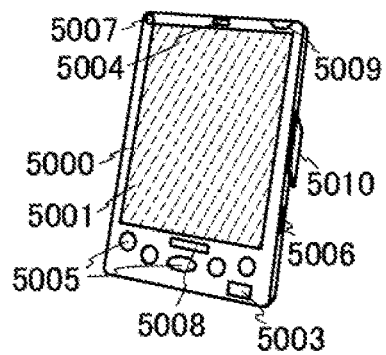
FIGS. 19A to 19H each illustrate a structure of an electronic device of an embodiment.
Figure 19B:
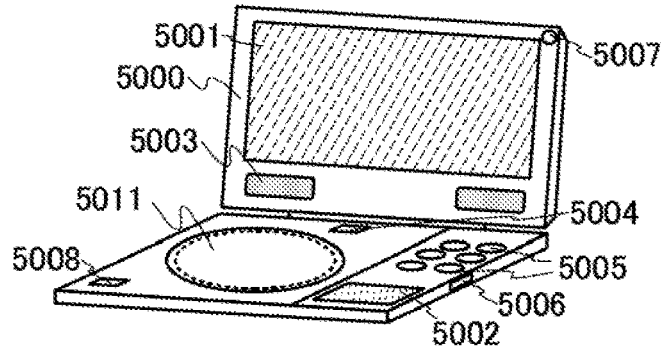
Figure 19C:
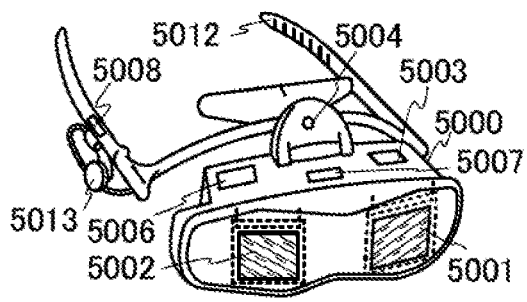
Figure 19D:
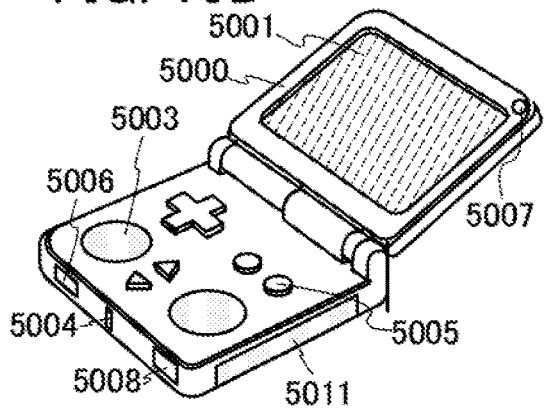
Figure 19E:
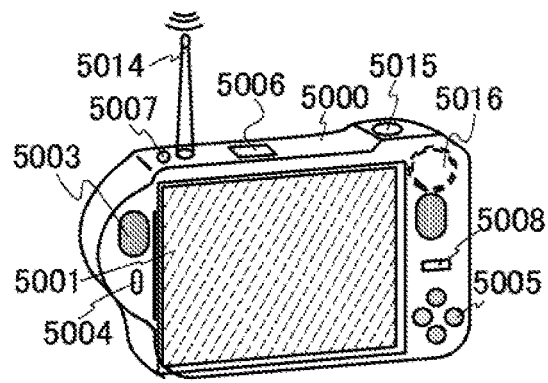
Figure 19F:
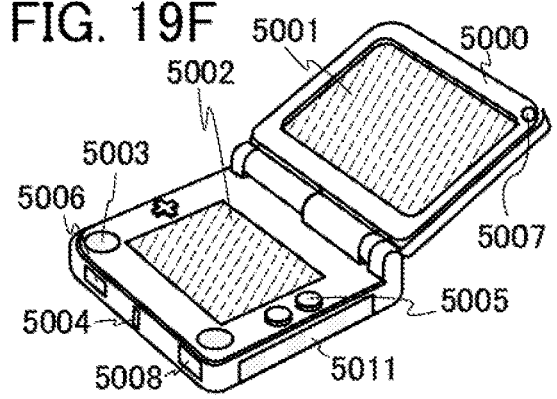
Figure 19G:
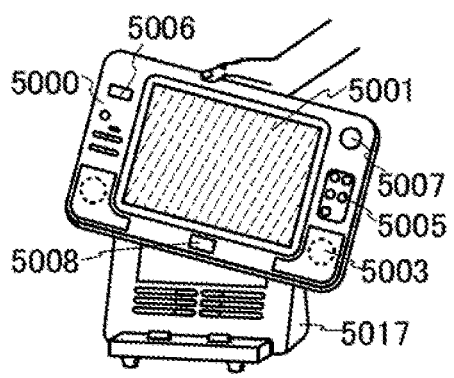

FIG. 19A illustrates a mobile computer that can include a switch 5009, an infrared port 5010, and the like in addition to the above components. FIG. 19B illustrates a portable image reproducing device (e.g., a DVD reproducing device) provided with a recording medium, and the portable image reproducing device can include a second display portion 5002, a recording medium reading portion 5011, and the like in addition to the above components. FIG. 19C illustrates a goggle-type display that can include the second display portion 5002, a support portion 5012, an earphone 5013, and the like in addition to the above components. FIG. 19D illustrates a portable game console that can include the recording medium reading portion 5011 and the like in addition to the above components. FIG. 19E illustrates a digital camera with a television reception function, and the digital camera can include an antenna 5014, a shutter button 5015, an image receiving portion 5016, and the like in addition to the above components. FIG. 19F illustrates a portable game console that can include the second display portion 5002, the recording medium reading portion 5011, and the like in addition to the above components. FIG. 19G illustrates a portable television receiver that can include a charger 5017 capable of transmitting and receiving signals, and the like in addition to the above components.

The electronic devices in FIGS. 19A to 19G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 19A to 19G are not limited thereto, and the electronic devices can have a variety of functions.

Figure 19H:
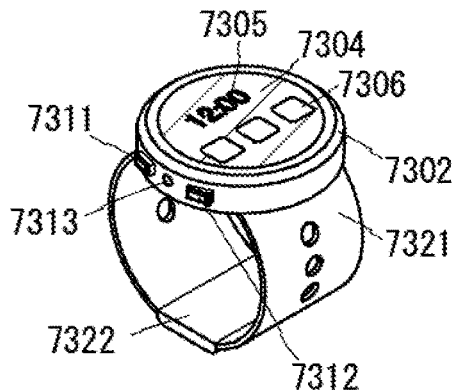

FIG. 19H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 19H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using a light-emitting element for the display panel 7304.

This embodiment can be combined with any of the other embodiments in this specification as appropriate.

Embodiment 6

In this embodiment, a method for manufacturing a display panel of one embodiment of the present invention will be described with reference to FIG. 20, FIGS. 21A and 21B, FIGS. 22A and 22B, FIGS. 23A and 23B, FIGS. 24A and 24B, FIGS. 25A and 25B, FIG. 26, FIGS. 27A and 27B, FIGS. 28A and 28B, FIGS. 29A and 29B, and FIGS. 30A and 30B. Specifically, a manufacturing method of the display panel described in Embodiment 1 will be described.

Figure 20:
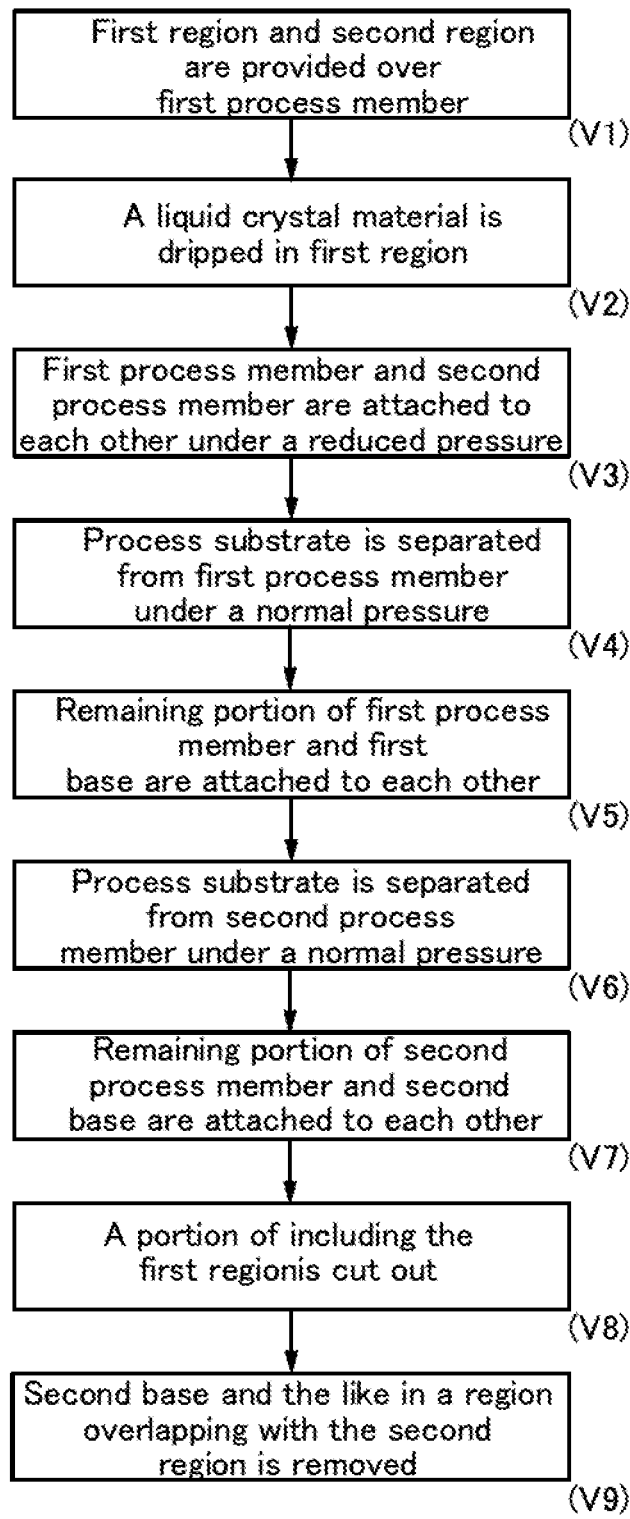
FIG. 20 is a flow chart showing a method for manufacturing a display panel of an embodiment.

FIG. 20 is a flow chart showing a method for manufacturing the display panel.

Figure 21A:
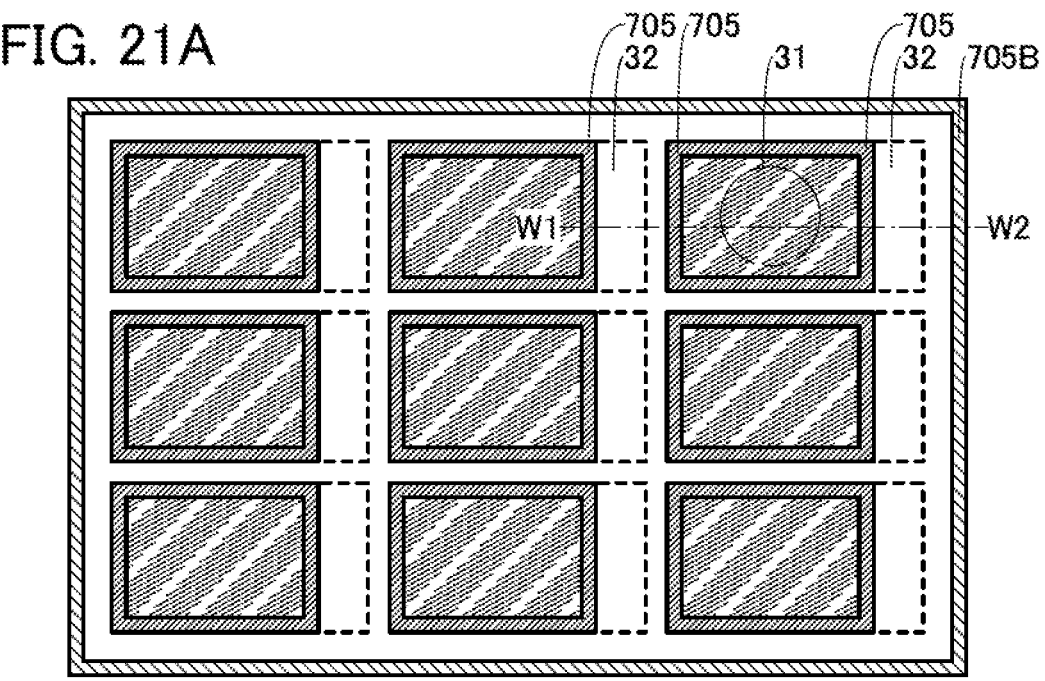
FIGS. 21A and 21B are schematic views illustrating a method for manufacturing a display panel of an embodiment.
Figure 21B:
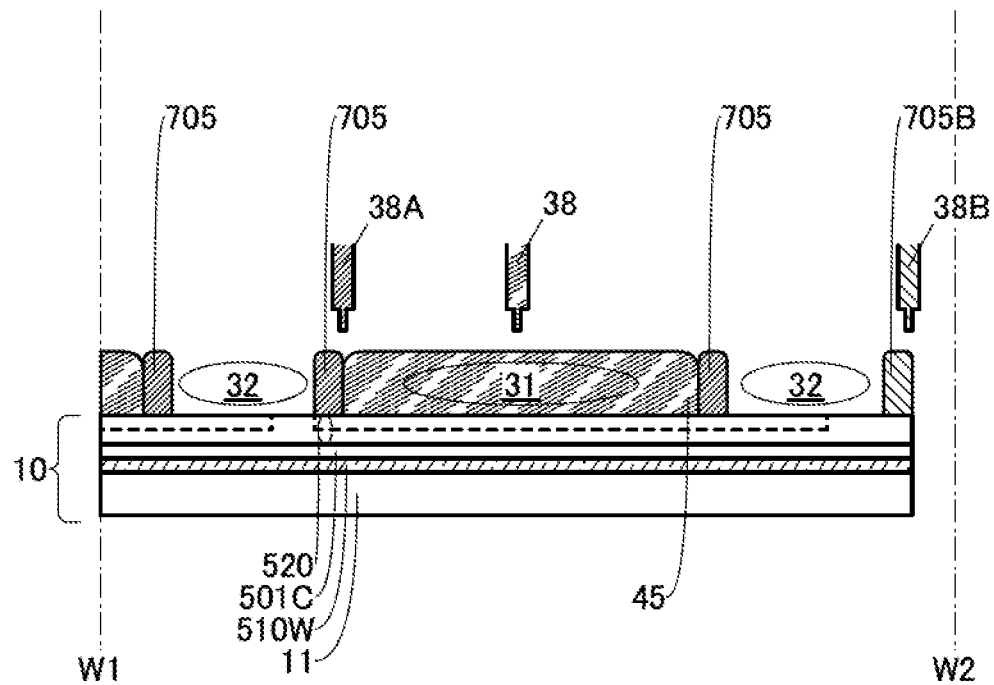

FIGS. 21A and 21B are schematic views illustrating a method for manufacturing the display panel of one embodiment of the present invention. FIG. 21A is a top view illustrating a region formed using a sealing material, and FIG. 21B is a cross-sectional view taken along cutting plane line W1-W2 in FIG. 21A.

Figure 22A:
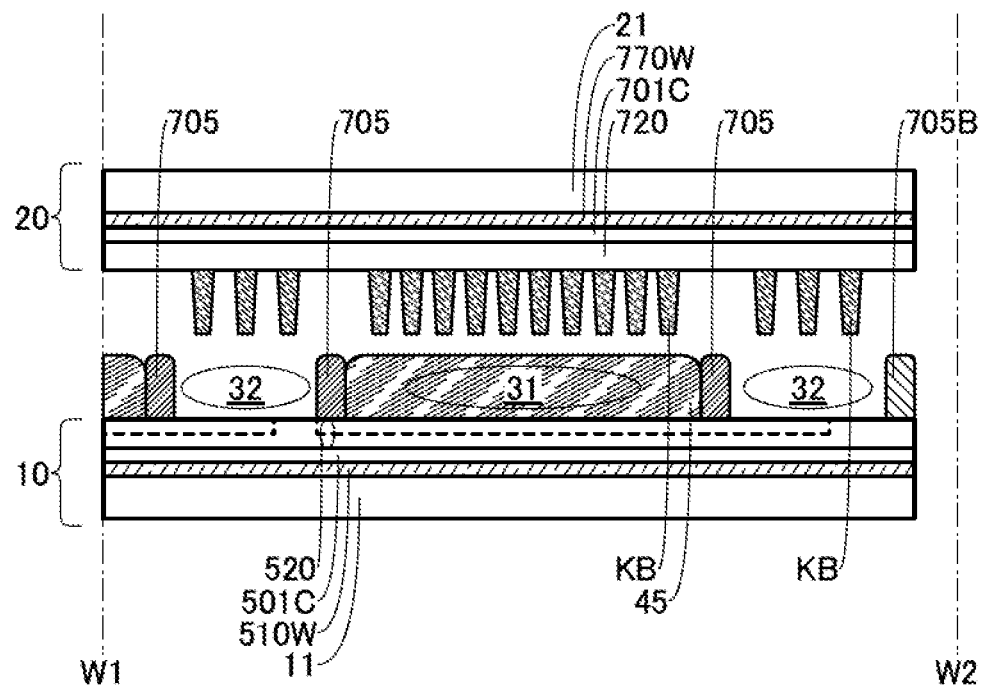
FIGS. 22A and 22B are schematic views illustrating a method for manufacturing a display panel of an embodiment.
Figure 22B:
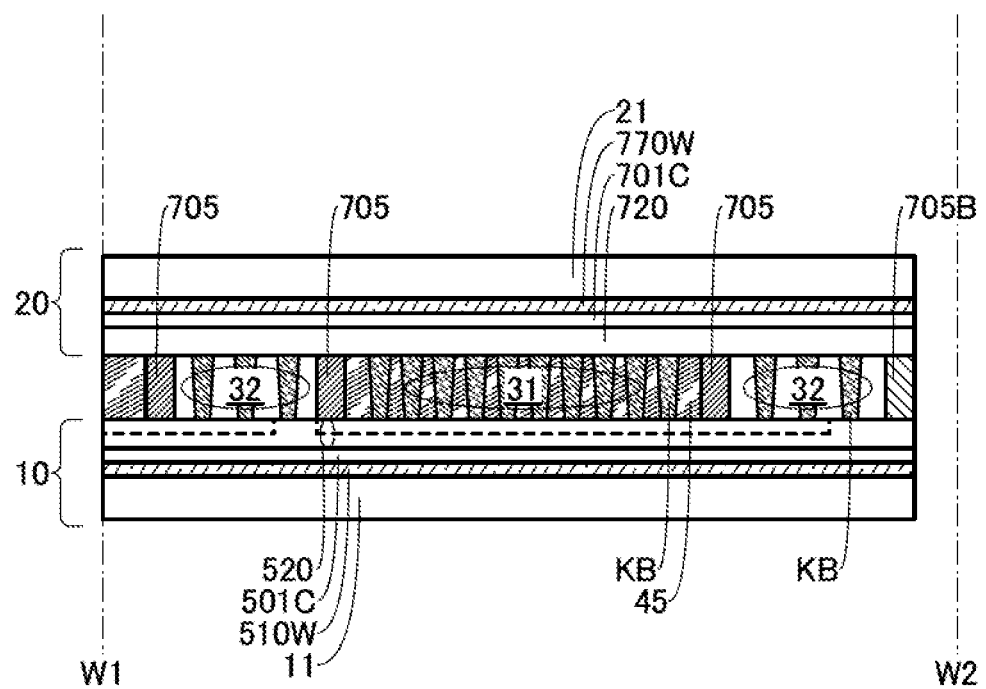

FIGS. 22A and 22B are schematic views illustrating the method for manufacturing the display panel of one embodiment of the present invention. FIG. 22A is a cross-sectional view illustrating a step of attaching a first process member 10, which is illustrated in FIG. 21B, to a second process member 20. FIG. 22B is a cross-sectional view illustrating a state after the attachment.

FIGS. 23A and 23B, FIGS. 24A and 24B, FIGS. 25A and 25B, and FIG. 26 are cross-sectional views illustrating the method for manufacturing the display panel of one embodiment of the present invention.

Example 1 of Manufacturing Method

In the method for manufacturing the display panel described in this embodiment, the first process member 10 and the second process member 20 are used.

The first process member 10 includes a process substrate 11, the insulating film 510W, the insulating film 501C, and the functional layer 520 (see FIG. 22A). For example, the insulating film 510W, the insulating film 501C, and the functional layer 520 can each have the structure described in Embodiment 1.

The second process member 20 includes a process substrate 21, the insulating film 770W, the insulating film 701C, the structure bodies KB, and the functional layer 720 (see FIG. 22A). For example, the insulating film 770W, the insulating film 701C, and the functional layer 720 can each have the structure described in Embodiment 1.

For example, the structure bodies KB can be provided at uniform intervals. Specifically, the structure bodies KB can be provided at intervals of 100 µm or less, preferably 50 µm or less. Alternatively, the structure bodies KB can be provided outside a region 31 at longer intervals than in the region 31. Specifically, a region overlapping with a display region of the display panel can be used as the region 31. In the outside of the region 31, the structure bodies KB can be provided at intervals of 200 µm or less, preferably 100 µm or less. In this manner, unfavorable generation of cracks in the functional layer 520 can be suppressed when the process substrate 11 is separated in a fourth step. Alternatively, unfavorable generation of cracks in the functional layer 720 can be suppressed when the process substrate 21 is separated in a sixth step.

Note that the process substrate 11 or the process substrate 21 can be formed using a material having heat resistance high enough to withstand heat treatment in the step of forming the functional layer 520 or the functional layer 720. For example, a material with a dimensional stability higher than that of the base 510A can be used for the process substrate 11, and a material with a dimensional stability higher than that of the base 770A can be used for the process substrate 21. Consequently, the functional layer 520 and the functional layer 720 can be attached to each other with a high positional accuracy. Moreover, in the case where laser irradiation is performed in the fourth step or the sixth step, a material that transmits part of a laser beam can be used for the process substrate 11 or the process substrate 21. For example, a material with a thickness of greater than or equal to 0.1 mm and less than or equal to 0.7 mm can be used for the process substrate 11 or the process substrate 21. Specifically, a non-alkali glass with a thickness of 0.7 mm can be used for the process substrate 11 or the process substrate 21.

Polyimide can be used for the insulating film 510W or the insulating film 770W. Specifically, varnish including a precursor of polyimide is applied over the process substrate 11 and heated. For example, the varnish can be applied by a slit coating method or a spin coating method.

<<First Step>>

The first region 31 and a second region 32 are provided for the first process member 10 with the use of the sealing material 705 and the sealing material 705B (see V1 in FIG. 20, and FIGS. 21A and 21B).

For example, a dispenser 38A is moved while discharging a material, so that the sealing material 705 with a predetermined shape is formed. Specifically, the sealing material 705 is formed to surround the display region of the display panel. Thus, the first region 31 can be formed in the region overlapping with the display region of the display panel.

A dispenser 38B is moved while discharging a material, so that the sealing material 705B with a predetermined shape is formed. Specifically, the sealing material 705B is formed along the circumference of the first process member 10. Thus, the second region 32 is formed between the sealing material 705 and the sealing material 705B. Note that part of the second region 32 overlaps with a terminal of the display panel.

For example, the same material as the material of the sealing material 705 can be used for the sealing material 705B. For another example, the sealing material 705 and the sealing material 705B can be formed using materials having different viscosities.

<<Second Step>>

A liquid crystal material 45 is dripped in the first region 31 (see V2 in FIG. 20, and FIGS. 21A and 21B).

For example, the liquid crystal material is discharged from a dispenser 38.

<<Third Step>>

The first process member 10 and the second process member 20 are attached to each other with the sealing material 705 and the sealing material 705B under a reduced pressure lower than the normal pressure (see V3 in FIG. 20, and FIGS. 22A and 22B).

For example, the reduced pressure can be lower than or equal to 100 Pa, preferably lower than or equal to 1 Pa, in which case the pressure in the second region 32 is substantially equal to the reduced pressure.

For example, in the case where a photocurable resin is used for each of the sealing material 705 and the sealing material 705B, the sealing material 705 and the sealing material 705B are cured by light irradiation. In this manner, the first process member 10 and the second process member 20 can be attached to each other. Note that light irradiation is performed in the case where a photocurable resin is used for the sealing material 705 or the sealing material 705B, while heat treatment is performed in the case where a thermosetting resin is used for the sealing material 705 or the sealing material 705B. Thus, the first process member 10 and the second process member 20 can be attached to each other.

<<Fourth Step>>

Figure 23A:
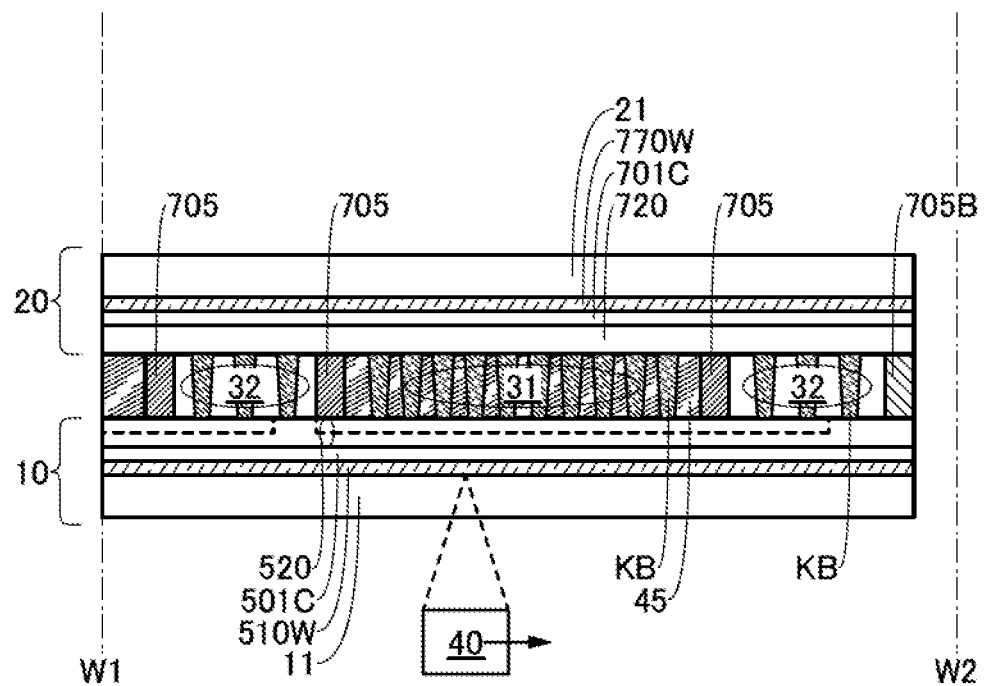
FIGS. 23A and 23B are schematic views illustrating a method for manufacturing a display panel of an embodiment.
Figure 23B:
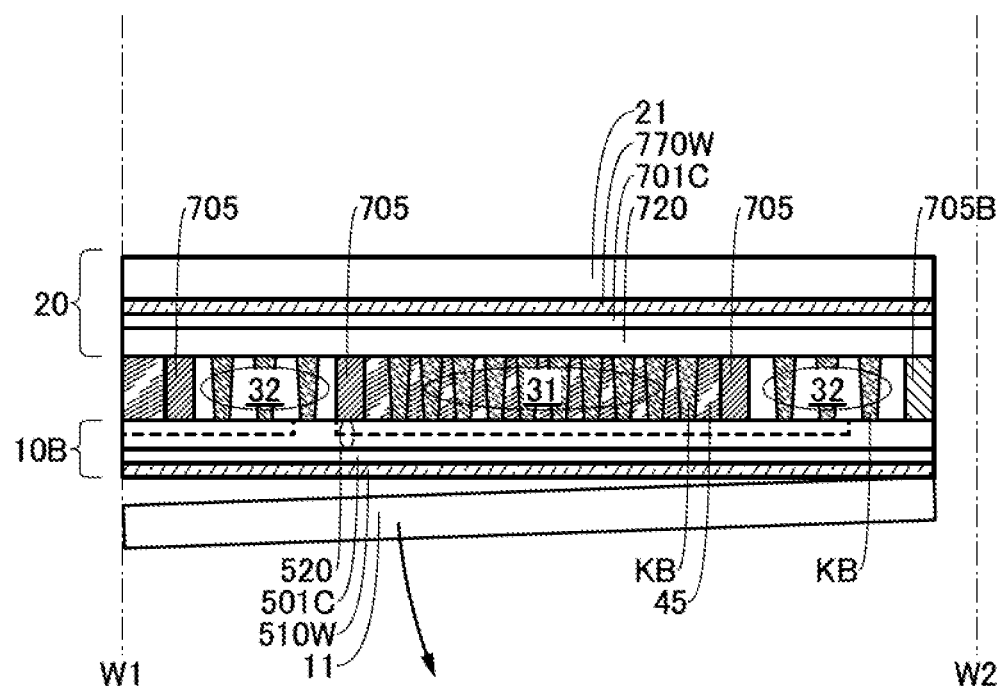

The process substrate 11 is separated from the first process member 10 under a pressure higher than the reduced pressure (see V4 in FIG. 20, and FIGS. 23A and 23B). Note that a portion of the first process member 10 from which the process substrate 11 is removed is referred to as a remaining portion 10B.

For example, the atmospheric pressure can be used as the pressure higher than the reduced pressure. Note that the pressure in the second region 32 is kept substantially the same as the reduced pressure. Thus, the atmospheric pressure is applied on the first process member 10, the second process member 20, and the sealing material 705B that surround the second region 32. In addition, the structure bodies KB keep a predetermined gap between the first process member 10 and the second process member 20 while resisting the atmospheric pressure.

For example, the insulating film 510W is irradiated with a laser beam through the process substrate 11, whereby the process substrate 11 can be separated from the first process member 10. FIG. 23A illustrates laser irradiation using a light source 40.

Specifically, an excimer laser with a wavelength of 308 nm, a solid-state UV laser with a wavelength of 343 nm or 355 nm, or the like can be used as a laser. For example, irradiation with a linear laser beam can be performed with the use of an optical system.

Note that the process substrate 11 is moved to relative to the light source 40. Thus, a structure that facilitates separation from the process substrate 11 is formed in a laser-irradiated region of the insulating film 510W, so that the process substrate 11 can be separated at the laser-irradiated region of the insulating film 510W.

Specifically, the process substrate 11 is moved along the light source 40 at 3.6 mm/sec while irradiated with an excimer laser beam having a frequency of 60 Hz, an energy density of 362.7 mJ/cm$^2$, and a wavelength of 308 nm.

<<Fifth Step>>

Figure 24A:
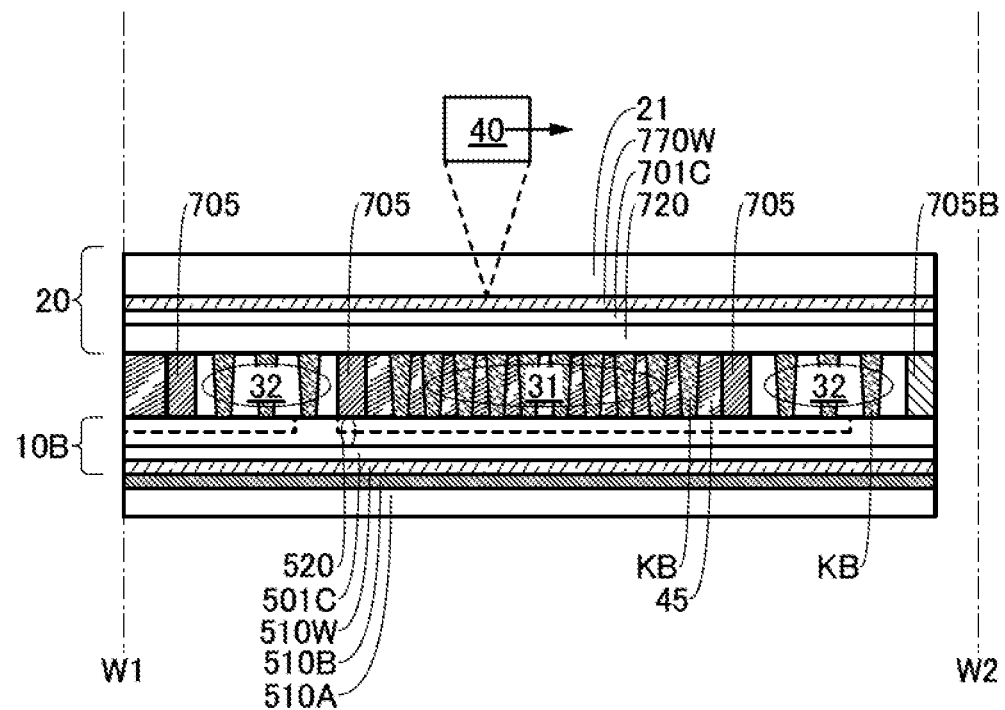
FIGS. 24A and 24B are schematic views illustrating a method for manufacturing a display panel of an embodiment.

The remaining portion 10B of the first process member 10 and the base 510A are attached to each other with the use of the adhesive layer 510B (see V5 in FIG. 20, and FIG. 24A).

For example, an adhesive whose fluidity is inhibited and which is formed in a single wafer shape in advance (also referred to as a sheet-like adhesive) can be used for the adhesive layer 510B.

<<Sixth Step>>

Figure 24B:
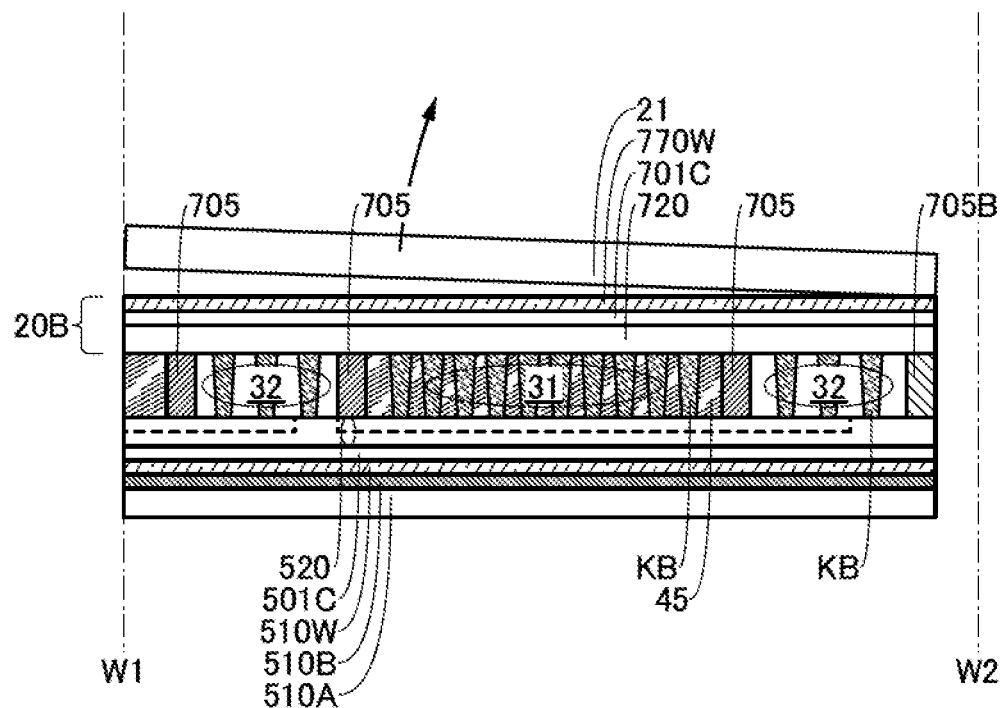

The process substrate 21 is separated from the second process member 20 under a pressure higher than the reduced pressure (see V6 in FIG. 20, and FIGS. 24A and 24B). Note that a portion of the second process member 20 from which the process substrate 21 is removed is referred to as a remaining portion 20B.

For example, the insulating film 770W is irradiated with a laser beam through the process substrate 21 in a manner similar to the manner in the fourth step. FIG. 24A illustrates laser irradiation using the light source 40. Thus, a structure that facilitates separation from the process substrate 21 is formed in a laser-irradiated region of the insulating film 770W, so that the process substrate 21 can be separated at the laser-irradiated region of the insulating film 770W.

<<Seventh Step>>

Figure 25A:
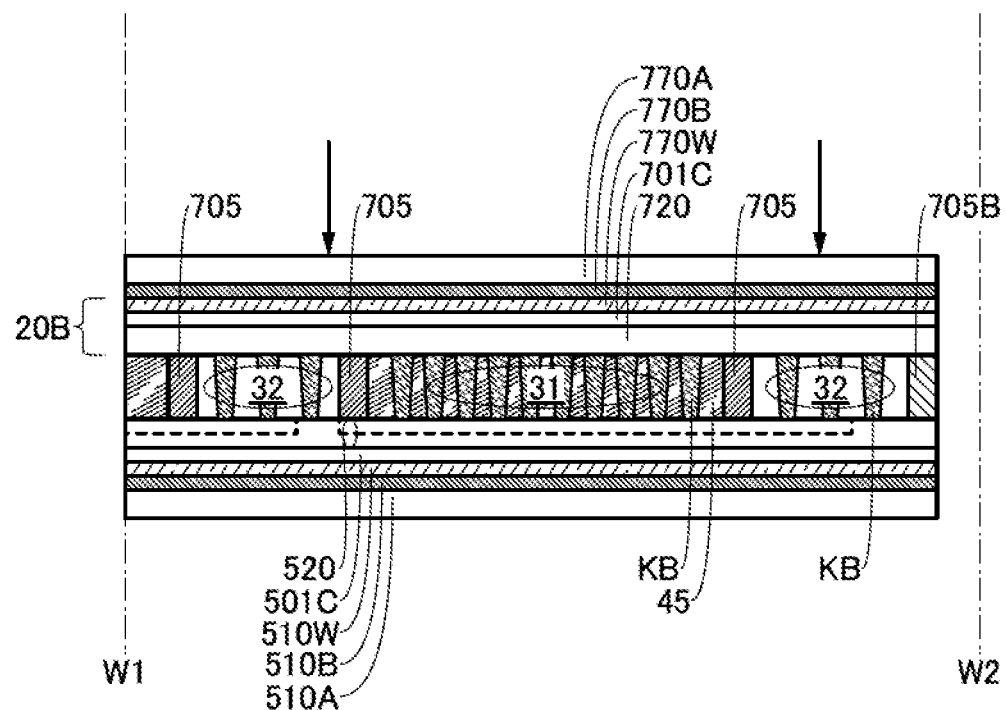
FIGS. 25A and 25B are schematic views illustrating a method for manufacturing a display panel of an embodiment.

The remaining portion 20B of the second process member 20 and the base 770A are attached to each other with the use of the adhesive layer 770B (see V7 in FIG. 20, and FIG. 25A).

For example, an adhesive whose fluidity is inhibited and which is formed in a single wafer shape in advance (also referred to as a sheet-like adhesive) can be used for the adhesive layer 770B.

<<Eighth Step>>

Figure 25B:
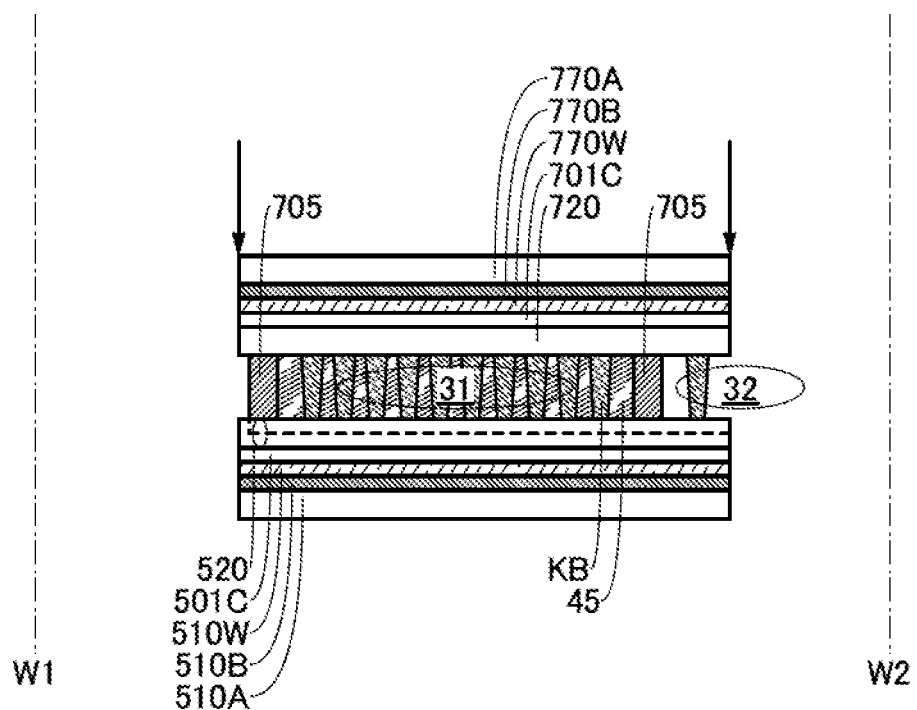

A portion including the first region 31 is cut out (see V8 in FIG. 20, and FIGS. 25A and 25B). For example, a carbon dioxide laser can be used for cutting. Thus, a plurality of display panels can be cut out, for example.

<<Ninth Step>>

Figure 26:
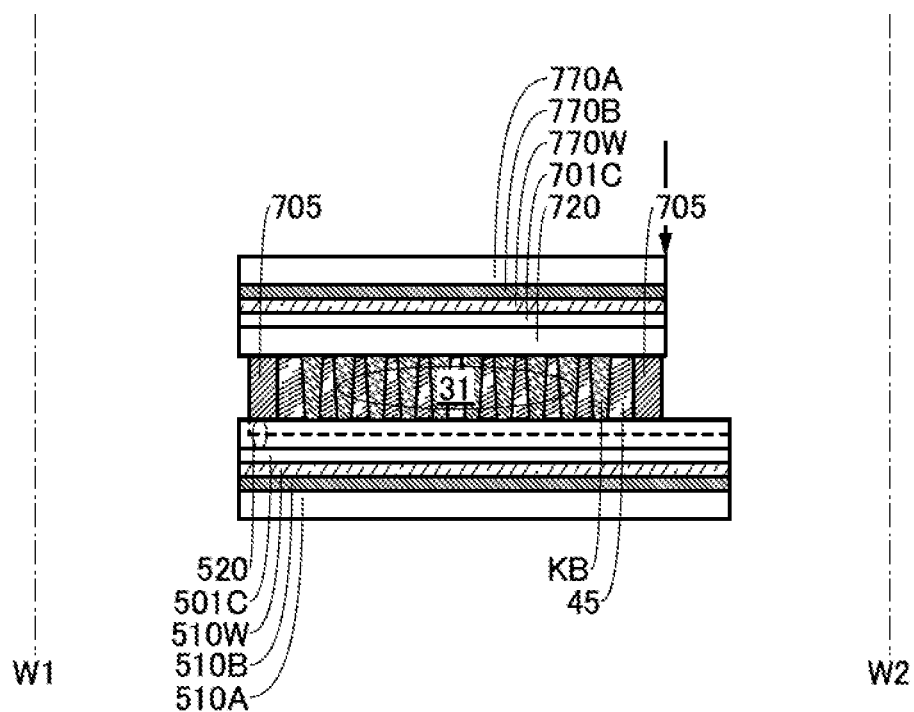
FIG. 26 is a schematic view illustrating a method for manufacturing a display panel of an embodiment.

The base 770A and the like in a region overlapping with the second region 32 are removed (see V9 in FIG. 20, and FIG. 26). For example, a carbon dioxide laser whose output is adjusted can be used for removing. Note that the sealing material 705 is not formed in the second region 32. In this manner, a terminal provided in the second region 32 can be easily exposed.

Example 2 of Manufacturing Method

Another example of a method for manufacturing a display panel of one embodiment of the present invention will be described with reference to FIGS. 27A and 27B and FIGS. 28A and 28B.

Figure 27A:
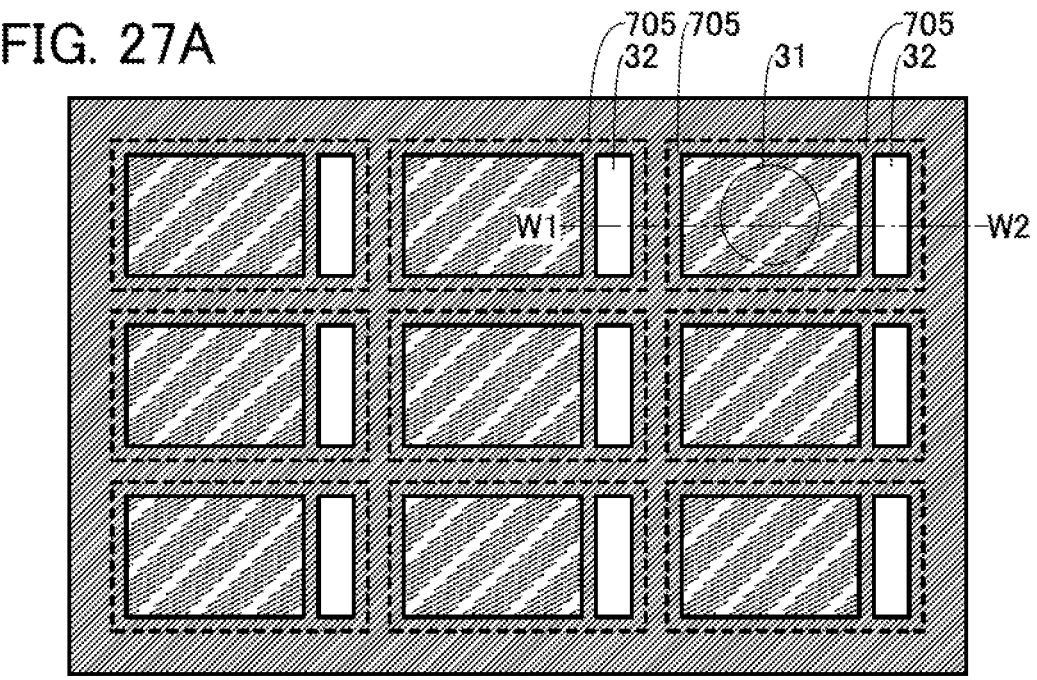
FIGS. 27A and 27B are schematic views illustrating a method for manufacturing a display panel of an embodiment.
Figure 27B:
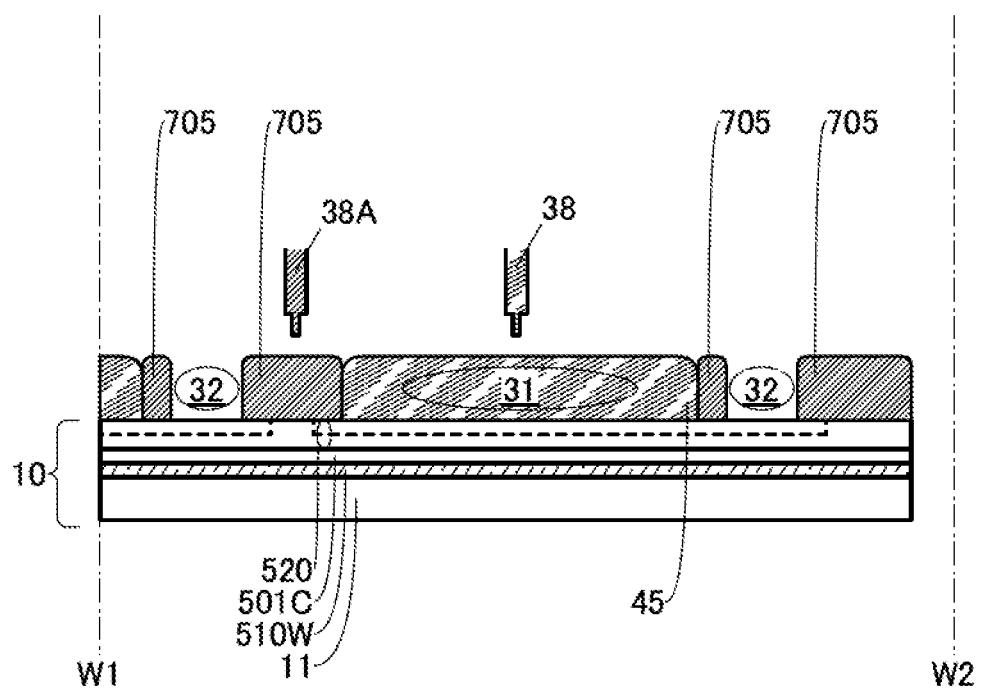

FIGS. 27A and 27B are schematic views illustrating the method for manufacturing the display panel of one embodiment of the present invention. FIG. 27A is a top view illustrating a region formed using a sealing material, and FIG. 27B is a cross-sectional view taken along cutting plane line W1-W2 in FIG. 27A.

Figure 28A:
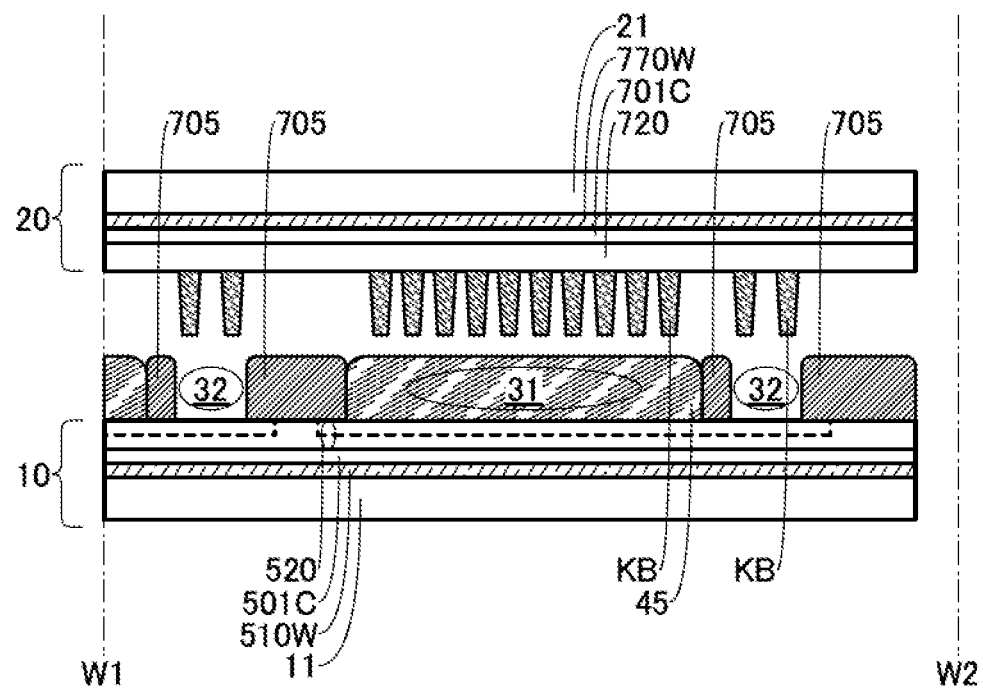
FIGS. 28A and 28B are schematic views illustrating a method for manufacturing a display panel of an embodiment.
Figure 28B:
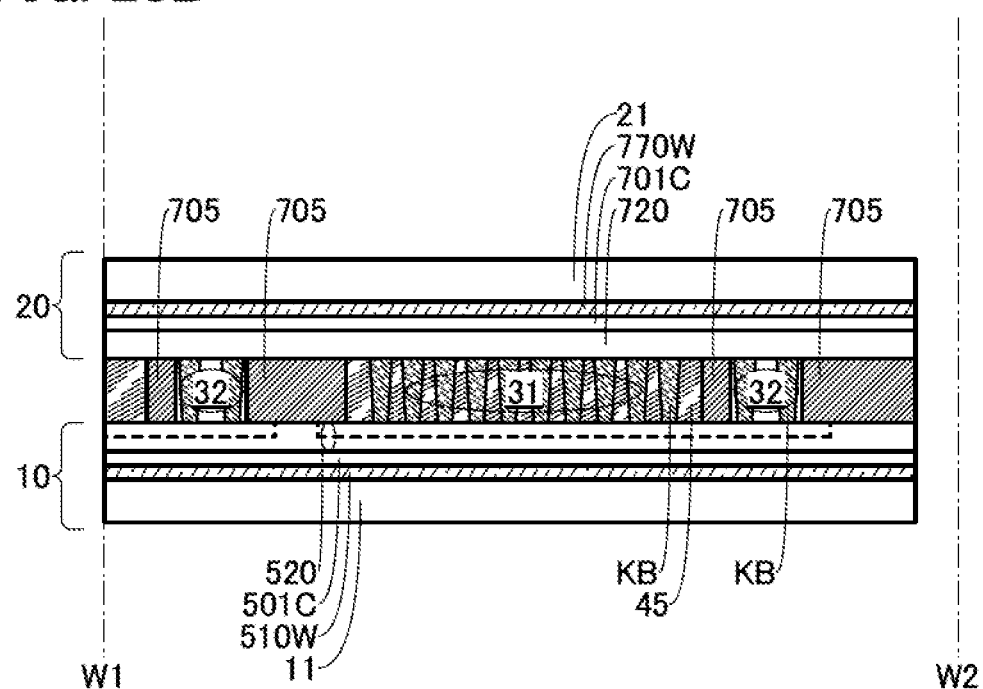

FIGS. 28A and 28B are schematic views illustrating the method for manufacturing the display panel of one embodiment of the present invention. FIG. 28A is a cross-sectional view illustrating a step of attaching the first process member 10, which is illustrated in FIG. 27B, to the second process member 20. FIG. 28B is a cross-sectional view illustrating a state after the attachment.

Note that the manufacturing method described here is different from the manufacturing method of the display panel that is described with reference to FIGS. 21A and 21B and FIGS. 22A and 22B in that the sealing material 705B is not used and that the second region 32 is narrow.

Example 3 of Manufacturing Method

Another example of a method for manufacturing a display panel of one embodiment of the present invention will be described with reference to FIGS. 29A and 29B and FIGS. 30A and 30B.

Figure 29A:
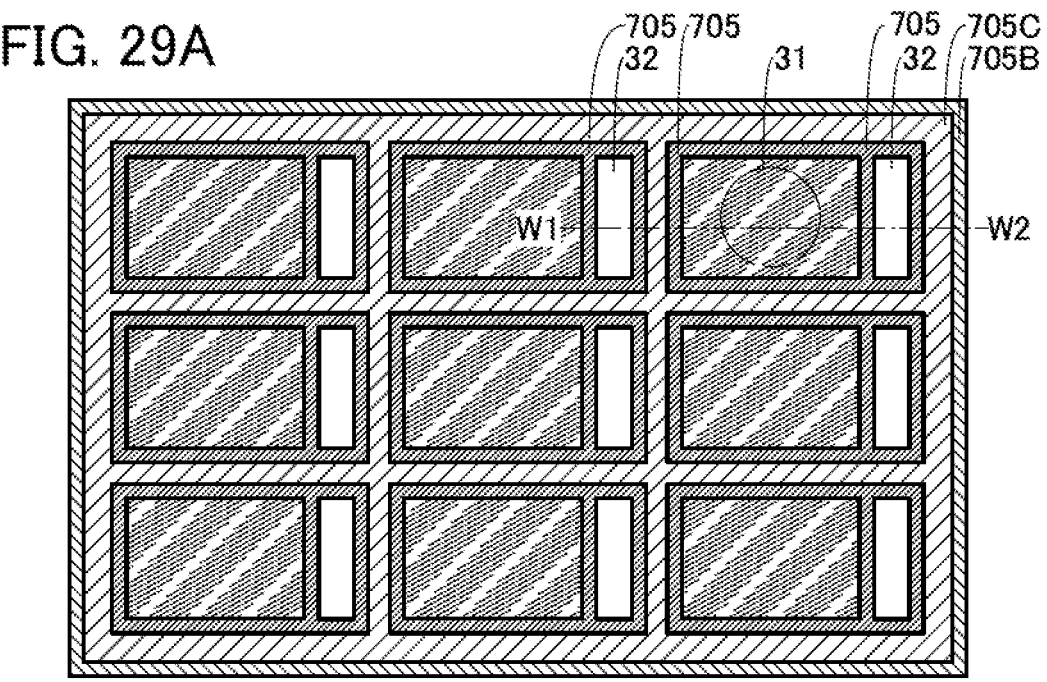
FIGS. 29A and 29B are schematic views illustrating a method for manufacturing a display panel of an embodiment.
Figure 29B:
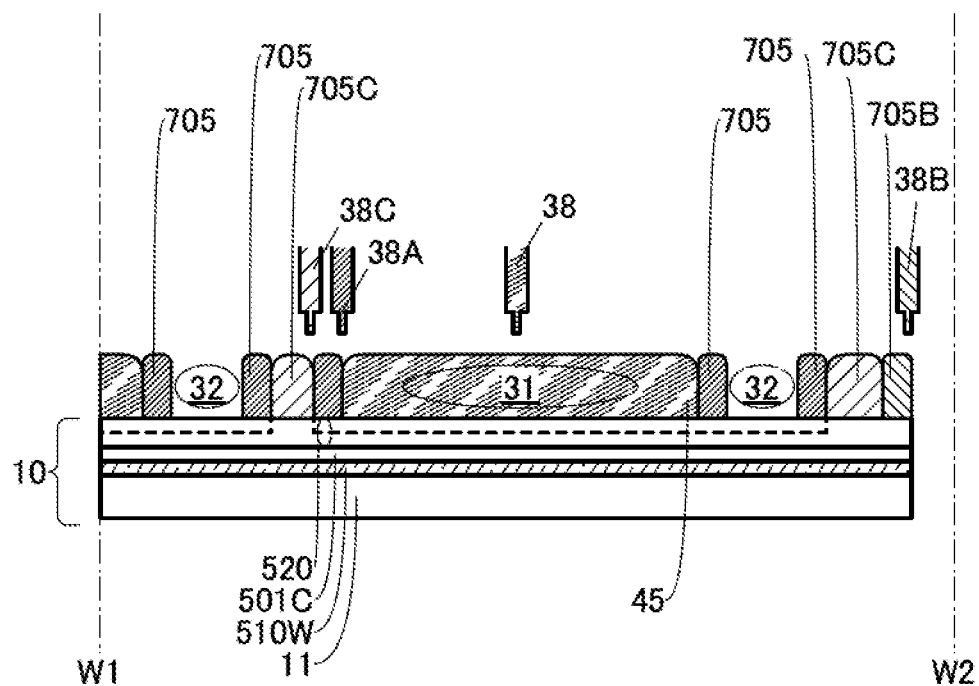

FIGS. 29A and 29B are schematic views illustrating the method for manufacturing the display panel of one embodiment of the present invention. FIG. 29A is a top view illustrating a region formed using a sealing material, and FIG. 29B is a cross-sectional view taken along cutting plane line W1-W2 in FIG. 29A.

Figure 30A:
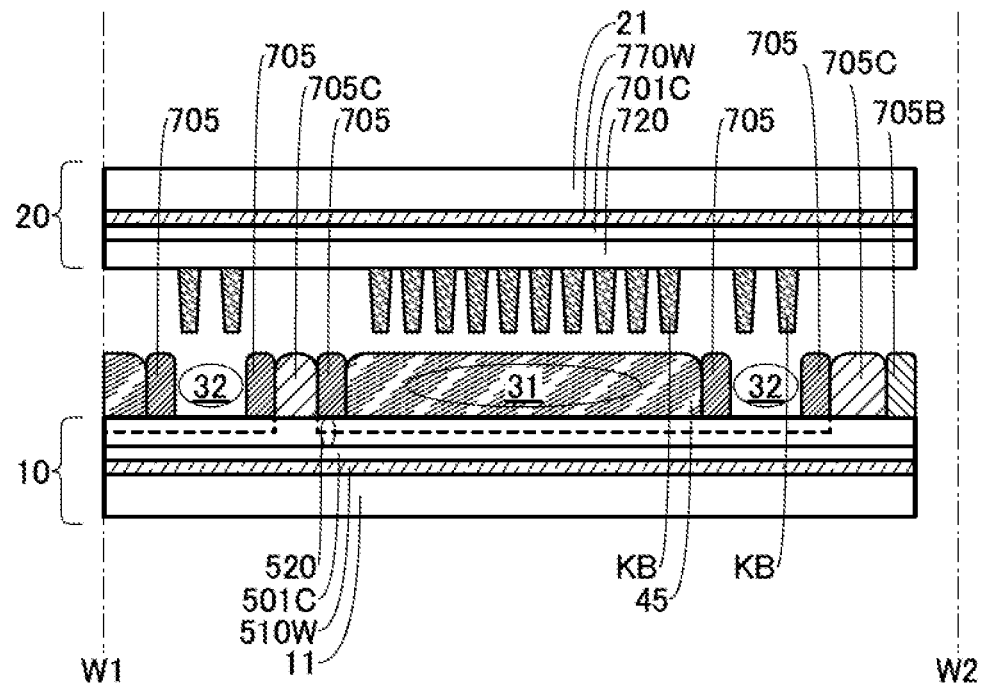
FIGS. 30A and 30B are schematic views illustrating a method for manufacturing a display panel of an embodiment.
Figure 30B:
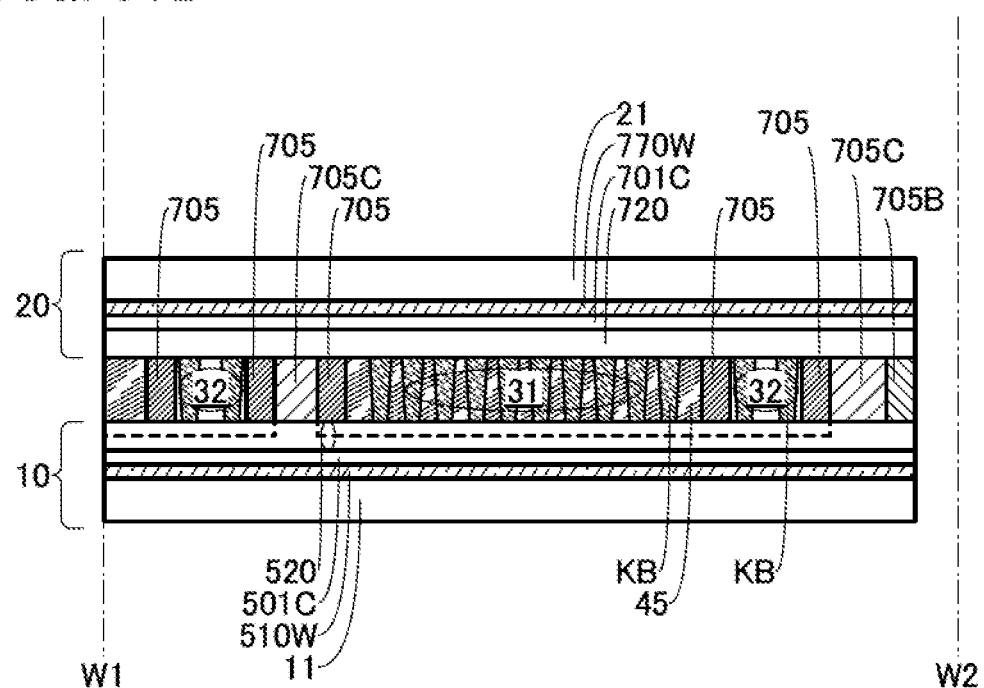

FIGS. 30A and 30B are schematic views illustrating the method for manufacturing the display panel of one embodiment of the present invention. FIG. 30A is a cross-sectional view illustrating a step of attaching the first process member 10, which is illustrated in FIG. 29B, to the second process member 20. FIG. 30B is a cross-sectional view illustrating a state after the attachment.

Note that the manufacturing method described here is different from the manufacturing method of the display panel that is described with reference to FIGS. 21A and 21B and FIGS. 22A and 22B in that the second region 32 is narrow and that a sealing material 705C is provided between the sealing material 705 and the sealing material 705B. The different structures will be described in detail below, and the above description is referred to for the other similar structures.

For example, a dispenser 38C is moved while discharging a material, so that the sealing material 705C with a predetermined shape is formed. Specifically, the sealing material 705C is formed between the sealing material 705 and the sealing material 705B.

Example 4 of Manufacturing Method

Another example of a method for manufacturing a display panel of one embodiment of the present invention will be described with reference to FIGS. 31A and 31B, FIGS. 32A and 32B, FIGS. 33A and 33B, FIGS. 34A and 34B, FIGS. 35A and 35B, FIGS. 36A and 36B, and FIG. 37.

Figure 31A:
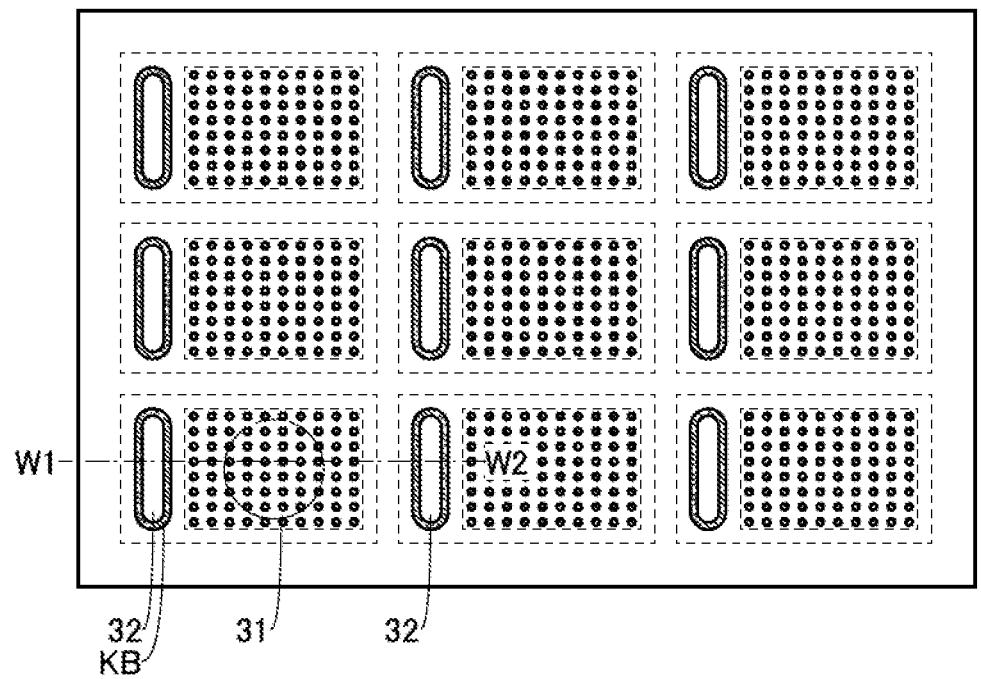
FIGS. 31A and 31B are schematic views illustrating a method for manufacturing a display panel of an embodiment.
Figure 31B:
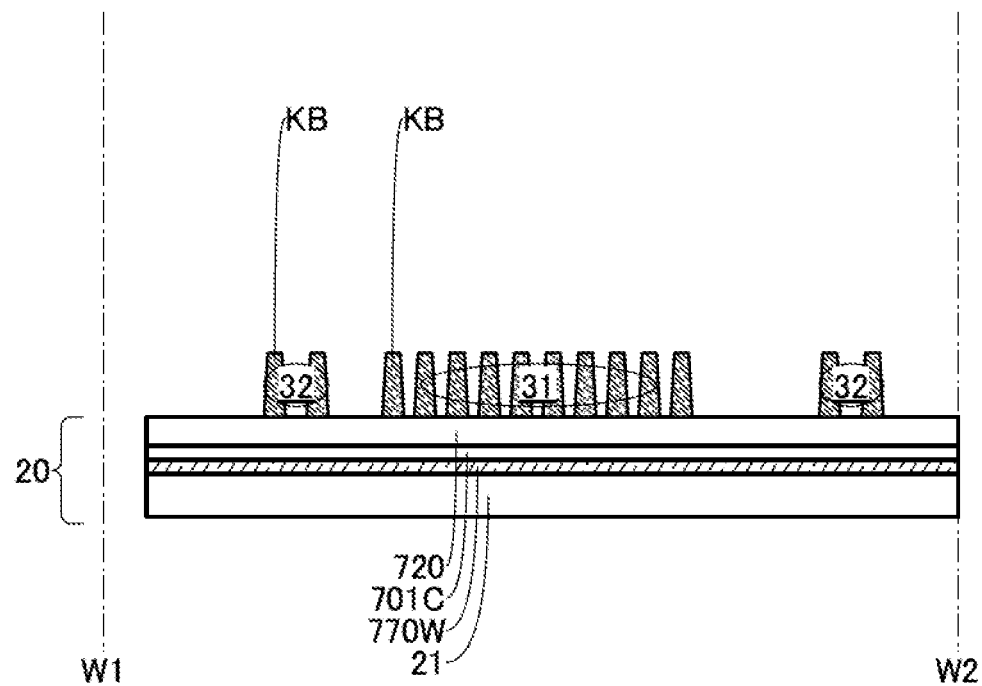

FIGS. 31A and 31B are schematic views illustrating the method for manufacturing the display panel of one embodiment of the present invention. FIG. 31A is a top view for describing the shapes of the structure bodies KB, and FIG. 31B is a cross-sectional view taken along cutting plane line W1-W2 in FIG. 31A.

Figure 32A:
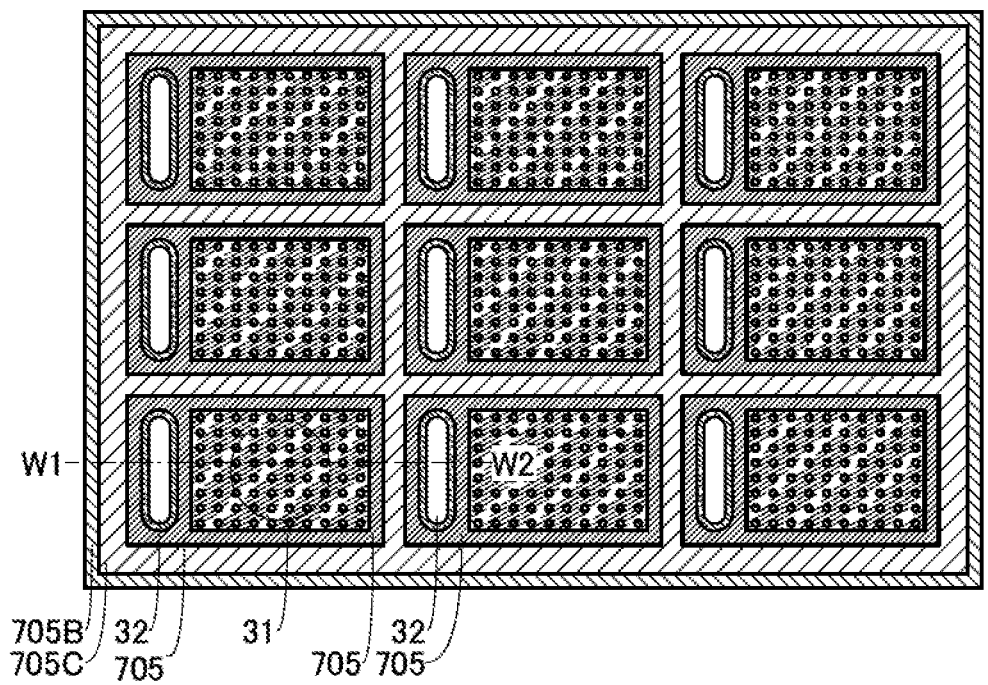
FIGS. 32A and 32B are schematic views illustrating a method for manufacturing a display panel of an embodiment.
Figure 32B:
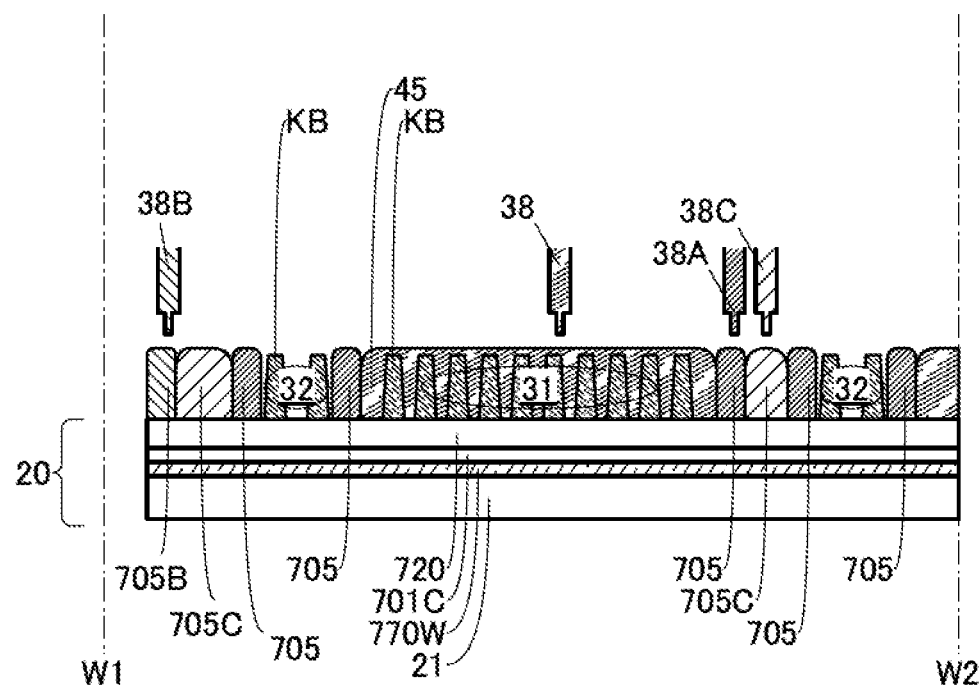

FIGS. 32A and 32B are schematic views illustrating the method for manufacturing the display panel of one embodiment of the present invention. FIG. 32A is a top view illustrating a region formed using a sealing material, and FIG. 32B is a cross-sectional view taken along cutting plane line W1-W2 in FIG. 32A.

Figure 33A:
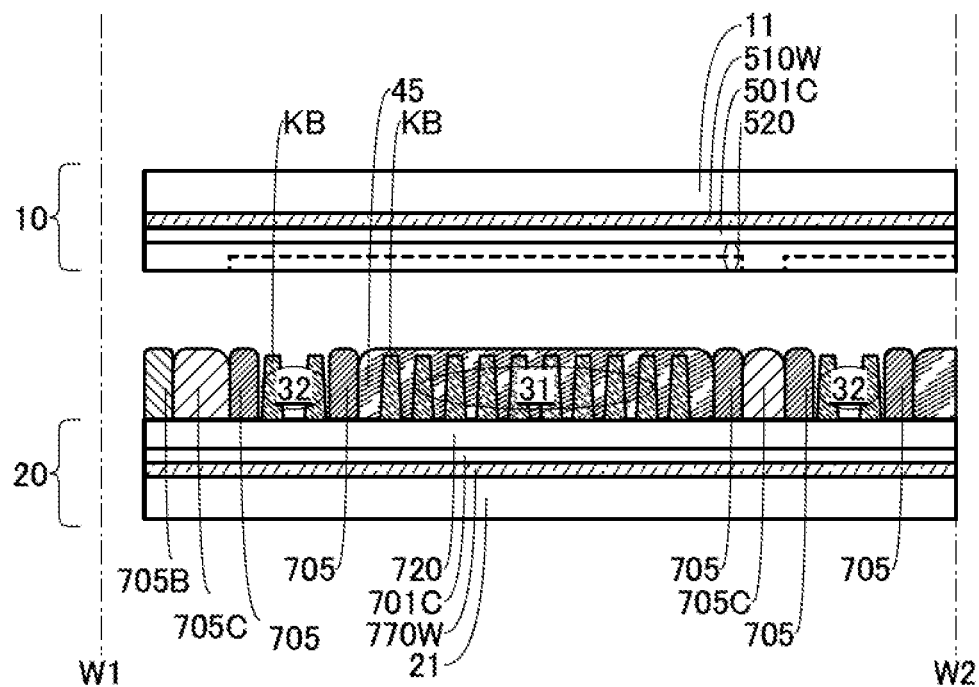
FIGS. 33A and 33B are schematic views illustrating a method for manufacturing a display panel of an embodiment.
Figure 33B:
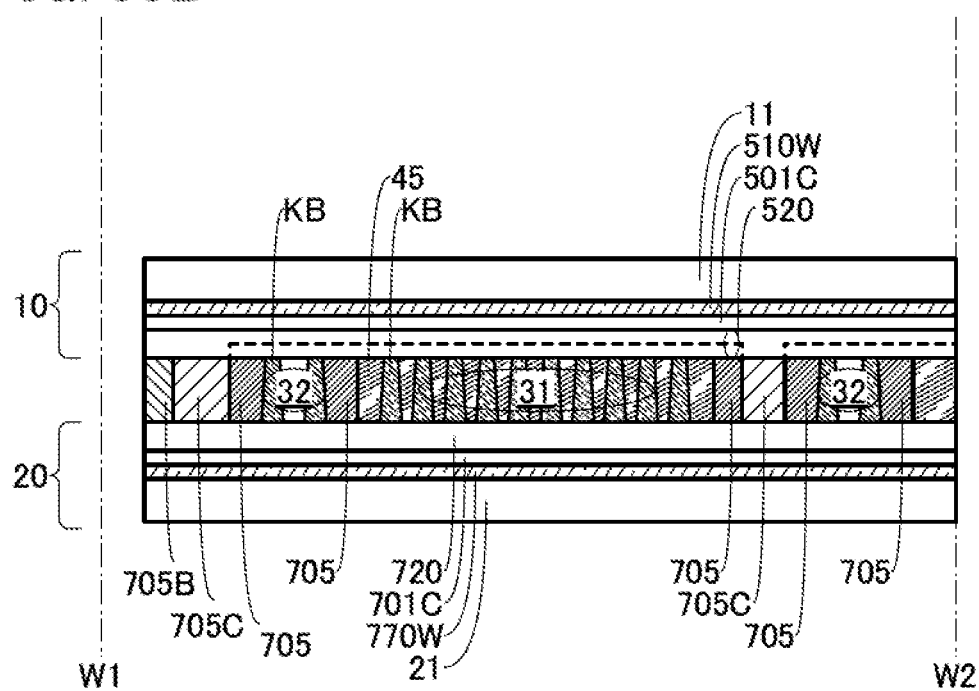

FIGS. 33A and 33B are schematic views illustrating the method for manufacturing the display panel of one embodiment of the present invention. FIG. 33A is a cross-sectional view illustrating a step of attaching the second process member 20, which is illustrated in FIG. 33B, to the first process member 10. FIG. 33B is a cross-sectional view illustrating a state after the attachment.

FIGS. 34A and 34B, FIGS. 35A and 35B, FIGS. 36A and 36B, and FIG. 37 are cross-sectional views illustrating the method for manufacturing the display panel of one embodiment of the present invention.

Note that the manufacturing method described here is different from the manufacturing method of the display panel that is described with reference to FIGS. 29A and 29B and FIGS. 30A and 30B in that the second process member 20 is provided with the ring-like structure body KB with an opening, that the first region 31 and the second region 32 are provided for the second process member 20 instead of the first process member 10 with the use of the sealing material 705, the sealing material 705B, and the sealing material 705C, and that the second region 32 is narrow.

The second process member 20 is provided with the ring-like structure body KB (see FIG. 31A). Note that the ring-like structure body KB has the opening, which overlaps with the terminal 519B in the state where the first process member 10 and the second process member 20 are attached to each other.

<<First Step>>

The first region 31 and the second region 32 are provided for the second process member 20 with the use of the sealing material 705 and the sealing material 705B (see FIGS. 32A and 32B).

For example, the dispenser 38C is moved while discharging a material, so that the sealing material 705C with a predetermined shape is formed. Specifically, the sealing material 705C is formed between the sealing material 705 and the sealing material 705B.

<<Second Step>>

The liquid crystal material 45 is dripped in the first region 31 (see FIGS. 32A and 32B).

For example, the liquid crystal material is discharged from the dispenser 38.

<<Third Step>>

The first process member 10 and the second process member 20 are attached to each other with the sealing material 705 and the sealing material 705B under a reduced pressure lower than the normal pressure (see FIGS. 33A and 33B).

For example, the reduced pressure can be lower than or equal to 100 Pa, preferably lower than or equal to 1 Pa, in which case the pressure in the second region 32 is substantially equal to the reduced pressure.

<<Fourth Step>>

Figure 34A:
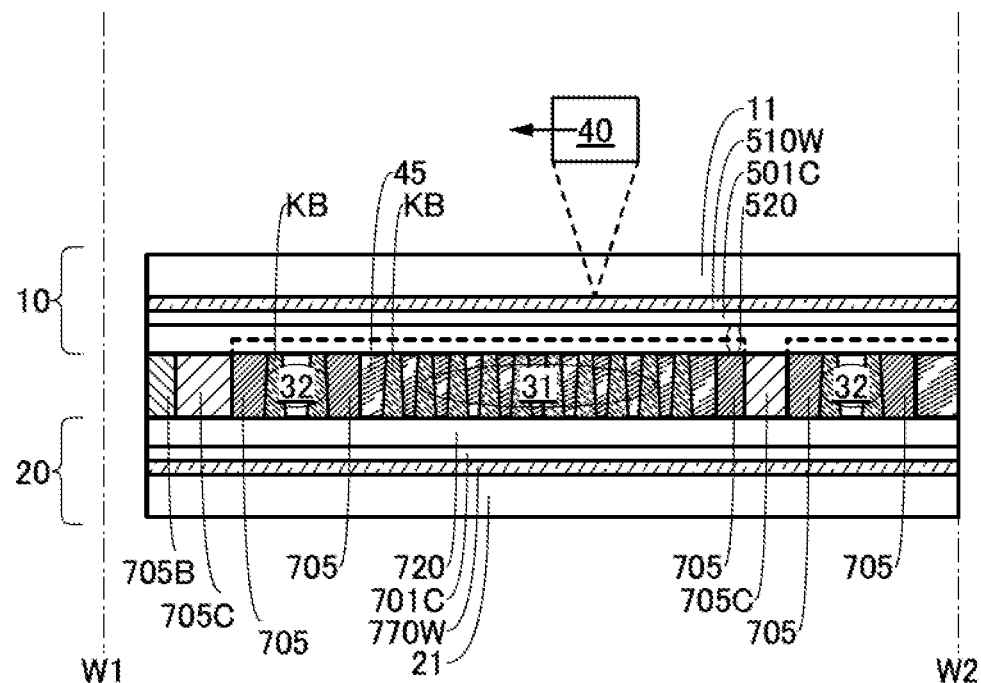
FIGS. 34A and 34B are schematic views illustrating a method for manufacturing a display panel of an embodiment.
Figure 34B:
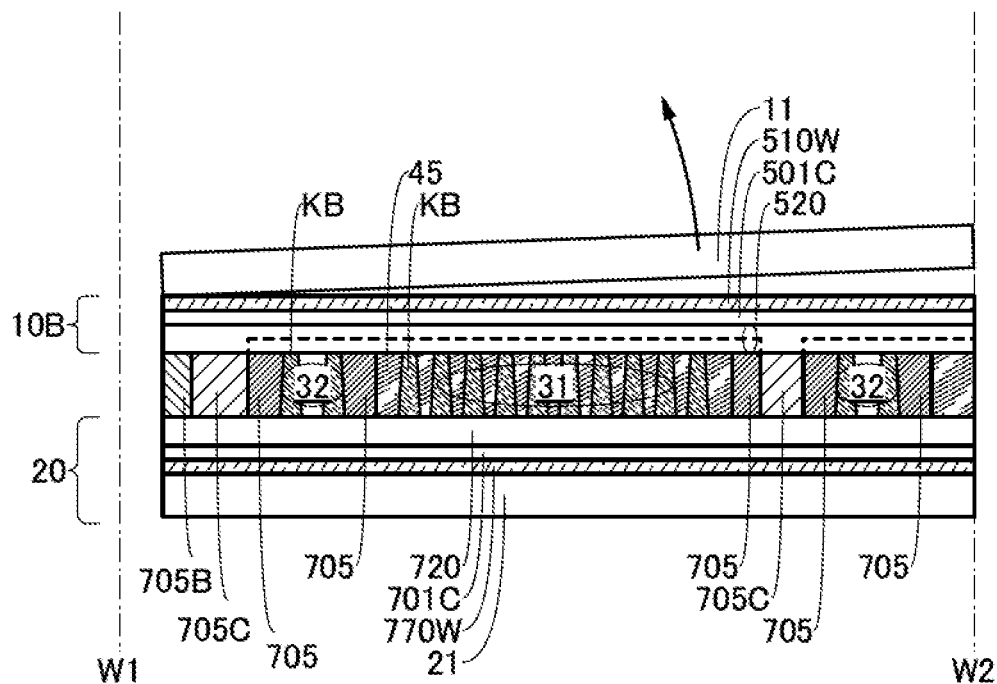

The process substrate 11 is separated from the first process member 10 under a pressure higher than the reduced pressure (see FIGS. 34A and 34B). Note that the portion of the first process member 10 from which the process substrate 11 is removed is referred to as the remaining portion 10B.

For example, the atmospheric pressure can be used as the pressure higher than the reduced pressure. Note that the pressure in the second region 32 is kept substantially the same as the reduced pressure. Thus, the atmospheric pressure is applied on the first process member 10, the second process member 20, and the sealing material 705B that surround the second region 32. In addition, the structure bodies KB keep a predetermined gap between the first process member 10 and the second process member 20 while resisting the atmospheric pressure.

For example, the insulating film 510W is irradiated with a laser beam through the process substrate 11, whereby the process substrate 11 can be separated from the first process member 10. FIG. 34A illustrates laser irradiation using the light source 40.

<<Fifth Step>>

Figure 35A:
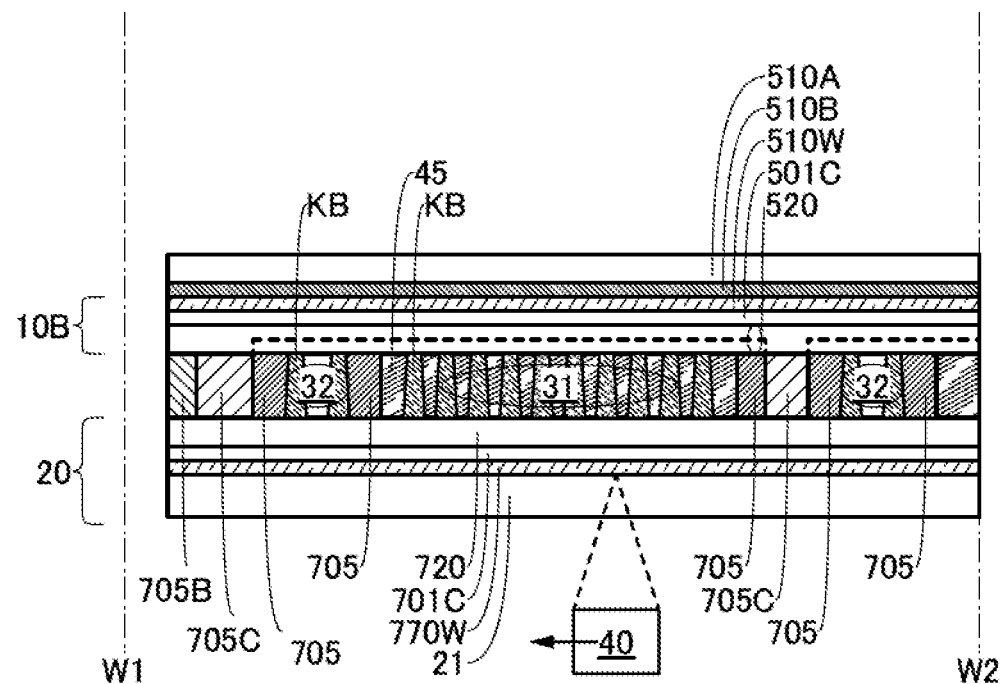
FIGS. 35A and 35B are schematic views illustrating a method for manufacturing a display panel of an embodiment.

The remaining portion 10B of the first process member 10 and the base 510A are attached to each other with the use of the adhesive layer 510B (see FIG. 35A).

<<Sixth Step>>

Figure 35B:
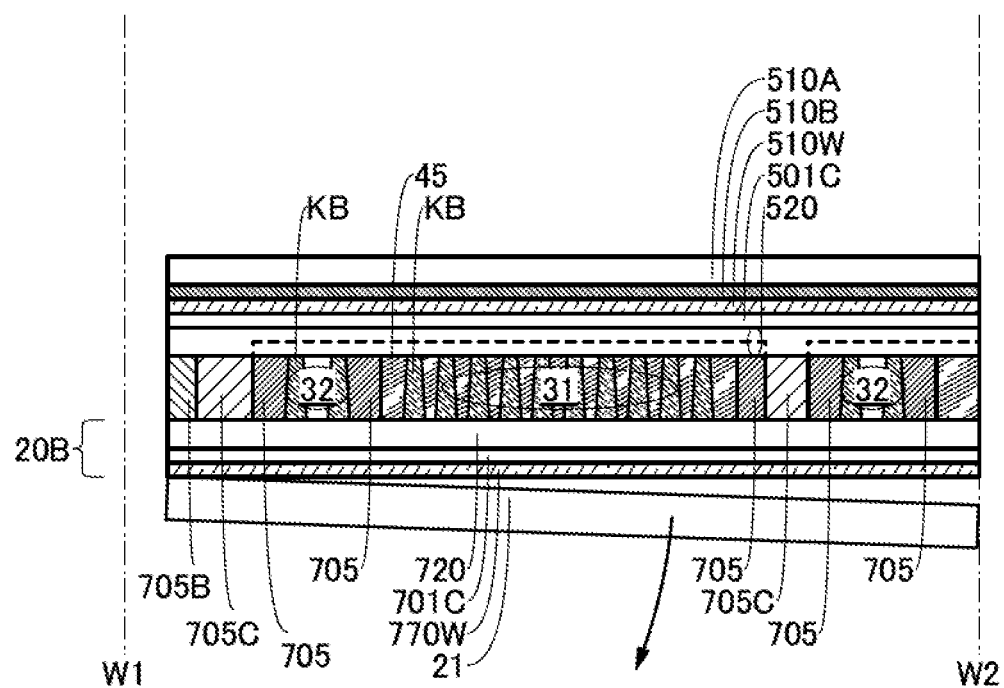

The process substrate 21 is separated from the second process member 20 under a pressure higher than the reduced pressure (see FIGS. 35A and 35B). Note that the portion of the second process member 20 from which the process substrate 21 is removed is referred to as the remaining portion 20B.

<<Seventh Step>>

Figure 36A:
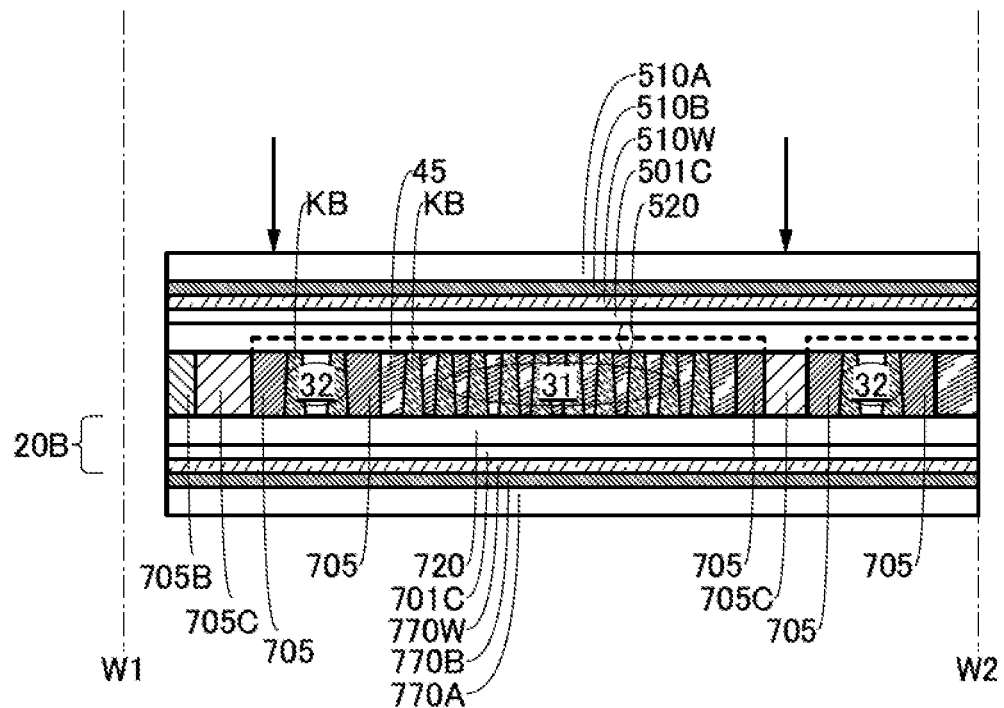
FIGS. 36A and 36B are schematic views illustrating a method for manufacturing a display panel of an embodiment.

The remaining portion 20B of the second process member 20 and the base 770A are attached to each other with the use of the adhesive layer 770B (see FIG. 36A).

<<Eighth Step>>

Figure 36B:
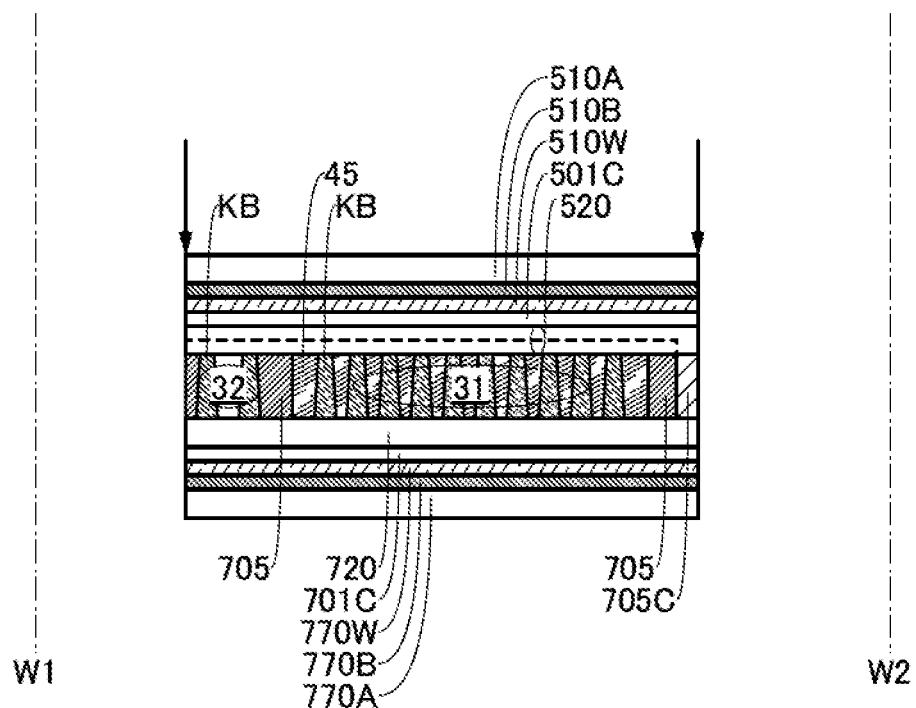

A portion including the first region 31 is cut out (see FIGS. 36A and 36B). For example, a carbon dioxide laser can be used for cutting. Thus, a plurality of display panels can be cut out, for example.

<<Ninth Step>>

Figure 37:
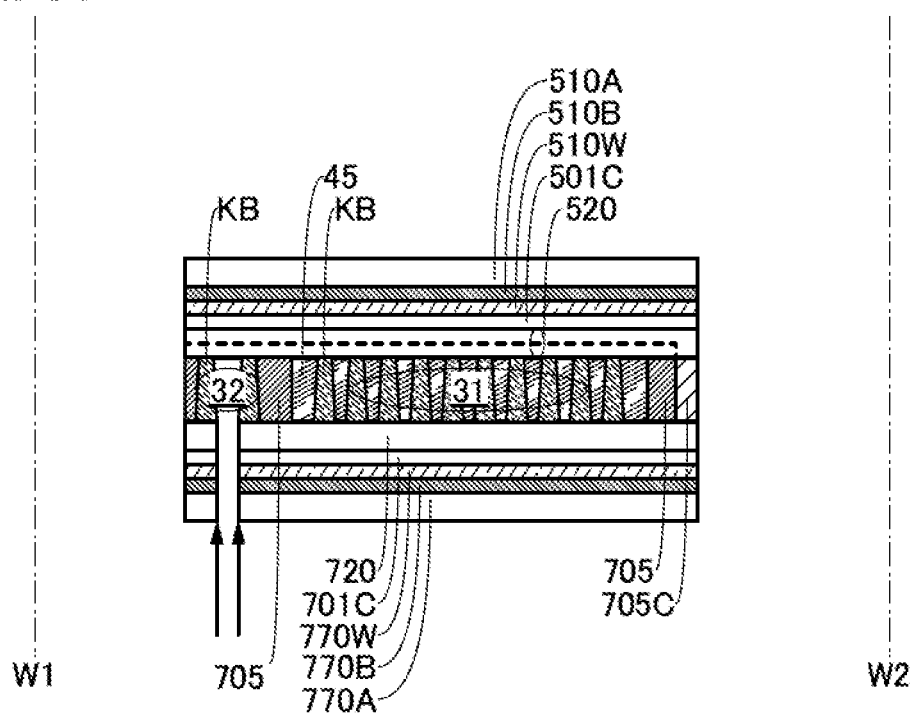
FIG. 37 is a schematic view illustrating a method for manufacturing a display panel of an embodiment.

The base 770A and the like in a region overlapping with the second region 32 are cut out (see FIG. 37). For example, a carbon dioxide laser whose output is adjusted can be used for cutting. Note that the sealing material 705 is not formed in a region in the second region 32 that overlaps with the opening of the ring-like structure body KB. In this manner, a terminal provided in the region in the second region 32 can be easily exposed.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is turned on or off to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that allow a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected."

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order," "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order," and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order." When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path." Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor." When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

REFERENCE NUMERALS

GD: driver circuit, GDA: driver circuit, GDB: driver circuit, SD: driver circuit, CP: conductive material, KB: structure body, CL(g): control line, ML(h): signal line, CF: coloring film, BM: light-blocking film, ANO: conductive film, BR: conductive film, CSCOM: wiring, SS: control data, C(g): electrode, M(h): electrode, 510C: relieving layer, 510W: insulating film, 770C: relieving layer, 770W: insulating film, AF1: alignment film, AF2: alignment film, C11: capacitor, C12: capacitor, CF1: coloring film, CF2: coloring film, CSCOM1: wiring, G1: scan line, G2: scan line, P1: position data, S1: signal line, S2: signal line, SD1: driver circuit, SD2: driver circuit, SW1: switch, SW2: switch, V1: image data, V11: data, V12: data, VCOM1: wiring, VCOM2: conductive film, 10: process member, 11: process substrate, 20: process member, 21: process substrate, 31: region, 32: region, 38: dispenser, 38A: dispenser, 38B: dispenser, 38C: dispenser, 40: light source, 45: liquid crystal material, 230: display portion, 231: display region, 234: expansion circuit, 235M: image processing circuit, 238: control portion, 240: input portion, 241: sensing region, 501B: insulating film, 501C: insulating film, 504: conductive film, 505: bonding layer, 506: insulating film, 508: semiconductor film, 508A: region, 508B: region, 508C: region, 510A: base, 510B: adhesive layer, 511B: conductive film, 511C: conductive film, 511D: conductive film, 512A: conductive film, 512B: conductive film, 516: insulating film, 518: insulating film, 519B: terminal, 519C: terminal, 519D: terminal, 520: functional layer, 521: insulating film, 522: connection portion, 524: conductive film, 528: insulating film, 530($i,j$): pixel circuit, 550($i,j$): second display element, 551($i,j$): third electrode, 552: fourth electrode, 553: layer containing light-emitting material, 570: base, 591A: opening, 591C: opening, 592A: opening, 592B: opening, 592C: opening, 700: display panel, 700BL: backlight, 700LC: display panel, 700TP2: input/output panel, 701C: insulating film, 702: pixel, 705: sealing material, 705B: sealing material, 705C: sealing material, 706: insulating film, 720: functional layer, 750($i,j$): display element, 751($i,j$): first electrode, 751A: conductive film, 751B: reflective film, 751C: conductive film, 751H: region, 752: second electrode, 753: layer containing liquid crystal material, 770A: base, 770B: adhesive layer, 770D: functional film, 770P: functional film, 770P1: functional film, 770P2: functional film, 771: insulating film, 775: sensing element, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: memory medium reading portion, 5012: support, 5013: earphone, 5014: antenna, 5015: shutter button, 5016: image receiving portion, 5017: charger, 7302: housing, 7304: display panel, 7305: icon, 7306: icon, 7311: operation button, 7312: operation button, 7313: connection terminal, 7321: band, and 7322: clasp.

This application is based on Japanese Patent Application Serial No. 2016-181592 filed with Japan Patent Office on Sep. 16, 2016, the entire contents of which are hereby incorporated by reference.

The invention claimed is:
1. A display panel comprising:
 a first base;
 a second base;
 a first layer;
 a second layer;
 a sealing material;
 a structure body; and
 a pixel, wherein the second base overlaps with the first base,
wherein the first layer is provided between the first base and the second base,
wherein the first layer comprises a pixel circuit a first insulating film, and a first relieving layer between the pixel circuit and the first insulating film,
wherein the first insulating film is provided between the first base and the pixel circuit,
wherein the first insulating film has a thickness of greater than or equal to 0.5 μm and less than or equal to 3 μm,
wherein the first insulating film has a Young's modulus of larger than or equal to 3 GPa and smaller than or equal to 12 GPa,
wherein the second layer is provided between the first layer and the second base,
wherein the second layer comprises a coloring film, a second insulating film, and a second relieving layer between the pixel circuit and the second insulating film,
wherein the second insulating film is provided between the second base and the coloring film,
wherein the second insulating film has a thickness of greater than or equal to 0.5 μm and less than or equal to 3 μm,
wherein the second insulating film has a Young's modulus of larger than or equal to 3 GPa and smaller than or equal to 12 GPa,
wherein the sealing material is configured to bond the first base and the second base to each other,
wherein the structure body is configured to keep a predetermined gap between the first base and the second base,
wherein the pixel comprises a first display element, the pixel circuit, and the coloring film,
wherein the first display element is electrically connected to the pixel circuit,
wherein the first display element comprises a region overlapping with the coloring film,
wherein the first display element comprises a layer containing a liquid crystal material,
wherein the first relieving layer has a thickness of greater than or equal to 7 μm and less than or equal to 9.5 μm, and
wherein the second relieving layer has a thickness of greater than or equal to 7 μm and less than or equal to 9.5 μm.

2. The display panel according to claim 1, further comprising:
a first group of pixels;
a second group of pixels;
a scan line; and
a signal line,
wherein the first group of pixels comprise the pixel,
wherein the first group of pixels are arranged in a row direction,
wherein the second group of pixels comprise the pixel,
wherein the second group of pixels are arranged in a column direction intersecting the row direction,
wherein the scan line is electrically connected to the first group of pixels,
wherein the signal line is electrically connected to the second group of pixels,
wherein the first group of pixels and the second group of pixels are provided so that a resolution of the display panel is higher than or equal to 220 ppi,
wherein the first base has a Young's modulus of larger than or equal to 1 GPa and smaller than or equal to 12 GPa, and
wherein the second base has a Young's modulus of larger than or equal to 1 GPa and smaller than or equal to 12 GPa.

3. The display panel according to claim 1,
wherein the pixel further comprises:
a first conductive film;
a second conductive film;
an insulating film; and
a second display element,
wherein the second conductive film comprises a region overlapping with the first conductive film,
wherein the insulating film comprises a region between the first conductive film and the second conductive film,
wherein the insulating film comprises an opening,
wherein the first conductive film is electrically connected to the first display element,
wherein the second conductive film is electrically connected to the first conductive film in the opening,
wherein the second conductive film is electrically connected to the pixel circuit,
wherein the second display element is electrically connected to the pixel circuit,
wherein the second display element is configured to emit light toward the insulating film, and
wherein the second display element is provided so that an image displayed using the second display element can be seen from part of a region from which an image displayed using the first display element can be seen.

4. The display panel according to claim 1, further comprising a terminal,
wherein the terminal is electrically connected to the pixel circuit,
wherein the terminal comprises a region overlapping with the first base,
wherein the second base does not overlap with the terminal,
wherein the sealing material does not overlap with the terminal,
wherein the structure body does not overlap with the terminal, and
wherein the structure body comprises a region between the sealing material and a region overlapping with the terminal.

5. An input/output device comprising:
a display portion; and
an input portion,
wherein the display portion comprises the display panel according to claim 1,
wherein the input portion comprises a region overlapping with the display panel,
wherein the input portion comprises a control line, a sensing signal line, and a sensing element,
wherein the control line is configured to supply a control signal,
wherein the sensing signal line is configured to be supplied with a sensing signal,
wherein the sensing element is electrically connected to the control line and the sensing signal line,
wherein the sensing element has a light-transmitting property,
wherein the sensing element comprises a first electrode and a second electrode,
wherein the first electrode is electrically connected to the control line,
wherein the second electrode is electrically connected to the sensing signal line, wherein the second electrode is provided so that an electric field part of which is blocked by an object approaching a region overlapping with the display panel is generated between the first electrode and the second electrode, and wherein the sensing element is configured to supply the sensing signal which changes in accordance with the control signal and a distance between the sensing element and the object approaching the region overlapping with the display panel.

6. A data processing device comprising:

at least one of a keyboard, a hardware button, a pointing device, a touch sensor, an illuminance sensor, an imaging device, an audio input device, a viewpoint input device, and an attitude determination device; and the display panel according to claim 1.

7. The display panel according to claim 1, wherein the first base comprises a first resin film, and wherein the second base comprises a second resin film.

8. A method for manufacturing a display panel, comprising the steps of:

forming a first region and a second region for a first process member using a sealing material;

dripping a liquid crystal material into the first region;

attaching the first process member and a second process member to each other using the sealing material under a reduced pressure lower than a normal pressure;

separating a first process substrate from the first process member under a pressure higher than the reduced pressure;

attaching a remaining portion of the first process member and a first base to each other using a first adhesive layer;

separating a second process substrate from the second process member under a pressure higher than the reduced pressure;

attaching a remaining portion of the second process member and a second base to each other using a second adhesive layer;

cutting out a portion including the first region; and removing the second base and the remaining portion of the second process member in a region overlapping with the second region.

9. The method for manufacturing a display panel, according to claim 8, wherein the first region is surrounded by the sealing material.

10. The method for manufacturing a display panel, according to claim 8, wherein a first group of structure bodies are provided in the first region, and wherein a second group of structure bodies are provided in the second region before removing the second base and the remaining portion of the second process member in the region overlapping with the second region.

11. The method for manufacturing a display panel, according to claim 10, wherein the first group of structure bodies are provided at a first interval, wherein the second group of structure bodies are provided at a second interval, and wherein the first interval is smaller than the second interval.

12. The method for manufacturing a display panel, according to claim 10, wherein separating the first process substrate is performed by laser irradiation, and wherein separating the second process substrate is performed by laser irradiation.

* * * * *